(12) United States Patent
Abaitancei et al.

(10) Patent No.: US 11,448,268 B2
(45) Date of Patent: Sep. 20, 2022

(54) SYSTEM AND METHOD FOR HYDRAULIC TRANSFORMER CLUTCHES

(71) Applicant: A & A International, LLC, Chicago, IL (US)

(72) Inventors: Horia Abaitancei, Brasov (RO); Cornel Mihai, Satu Mare (RO); Stefan Ioana, Germantown, MD (US)

(73) Assignee: A & A International, LLC, Chicago, IL (US)

( * ) Notice: Subject to any disclaimer, the term of this patent is extended or adjusted under 35 U.S.C. 154(b) by 0 days.

(21) Appl. No.: 16/449,250

(22) Filed: Jun. 21, 2019

(65) Prior Publication Data

US 2020/0040948 A1 Feb. 6, 2020

Related U.S. Application Data

(60) Provisional application No. 62/714,267, filed on Aug. 3, 2018.

(51) Int. Cl.
| | | |
|---|---|---|
| *F16D 25/065* | (2006.01) | |
| *F16D 13/16* | (2006.01) | |
| *F16D 48/02* | (2006.01) | |

(52) U.S. Cl.
CPC .......... *F16D 25/065* (2013.01); *F16D 13/16* (2013.01); *F16D 25/14* (2013.01); *F16D 48/02* (2013.01);
(Continued)

(58) Field of Classification Search
CPC ........ F16D 25/065; F16D 25/14; F16D 13/16; F16D 27/102; F16D 28/00; F16D 29/00–005; F16D 48/06–10
See application file for complete search history.

(56) References Cited

U.S. PATENT DOCUMENTS

| | | |
|---|---|---|
| 1,372,984 A | 3/1921 | Sundh |
| 2,255,738 A | 9/1941 | Barkeij |

(Continued)

FOREIGN PATENT DOCUMENTS

| | | |
|---|---|---|
| CN | 2290495 Y | 9/1998 |
| EP | 3011206 A1 | 4/2016 |

(Continued)

OTHER PUBLICATIONS

Abaitancei, "Pressure Wave Based Fluid Power Propulsion System," U.S. Appl. No. 62/496,784, filed Oct. 28, 2016, 3 pages.

(Continued)

*Primary Examiner* — David R Morris
(74) *Attorney, Agent, or Firm* — Haley Guiliano LLP

(57) ABSTRACT

A hydraulic transformer clutch employs radial hydraulic piston assemblies with integrated electrohydraulic actuation. The hydraulic transformer clutch includes: an output shaft, an output disc affixed to the output shaft for rotation therewith, an input shaft, a rotatable housing affixed to one of the input shaft or the output shaft for rotation therewith, a plurality of hydraulic cylinders, and a plurality of working pistons. The hydraulic cylinders are operatively connected to the rotatable housing, and are spaced about the rotatable housing. Each working piston is slidably mounted within a corresponding hydraulic cylinder of the plurality of hydraulic cylinders, and is positioned to be selectively pushed, when actuated, to create a rigid connection between the input shaft and the output shaft. One or more actuator pistons are pushed by an electromagnet and create pressure that is distributed on working piston surfaces and generates active torque.

8 Claims, 50 Drawing Sheets

(52) U.S. Cl.
CPC ............... *F16D 2048/0203* (2013.01); *F16D 2048/0215* (2013.01); *F16D 2048/0227* (2013.01)

(56) References Cited

U.S. PATENT DOCUMENTS

| | | | |
|---|---|---|---|
| 2,436,947 A | 3/1948 | Vergne | |
| 2,719,620 A | 10/1955 | McDonald | |
| 5,094,331 A | 3/1992 | Fujimoto et al. | |
| 5,495,912 A | 3/1996 | Gray et al. | |
| 5,638,929 A | 6/1997 | Park | |
| 7,097,019 B2* | 8/2006 | Ronk | F16D 29/00 192/84.91 |
| 7,182,194 B2* | 2/2007 | Ronk | F15B 15/18 192/85.24 |
| 7,506,740 B2* | 3/2009 | Ronk | F16D 29/00 180/233 |
| 7,588,133 B2* | 9/2009 | Ronk | F16D 29/00 192/84.2 |
| 10,337,564 B2* | 7/2019 | Ohr | F16D 13/16 |
| 10,378,596 B2* | 8/2019 | Lee | F16D 13/16 |
| 2005/0130789 A1 | 6/2005 | Samie et al. | |
| 2006/0042906 A1* | 3/2006 | Ronk | F16D 29/005 192/85.63 |
| 2006/0042908 A1* | 3/2006 | Ronk | F16D 48/066 192/85.63 |
| 2006/0278492 A1* | 12/2006 | Ronk | F16D 48/066 192/84.91 |
| 2006/0278493 A1* | 12/2006 | Ronk | F16D 29/00 192/85.24 |
| 2008/0081724 A1 | 4/2008 | Ivantysynova et al. | |
| 2010/0063693 A1 | 3/2010 | Lee et al. | |
| 2010/0063698 A1 | 3/2010 | Lee et al. | |
| 2011/0303049 A1 | 12/2011 | Neelakantan et al. | |
| 2012/0048044 A1 | 3/2012 | Hyun | |
| 2012/0100947 A1 | 4/2012 | Samie et al. | |
| 2012/0138411 A1 | 6/2012 | Samie et al. | |
| 2013/0017915 A1 | 1/2013 | Miyata | |
| 2015/0239343 A1 | 8/2015 | Janasek et al. | |
| 2016/0114668 A1 | 4/2016 | Zhang et al. | |
| 2016/0215830 A1 | 7/2016 | Hattori | |
| 2017/0089402 A1 | 3/2017 | Deakin et al. | |
| 2018/0180108 A1* | 6/2018 | Ohr | F16D 27/10 |
| 2018/0238396 A1* | 8/2018 | Lee | F16D 15/00 |
| 2020/0040948 A1 | 2/2020 | Abaitancei et al. | |
| 2020/0158195 A1* | 5/2020 | Kunzig | F16D 25/12 |
| 2021/0129805 A1 | 5/2021 | Abaitancei et al. | |
| 2021/0348676 A1 | 11/2021 | Abaitancei et al. | |

FOREIGN PATENT DOCUMENTS

| | | |
|---|---|---|
| GB | 816945 A | 7/1959 |
| GB | 833630 A | 4/1960 |
| WO | 2010144753 | 12/2010 |
| WO | 2014142016 | 9/2014 |
| WO | 2018/081651 | 5/2018 |

OTHER PUBLICATIONS

Abaitancei, "Variable Sonic Resonator for Fluid Power Applications," U.S. Appl. No. 62/498,336, filed Dec. 21, 2016, 2 pages.
Abaitancei, "Fluid Power Pressure Wave Pump/Motor (FPPWPM)," U.S. Appl. No. 62/498,337, filed Dec. 21, 2016, 3 pages.
Abaitancei, "Thermo-Hydraulic Propulsion System," U.S. Appl. No. 62/498,338, filed Dec. 21, 2016, 1 page.
Abaitancei, "Continuous Convection Heat Exchanger," U.S. Appl. No. 62/498,347, filed Dec. 21, 2016, 4 pages.
Abaitancei, "Hybrid Energy Recovery System for Vehicle Applications," U.S. Appl. No. 62/498,348, filed Dec. 21, 2016, 2 pages.
Abaitancei, "Hydraulic-Actuated Piston Clutch," U.S. Appl. No. 62/498,349, filed Dec. 21, 2016, 5 pages.
Abaitancei et al., "Integrated Brake and Thermal Energy Recovery System," U.S. Appl. No. 15/731,267, filed May 15, 2017, 67 pages.
Abaitancei et al., "Radial Hydraulic Piston Actuated Torque Transfer Device," U.S. Appl. No. 15/731,271, filed May 15, 2017, 19 pages.
Abaitancei et al., "Thermo-Hydraulic Pressure Wave Based Propulsion System," U.S. Appl. No. 15/731,360, filed Jun. 1, 2017, 51 pages.
Abaitancei et al., "Axial Piston Variable Displacement Hydraulic Rotational Unit With Integrated Propulsion Shaft," U.S. Appl. No. 15/731,383, filed Jun. 5, 2017, 69 pages.
Abaitancei et al., "Hybrid Kinematic Hydraulic Transmission for Use With an Integrated Brake Energy Recovery System," U.S. Appl. No. 62/605,283, filed Aug. 7, 2017, 6 pages.
Abaitancei et al., "Radial Offset Hydraulic Piston Torque Transfer System," U.S. Appl. No. 62/605,291, filed Aug. 7, 2017, 7 pages.
Abaitancei et al., "Integrated Hybrid Energy Conversion and Storage System," U.S. Appl. No. 62/606,511, filed Sep. 26, 2017, 70 pages.
Abaitancei et al., "Integrated Renewable Energy and Waste Heat Harvesting System," U.S. Appl. No. 62/606,521, filed Sep. 26, 2017, 12 pages.
Abaitancei et al., "Brake Energy Active Recovery System for Vehicles," U.S. Appl. No. 62/606,522, filed Sep. 26, 2017, 59 pages.
Abaitancei et al., "Hydraulic Accumulator," U.S. Appl. No. 62/577,630, filed Oct. 26, 2017, 48 pages.
Abaitancei et al., "Fluid Thermal Unit," U.S. Appl. No. 62/580,360, filed Nov. 1, 2017, 29 pages.
Abaitancei et al., "Gearbox With Integrated Brake Energy Recovery System," U.S. Appl. No. 62/584,650, filed Nov. 10, 2017, 30 pages.
Abaitancei et al., "Radial Hydraulic Piston-Actuated Torque Transfer Device," U.S. Appl. No. 62/598,364, filed Dec. 13, 2017, 51 pages.
Abaitancei, "Offset Radial Piston-Actuated Torque Transfer Device," U.S. Appliction No. U.S. Appl. No. 62/598,366, filed Dec. 13, 2017, 64 pages.
Abaitancei et al., "Hydraulic Clutches, Gearboxes, Transmissions, Energy Recovery Systems, Mechanical One Way Clutches, Mechanical Diodes, and Variable Friction Clutches," U.S. Appl. No. 62/646,782, filed Mar. 22, 2018, 107 pages.
Extended European Search Report for European Patent Application No. 19770269.9, dated Nov. 26, 2021 (7 pages).

\* cited by examiner

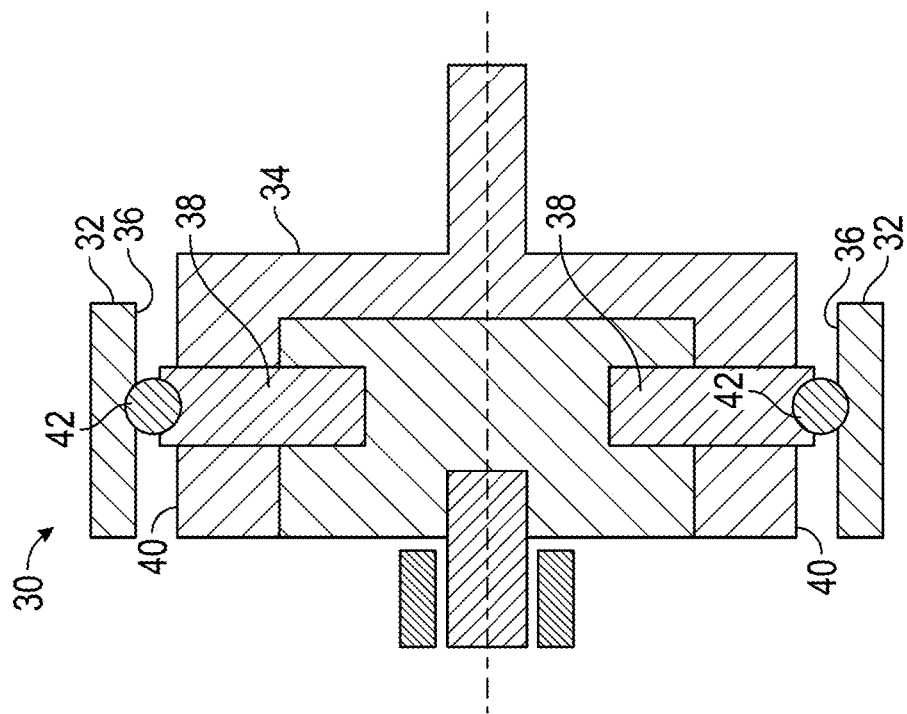
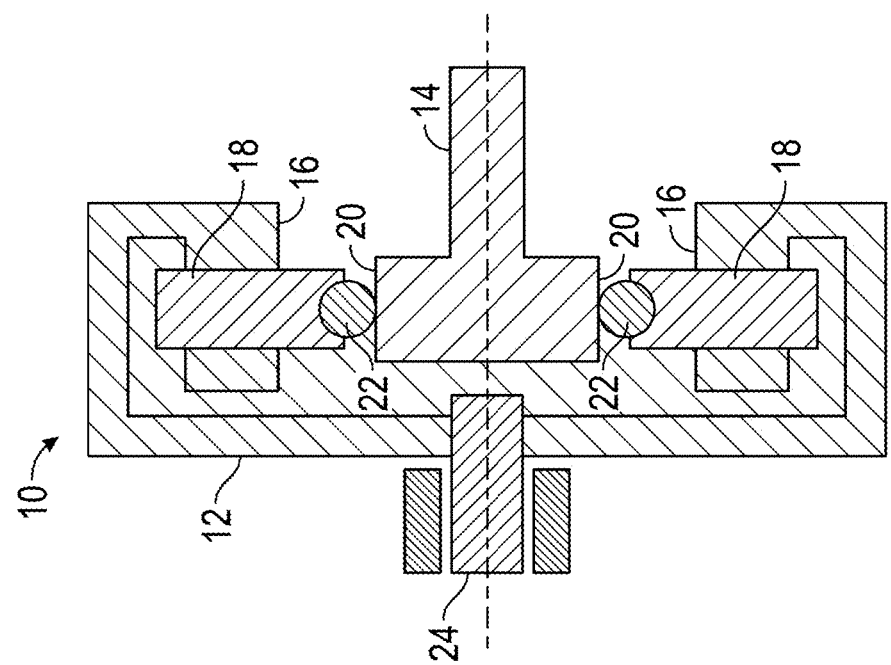

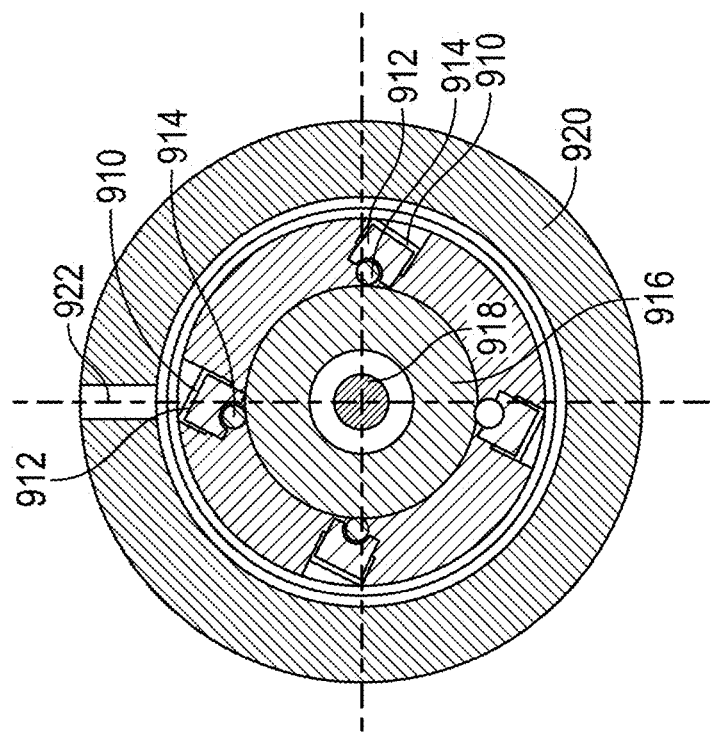
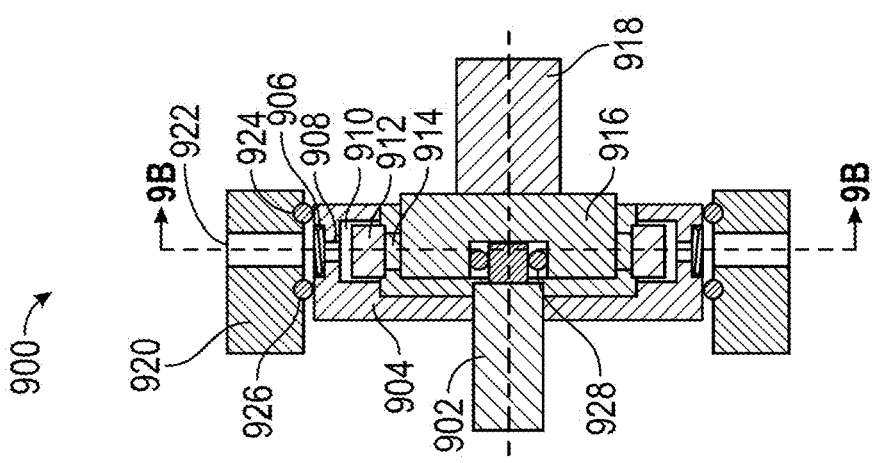

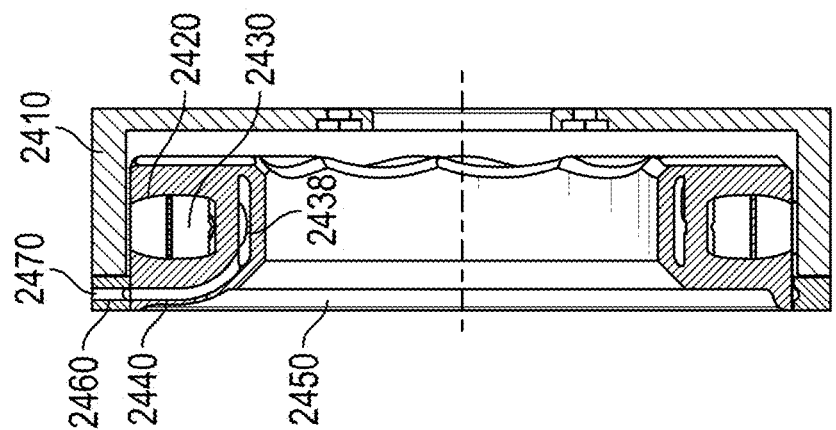
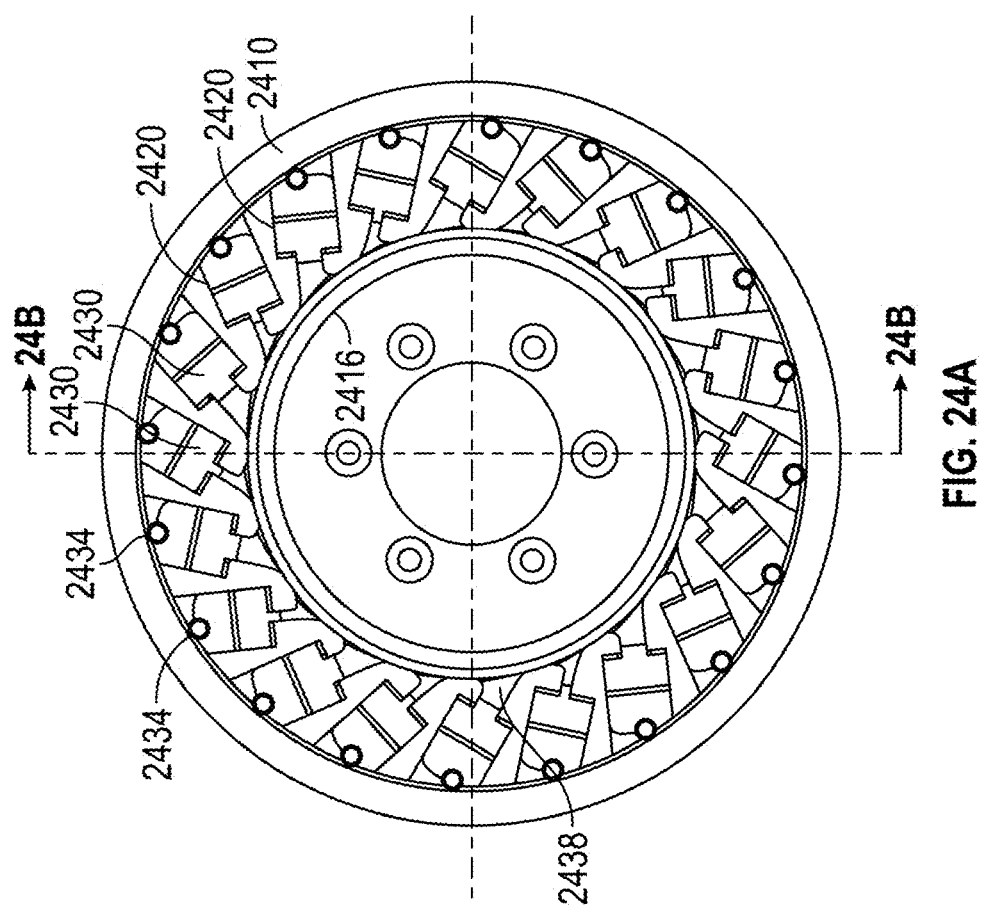

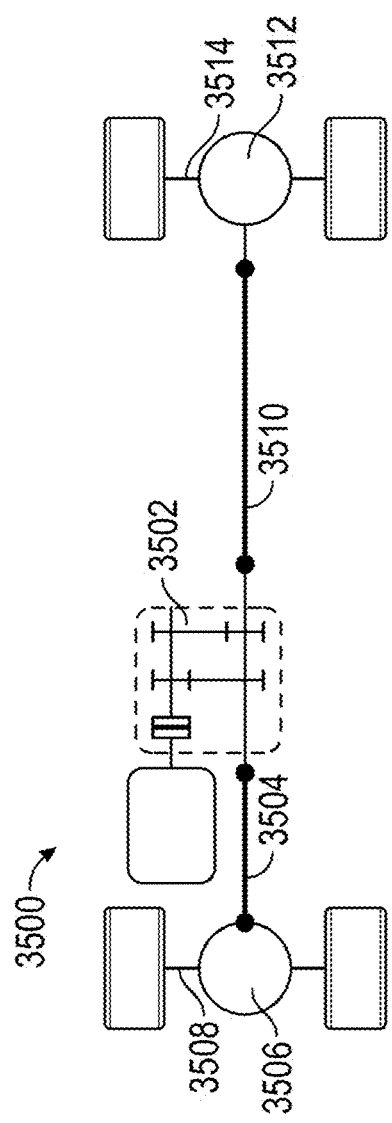
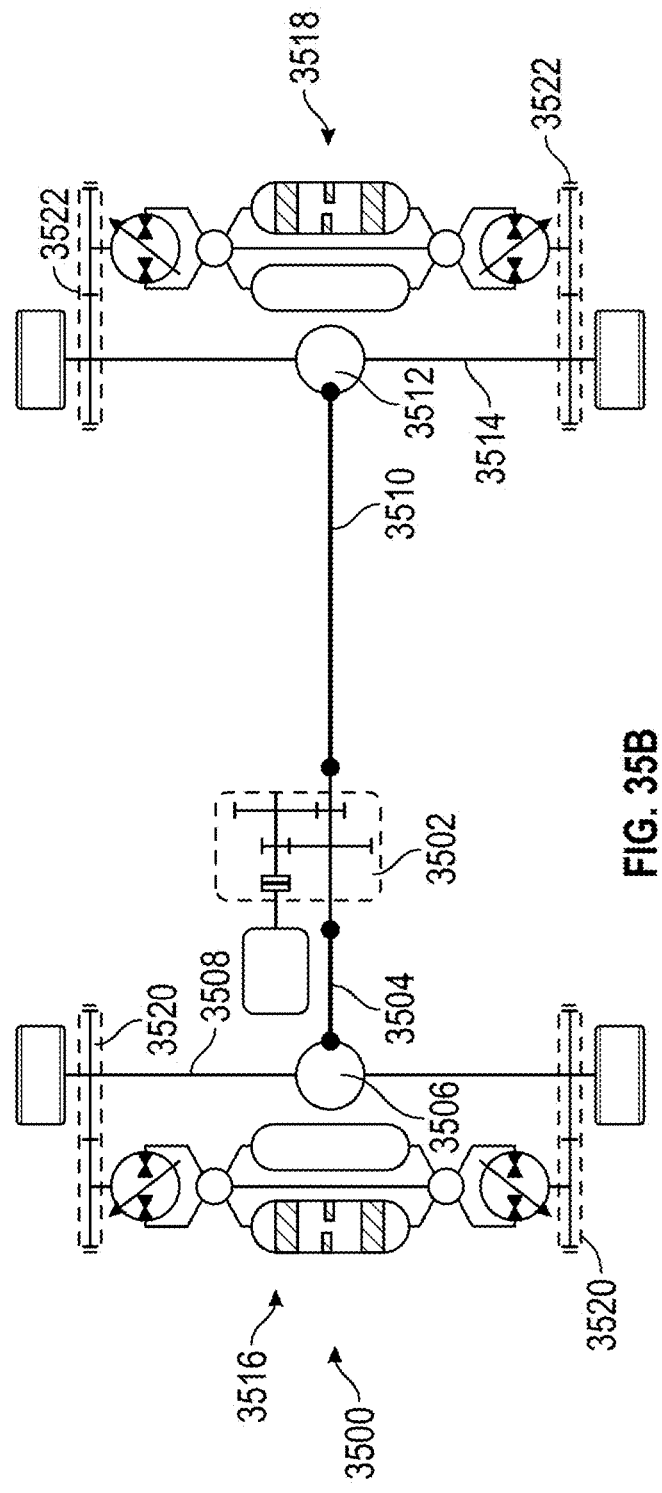
FIG. 35A
FIG. 35B

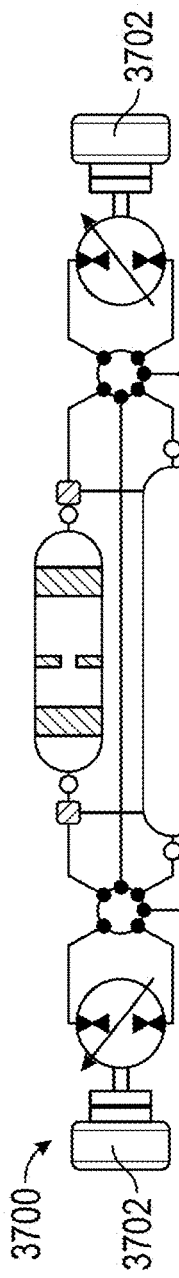
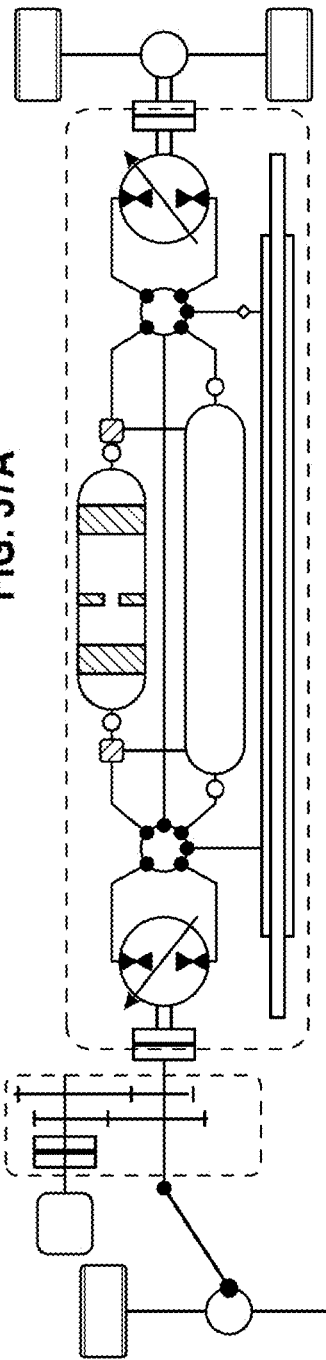
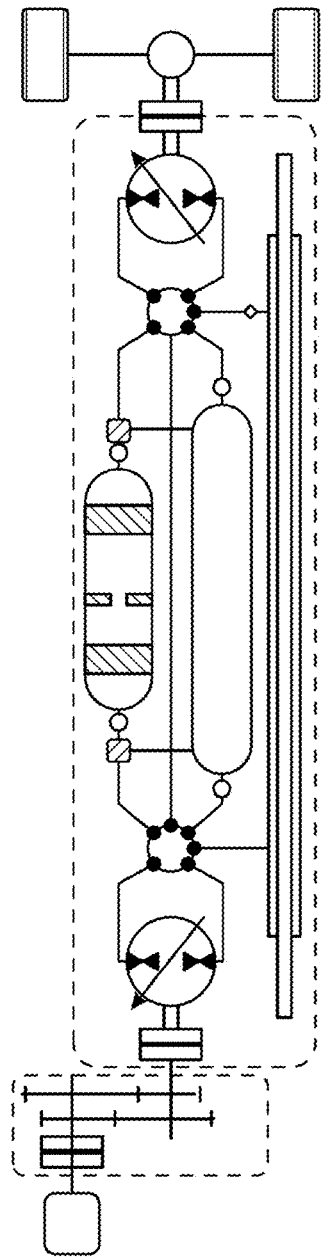
FIG. 37A
FIG. 37B
FIG. 37C

SYSTEM AND METHOD FOR HYDRAULIC TRANSFORMER CLUTCHES

TECHNICAL FIELD

The present disclosure relates to hydraulic transformer coupling components for automobiles and other wheeled vehicles.

BACKGROUND

Description of the Related Art

Relatively simple hydraulic systems have been used for thousands of years and throughout the history of civilization, such as for irrigation and the provision of mechanical power using, for example, water wheels. In modern times, hydraulic systems have become increasingly sophisticated, and are used in a wide variety of industries for a wide variety of purposes. In general, hydraulic systems use liquids, and particularly pressurized liquids, to generate, control, and transmit mechanical power.

A clutch is a mechanical device which engages and disengages power transmission from a driving shaft to a driven shaft. In order to transfer torque from an internal combustion engine to a vehicle transmission, a clutch is required to engage and interrupt torque transmission when necessary based on the operating conditions of the vehicle. Dry clutches in one or more configurations are often used to increase the transfer surface. Complexity, torque ripple and actuation frequently associated with wear due to dry friction are a few reasons for the continuing development of clutches.

Motorcycles typically employ a wet clutch, with the clutch positioned in the same oil as the transmission. These clutches usually comprise a stack of alternating plain steel and friction plates. Some plates include lugs on their inner surfaces that lock them to the engine crankshaft. Wet clutches have a large engagement threshold, assuring a smooth engagement, and have higher durability and lower noise.

A dual clutch transmission (DCT) (sometimes referred to as a twin-clutch transmission) is a type of automatic transmission or automated automotive transmission. A dual clutch transmission provides automatic control, avoiding the use of an energy inefficient torque converter of typical automatic transmissions. A dual clutch transmission uses a pair of clutches, one clutch engaging odd-numbered gear sets and the other clutch engaging even-numbered gear sets. A dual clutch transmission can fundamentally be described as two separate manual transmissions (with their respective clutches) contained within one housing, and working as a single unit. A dual clutch transmission is usually operated in a fully automatic mode, providing a smooth and fast engagement of the active gear sets, well beyond the shifting capabilities of an operator. A dual clutch transmission also allows the vehicle operator to manually shift gears in semiautomatic mode. However, the structure of the transmission is complex, and thus expensive.

Dual clutch transmissions use two fundamentally different types of clutches: either two wet multi-plate clutches, bathed in oil (for cooling), or two dry single-plate clutches. The wet clutch design is generally used for higher torque engines, whereas the dry clutch design is generally more suitable for smaller vehicles with lower torque outputs. However, while the dry clutch variants may be limited in torque compared to their wet clutch counterparts, the dry clutch versions offer an increase in fuel efficiency, due to the lack of pumping losses of the transmission fluid in the clutch housing. Wet clutches generally have a wide engagement threshold and are easy to use, assuring a smooth engagement with a higher durability and lower noise than dry clutch variations.

Currently, three variations of clutch installation are generally used. A first variation uses a concentric arrangement, where both clutches share the same plane when viewed perpendicularly from the transmission input shaft, along the same centerline as the engine crankshaft. In order to actuate them separately, one of the clutches must be larger in diameter than the other. As a result, different forces and control requirements apply for the two clutches. A second variation uses a side-by-side arrangement of two identically sized clutches around the rotational axis of the crank shaft, which increases space requirements. A third variation also uses two separate but identically-sized clutches arranged side-by-side when viewed head-on (along the length of the input shaft and crankshaft centerline), and also share the same plane when viewed perpendicularly. This clutch arrangement (unlike the other two variations) requires an additional gear set to assure the same rotational direction of the output shaft.

The current operation of dual clutch transmissions has a number of disadvantages, including different drag torques in subsequent gear ratios, manufacturing cost, and the amount of drag torque. Based on manufacturing limitations, current solutions are not scalable. In order to obtain a different transmission torque, the clutch must be resized.

Accordingly, technological improvements of the present disclosure involve overcoming the above shortcomings of the prior art, including overcoming limitations related to configuration/assembly, cost, reduced drag torque and differentiating drag torque for the different transmission gears involved.

BRIEF SUMMARY

A hydraulic transformer clutch employs radial hydraulic piston assemblies with integrated electrohydraulic actuation. The hydraulic transformer clutch includes: an output shaft, an output disc affixed to the output shaft for rotation therewith, an input shaft, a rotatable housing affixed to one of the input shaft or the output shaft for rotation therewith, a plurality of hydraulic cylinders, and a plurality of pistons. The hydraulic cylinders are operatively connected to the rotatable housing, and are spaced about the rotatable housing. Each piston is slidably mounted within a corresponding hydraulic cylinder of the plurality of hydraulic cylinders, and is positioned to be selectively pushed, when actuated, to create a rigid connection between the input shaft and the output shaft. One or more actuator pistons are pushed by an electromagnet and create pressure that is distributed on piston surfaces and generates active torque.

The hydraulic transformer clutch may further comprise a plurality of rotating engagement elements, each rotating engagement element of the plurality of rotating engagement elements associated with a piston of the plurality of pistons, wherein the plurality of rotating engagement elements engage the output disc when actuated. The hydraulic transformer clutch may further comprise a hydraulic system operatively associated with the hydraulic cylinders and pistons, wherein the hydraulic system enables actuation and de-actuation of the pistons in the hydraulic cylinders, wherein actuation of the pistons in the hydraulic cylinders couples the input shaft to the output shaft and de-actuation of the pistons in the hydraulic cylinders decouples the input shaft from the output shaft.

Each hydraulic cylinder of the plurality of hydraulic cylinders may be positioned at a substantially constant offset angle relative to radial directions of the input shaft and the output shaft. The hydraulic transformer clutch may further comprise a hydraulic variable displacement pump that is operatively associated with each hydraulic cylinder and piston. The hydraulic transformer clutch may further comprise directional control valves that use hydraulic fluid to selectively urge each piston to be pushed towards the output disc when actuated.

The hydraulic transformer clutch may further comprise a hydraulic accumulator that is operatively associated with the hydraulic variable displacement pump and directional control valves, wherein the hydraulic accumulator reduces oscillations in the hydraulic transformer clutch during actuation. The hydraulic transformer clutch may further comprise a pressure relief valve that protects against pressure overloads. The hydraulic transformer clutch may be incorporated into an automotive transmission.

A hydraulic transformer clutch system employs axial hydraulic piston assemblies with integrated electrohydraulic actuation. The hydraulic transformer clutch system includes: an output shaft, an output disc affixed to the output shaft for rotation therewith, an input shaft, a rotatable housing affixed to the input shaft for rotation therewith, a plurality of hydraulic cylinders, a plurality of working pistons, and at least one actuation piston. The plurality of hydraulic cylinders are operatively connected to the rotatable housing, positioned in an axial configuration, and spaced about the rotatable housing. Each working piston of the plurality of working pistons is slidably mounted within a corresponding hydraulic cylinder of the plurality of hydraulic cylinders. Additionally, each working piston of the plurality of working pistons is positioned to be selectively pushed, when actuated, towards the output disc and to create a rigid connection between the input shaft and the output shaft. The at least one actuation piston is urged by a solenoid plate that includes an electromagnet solenoid. When an electric current passes the electromagnet solenoid, a generated electromagnetic force pushes the solenoid plate towards a coupling housing, and the at least one actuation piston generates, via displaced volume, a pressure increase inside a working space associated with the plurality of working pistons.

The hydraulic transformer clutch system may further comprise: roller engagement elements located outwardly of the pistons, wherein the hydraulic fluid urges the roller engagement elements into engagement with the input ring, the engagement of the roller engagement elements with the input ring causing the output body to move in unison with the input ring. The roller engagement elements may be cylindrical. The output body arms may be angularly disposed with respect to one another at substantially equal angles. At least two hydraulic cylinders and associated pistons of the plurality of hydraulic cylinders and associated pistons may be disposed at a radially outward end of each of the output body arms.

The hydraulic transformer clutch system may further comprise: a gear ring extending radially outwardly from the input ring for selective engagement with an electric motor/generator. The hydraulic transformer clutch system may further comprise: a hydraulic system operatively associated with the hydraulic cylinders and pistons, wherein the hydraulic system enables actuation and de-actuation of the pistons in the hydraulic cylinders, wherein the actuation of the pistons in the hydraulic cylinders couples the input shaft to the output body and the de-actuation of the pistons in the hydraulic cylinders decouples the input shaft from the output body. The hydraulic transformer clutch system may further comprise: a hydraulic variable displacement pump that is operatively associated with each hydraulic cylinder and associated piston.

The hydraulic transformer clutch system may further comprise directional control valves that use the hydraulic fluid to selectively urge each piston to be pushed towards the output body when actuated. The hydraulic transformer clutch system may further comprise a hydraulic accumulator that is operatively associated with the hydraulic variable displacement pump and directional control valves, wherein the hydraulic accumulator provides intermediate control of the hydraulic transformer clutch system by damping oscillations in the hydraulic transformer clutch system during actuation. The hydraulic transformer clutch system may be incorporated into an automotive transmission.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been selected solely for ease of recognition in the drawings.

FIG. 1A illustrates a clutch with radial actuation and exterior feeding, according to at least one illustrated embodiment.

FIG. 1B illustrates a clutch with radial actuation and interior feeding, according to at least one illustrated embodiment.

FIG. 9A illustrates a schematic view of the radial hydraulic piston-actuated torque transfer device, according to at least one illustrated embodiment.

FIG. 9B illustrates a sectional view along the plane A-A of FIG. 9A, according to at least one illustrated embodiment.

FIG. 24A illustrates a front view of the multiple piston torque transfer device shown in FIG. 23, according to at least one illustrated embodiment.

FIG. 24B illustrates a side view of the multiple piston torque transfer device shown in FIG. 23, according to at least one illustrated embodiment.

FIG. 35A illustrates a drive system of an automobile, according to at least one illustrated embodiment.

FIG. 35B illustrates brake energy recovery systems coupled to each of the axles of the drive system illustrated in FIG. 35A, according to at least one illustrated embodiment.

FIG. 37A illustrates a brake energy recovery system, including a thermal energy recovery subsystem, in place of an axle of a drive system of an automobile, according to at least one illustrated embodiment.

FIG. 37B illustrates a brake energy recovery system, including a thermal energy recovery subsystem, in place of a drive shaft of an all-wheel drive system, according to at least one illustrated embodiment.

FIG. 37C illustrates a brake energy recovery system, including a thermal energy recovery subsystem, in place of a drive shaft of a rear-wheel drive system, according to at least one illustrated embodiment.

DETAILED DESCRIPTION

Figure 1C:
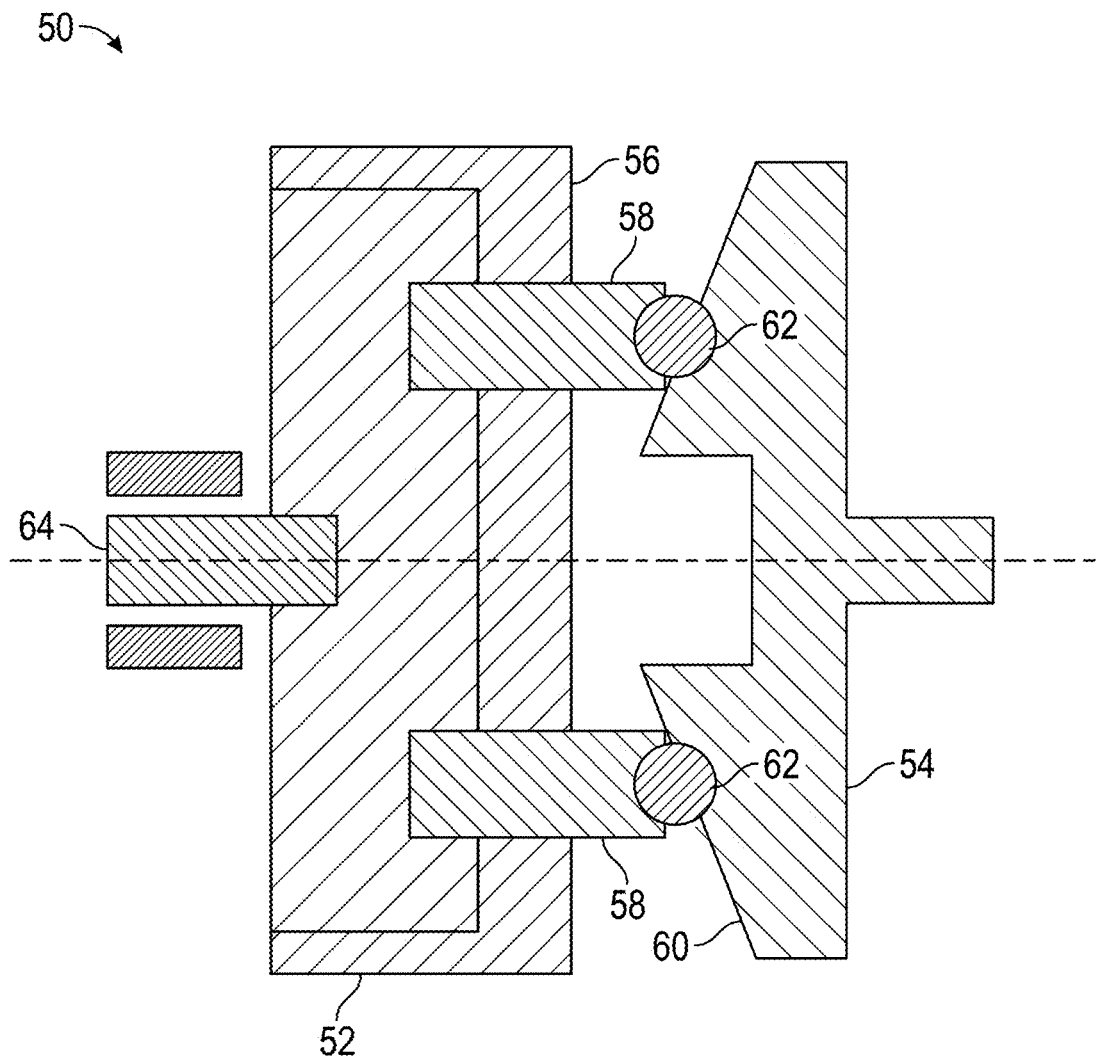
FIG. 1C illustrates a clutch with axial actuation, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, un-recited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

In some embodiment of the Hydraulic Transformer Clutch system with integrated electrohydraulic actuation, one or more actuator pistons are pushed by an electromagnet and create pressure that is distributed on working piston surfaces, which generates active force that in turn generates active torque. Several different embodiments of the Hydraulic Transformer Clutch system are described below.

FIG. 1A illustrates a clutch with radial actuation and exterior feeding 10, according to at least one illustrated embodiment. The clutch with radial actuation and exterior feeding 10 includes a larger inlet drive and housing 12 and a smaller outlet drive 14. In this embodiment, the inlet drive and housing 12 includes an outer rim 16 with a plurality of inwardly facing hydraulic pistons 18 mounted thereto. In this embodiment, the outlet drive 14 includes an inner rim 20 with an outer surface. The hydraulic pistons 18 each include inwardly facing engagement elements 22 (which can be wheels) that contact the outer surface of the inner rim 20 of the smaller outlet drive 14. The hydraulic pistons 18 are pushed by the electromagnet 24 and create pressure on working piston surfaces.

One of the technological improvements provided by this embodiment is the torque density that is achieved by this configuration. Potential drawbacks that are associated with this configuration include the shape of the pistons and that due to the pressure created by the undesirable inertial force of the pistons, the solenoid will be approximately twenty percent larger.

FIG. 1B illustrates a clutch with radial actuation and interior feeding 30, according to at least one illustrated embodiment. The clutch with radial actuation and interior feeding 30 includes a smaller inlet drive 32 and a larger outlet drive and housing 34. In this embodiment, the inlet drive 32 includes an outer rim 36 with an inner surface. In this embodiment, the outlet drive and housing 34 includes an inner rim 40 with an outer surface. The inner rim 40 of the outlet drive 34 includes a plurality of outwardly facing hydraulic pistons 38 mounted thereto. The hydraulic pistons 38 each include outwardly facing engagement elements 42, (which can be wheels) that contact with inner surface of the outer rim 36 of the smaller inlet drive 32. The hydraulic pistons 38 are pushed by the electromagnet 44 and create pressure on working piston surfaces.

One of the technological improvements provided by this embodiment is the torque density that is achieved by this configuration. Potential drawbacks that are associated with this configuration include the shape of the pistons and that due to the pressure created by the large undesirable inertial force of the pistons, the clutch cannot be decoupled beyond approximately 10,000 RPMs. As a result, additional compensation mechanisms are employed in this configuration.

FIG. 1C illustrates a clutch with axial actuation 50, according to at least one illustrated embodiment. The axial actuation clutch 50 includes a large inlet drive 52 and a large outlet drive 54. In this embodiment, the inlet drive 52 includes an axial rim 56 with a plurality of axially facing hydraulic pistons 58 mounted thereto. In this embodiment, the outlet drive 54 includes an angled axially rim 60 with an angled surface. The hydraulic pistons 58 each include axially facing engagement elements 62, (which can be wheels) that contact with the angled surface of the angled axially rim 60 of the outlet drive 54. The hydraulic pistons 58 are pushed by the electromagnet 64 and create pressure on working piston surfaces.

Some of the technological improvements provided by this embodiment are the torque density that is achieved by this configuration, the shape of the pistons, and the fact that the pistons are not influenced by inertial forces.

Figure 1D:
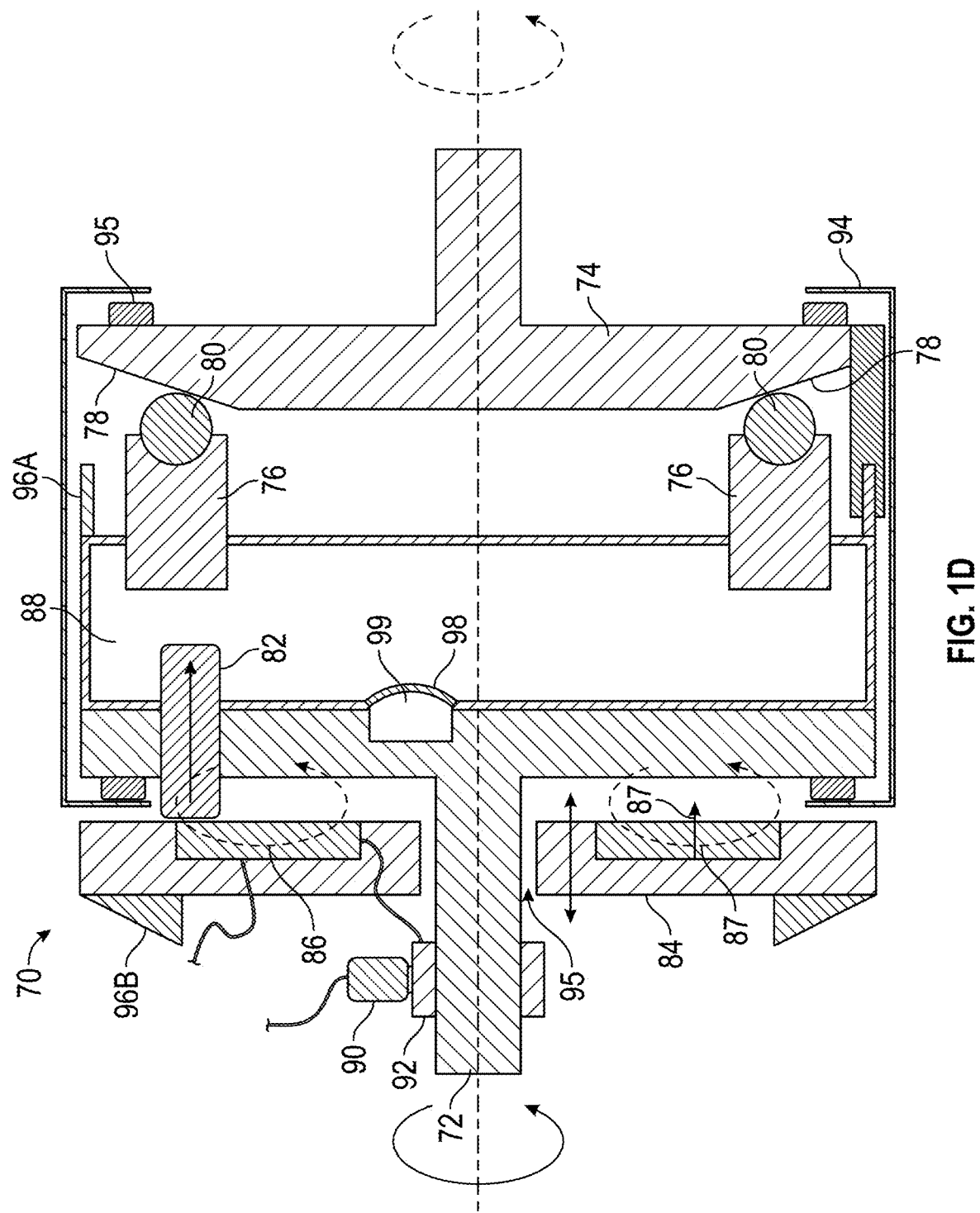
FIG. 1D illustrates an integrated actuator and coupling device, according to at least one illustrated embodiment.

FIG. 1D illustrates an integrated actuator and coupling device 70, according to at least one illustrated embodiment. In this embodiment, the integrated actuator and coupling device 70 acts as a hydraulic force amplifier that is actuated electromagnetically. The integrated actuator and coupling device 70 includes a large inlet shaft 72 and a large output race with driven shaft 74. In this embodiment, the inlet shaft 72 is associated with a coupling housing that includes an axial edge with a plurality of axially facing hydraulic working pistons 76 mounted thereto. In this embodiment, the large output race with driven shaft 74 includes an angled axially rim 78 with an angled surface. The hydraulic pistons 76 each include axially facing engagement elements 80, (which can be wheels or other rolling elements) that contact with the angled surface of the angled axially rim 78 of the large output race with driven shaft 74.

Actuation pressure is generated using the hydraulic transformer concept (i.e., the Pascal principle) in which a small diameter piston is actuated with low force. This action generates pressure that is distributed on the working piston surfaces, and consequently amplifies the actuation force transferred by piston and roller to the output race and driven shaft.

The actuation piston 82 is moved by a solenoid plate 84 containing a solenoid 86. When an electric current passes through the solenoid 86, the generated electromagnetic force 87 pushes the solenoid plate 84 towards the coupling housing, and the attached actuation piston 82 generates, via the displaced volume, a pressure increase inside the working space 88. The electrical energy supply of the rotating solenoid 86 is done using the electrical fixed contact element 90 that is in touch with the contact race 92. The coupling fixed housing 94 is supported against the moving disc by gliding bearings 95 that compensate for axial forces. Splashing blades 96A create an oil fog to lubricate rollers and output race. In another aspect, cooling blades 96B support the solenoid waste of heat dissipation. In still another aspect, a spring element 98 is enclosed into a damping cavity 99 to assure maximum pressure.

Figure 1E:
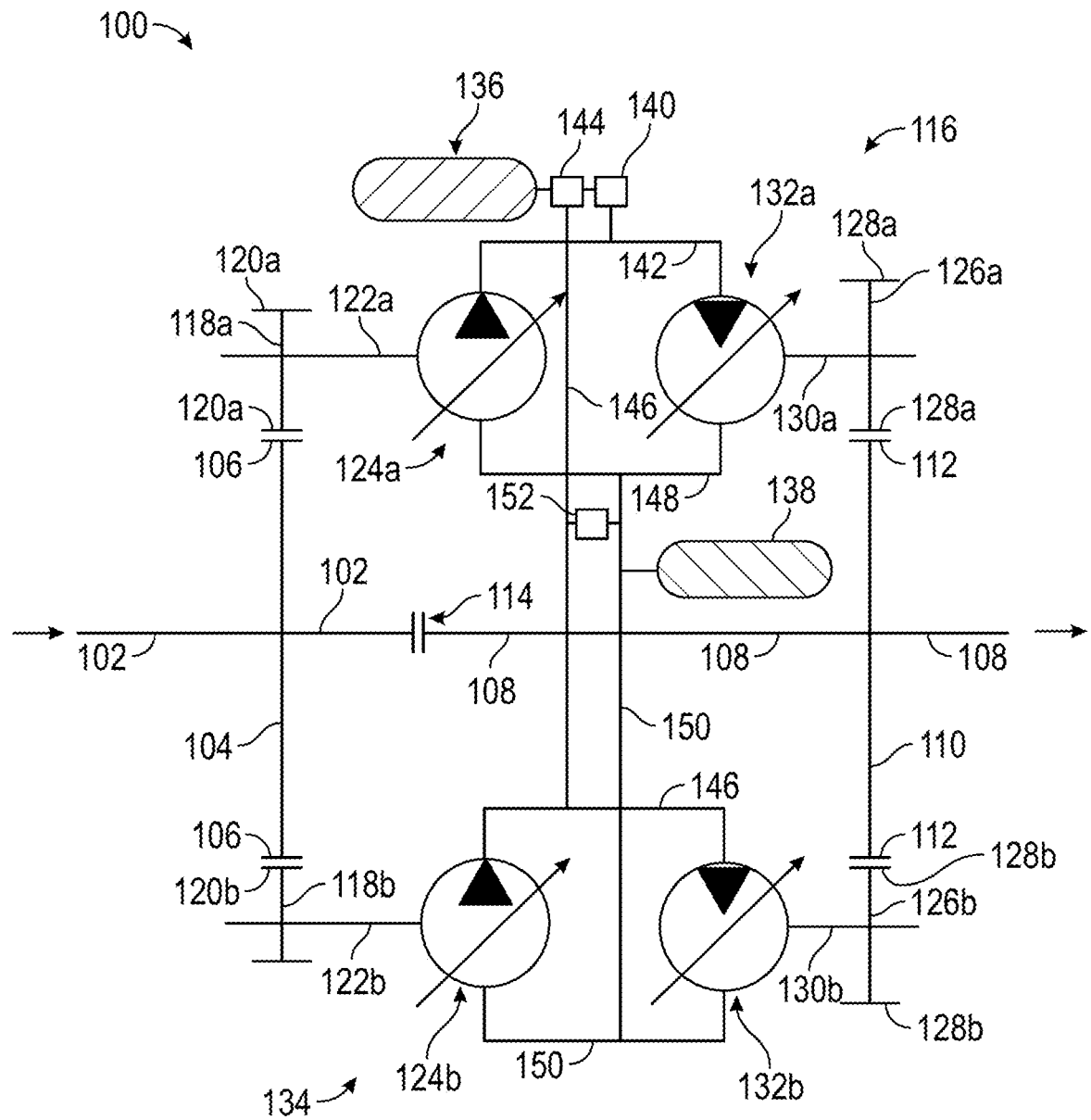
FIG. 1E illustrates a schematic diagram of an automotive transmission including a brake energy recovery system, according to at least one illustrated embodiment.

FIG. 1E illustrates an automotive transmission 100. Transmission 100 includes a primary drive shaft 102, which is driven by an internal combustion engine, electric motor, hydraulic propulsion system, or other suitable torque or power source. The primary drive shaft 102 is rigidly coupled to a primary drive gear 104 having primary drive gear teeth 106. Transmission 100 also includes a primary driven shaft 108, which drives a mechanical device or system such as the wheels of an automobile. The primary driven shaft 108 is rigidly coupled to a primary driven gear 110 having primary driven gear teeth 112.

Power is transmitted through the transmission 100 from the primary drive shaft 102 and the primary drive gear 104 to the primary driven gear 110 and the primary driven shaft 108 in one or more of three independent ways, depending on the operation of the transmission 100. First, the transmission 100 includes a clutch 114 that can be engaged to directly and rigidly couple the primary drive shaft 102 to the primary driven shaft 108, so that the primary drive shaft 102 is mechanically locked to the primary driven shaft 108 and so that the primary driven shaft 108 turns at the same speed as the primary drive shaft 102. The clutch 114 can also be disengaged to de-couple the primary drive shaft 102 from the primary driven shaft 108, so that the primary drive shaft 102 is not mechanically locked to the primary driven shaft 108. The clutch 114 has a structure matching or similar to that of the clutch 200 described herein.

Second, the transmission 100 includes a first hydraulic power transfer system 116 that is used to transfer power or torque hydraulically from the primary drive shaft 102 and primary drive gear 104 to the primary driven gear 110 and primary driven shaft 108. The first hydraulic power transfer system 116 includes a secondary drive gear 118a having secondary drive gear teeth 120a meshed with the primary drive gear teeth 106. The secondary drive gear 118a is rigidly coupled to a secondary drive shaft 122a, which is coupled to a hydraulic pump 124a. Rotation of the secondary drive shaft 122a actuates operation of the hydraulic pump 124a, such as to increase a pressure of a hydraulic fluid or to create a hydraulic fluid pressure differential.

The first hydraulic power transfer system 116 also includes a secondary driven gear 126a having secondary driven gear teeth 128a meshed with the primary driven gear teeth 112. The secondary driven gear 126a is rigidly coupled to a secondary driven shaft 130a, which is coupled to a hydraulic motor 132a. The motor 132a is actuated to operate by the provision of a relatively high-pressure hydraulic fluid, or a hydraulic fluid pressure differential, to drive rotation of the secondary driven shaft 130a and the secondary driven gear 126a. The hydraulic pump 124a is hydraulically coupled to the hydraulic motor 132a, so that the pressurized hydraulic fluid generated by the hydraulic pump 124a is used to drive operation of the hydraulic motor 132a. In some implementations, the hydraulic pump 124a has the same or a similar structure as the hydraulic motor 132a, which is a vane-type hydraulic motor, however the hydraulic pump 124a operates in reverse of the hydraulic motor 132a.

Third, the transmission 100 includes a second hydraulic power transfer system 134 that is used to transfer power or torque hydraulically from the primary drive shaft 102 and primary drive gear 104 to the primary driven gear 110 and primary driven shaft 108. The second hydraulic power transfer system 134 includes a secondary drive gear 118b having secondary drive gear teeth 120b meshed with the primary drive gear teeth 106. The secondary drive gear 118b is rigidly coupled to a secondary drive shaft 122b, which is coupled to a hydraulic pump 124b. Rotation of the secondary drive shaft 122b actuates operation of the hydraulic pump 124b, such as to increase a pressure of a hydraulic fluid or to create a hydraulic fluid pressure differential.

The second hydraulic power transfer system 134 also includes a secondary driven gear 126b having secondary driven gear teeth 128*b* meshed with the primary driven gear teeth 112. The secondary driven gear 126*b* is rigidly coupled to a secondary driven shaft 130*b*, which is coupled to a hydraulic motor 132*b*. The motor 132*b* is actuated to operate by the provision of a relatively high-pressure hydraulic fluid, or a hydraulic fluid pressure differential, to drive rotation of the secondary driven shaft 130*b* and the secondary driven gear 126*b*. The hydraulic pump 124*b* is hydraulically coupled to the hydraulic motor 132*b*, so that the pressurized hydraulic fluid generated by the hydraulic pump 124*b* is used to drive operation of the hydraulic motor 132*b*. In some implementations, the hydraulic pump 124*b* has the same or a similar structure as the hydraulic motor 132*b*, which is a vane-type hydraulic motor, however the hydraulic pump 124*b* operates in reverse of the hydraulic motor 132*b*.

The transmission 100 also includes a high-pressure accumulator 136 and a low-pressure accumulator 138. As illustrated in FIG. 1E, the high-pressure accumulator 136 is hydraulically coupled by a first valve 140 and a first series of hydraulic conduits 142 to an output of the hydraulic pump 124*a* and to an input of the motor 132*a*, and by a second valve 144 and a second series of hydraulic conduits 146 to an output of the hydraulic pump 124*b* and to an input of the motor 132*b*. Further, the low-pressure accumulator 138 is hydraulically coupled by a third series of hydraulic conduits 148 to an input of the hydraulic pump 124*a* and to an output of the motor 132*a*, and by a fourth series of hydraulic conduits 150 to an input of the hydraulic pump 124*b* and to an output of the motor 132*b*. A relief valve 152 couples the high-pressure accumulator 136 and its hydraulic conduits to the low-pressure accumulator 138 and its hydraulic conduits to prevent excessive pressure differentials between the high-pressure and low-pressure accumulators.

In some implementations, an internal combustion engine driving the primary drive shaft 102 operates continuously at its optimal or most efficient operating parameters, independent of the power demanded at the driven shaft 108, to improve overall system efficiency. When power supplied by the drive shaft 102 matches the power demanded at the driven shaft 108, the clutch 114 is engaged and the first and second hydraulic power transfer systems 116 and 134 are disengaged. When power supplied by the drive shaft 102 exceeds the power demanded at the driven shaft 108, the hydraulic pumps 124*a* and/or 124*b* are operated to pump hydraulic fluid from the low-pressure accumulator 138 to the high-pressure accumulator 136, to store excess energy for later use. During such operations, the clutch 114 can be either engaged or disengaged. When power supplied by the drive shaft 102 is less than the power demanded at the driven shaft 108, the hydraulic motors 132*a* and/or 132*b* are actuated by high-pressure hydraulic fluid stored in the high-pressure accumulator 136 to power rotation of the secondary driven shafts 130*a* and/or 130*b*, and to power rotation of the primary driven shaft 108. During such operations, the clutch 114 can be either engaged or disengaged.

In some implementations, the hydraulic pumps 124*a* and/or 124*b* drive operation of the hydraulic motors 132*a* and/or 132*b* directly, rather than indirectly through collection of high-pressure hydraulic fluid in the high-pressure accumulator 136. In some implementations, the hydraulic pumps 124*a* and 124*b*, and/or the hydraulic motors 132*a* and 132*b*, are of different sizes and operating capacities, so that they are operable independently of one another based on the running conditions of the system supplying power to the primary drive shaft 102 and the system drawing power from the primary driven shaft 108, to improve overall efficiency.

In some implementations, to apply a braking or decelerating torque, rather than a driving torque, to the primary driven shaft 108, operation of the hydraulic motors 132*a* and/or 132*b* is inverted so the hydraulic motors operate as hydraulic pumps. During such operations, the clutch 114 is disengaged. The hydraulic pumps 132*a* and/or 132*b* are then actuated by the primary driven shaft 108 and operated to pump hydraulic fluid from the low-pressure accumulator 138 to the high-pressure accumulator 136, to store excess energy for later use.

Figure 2:
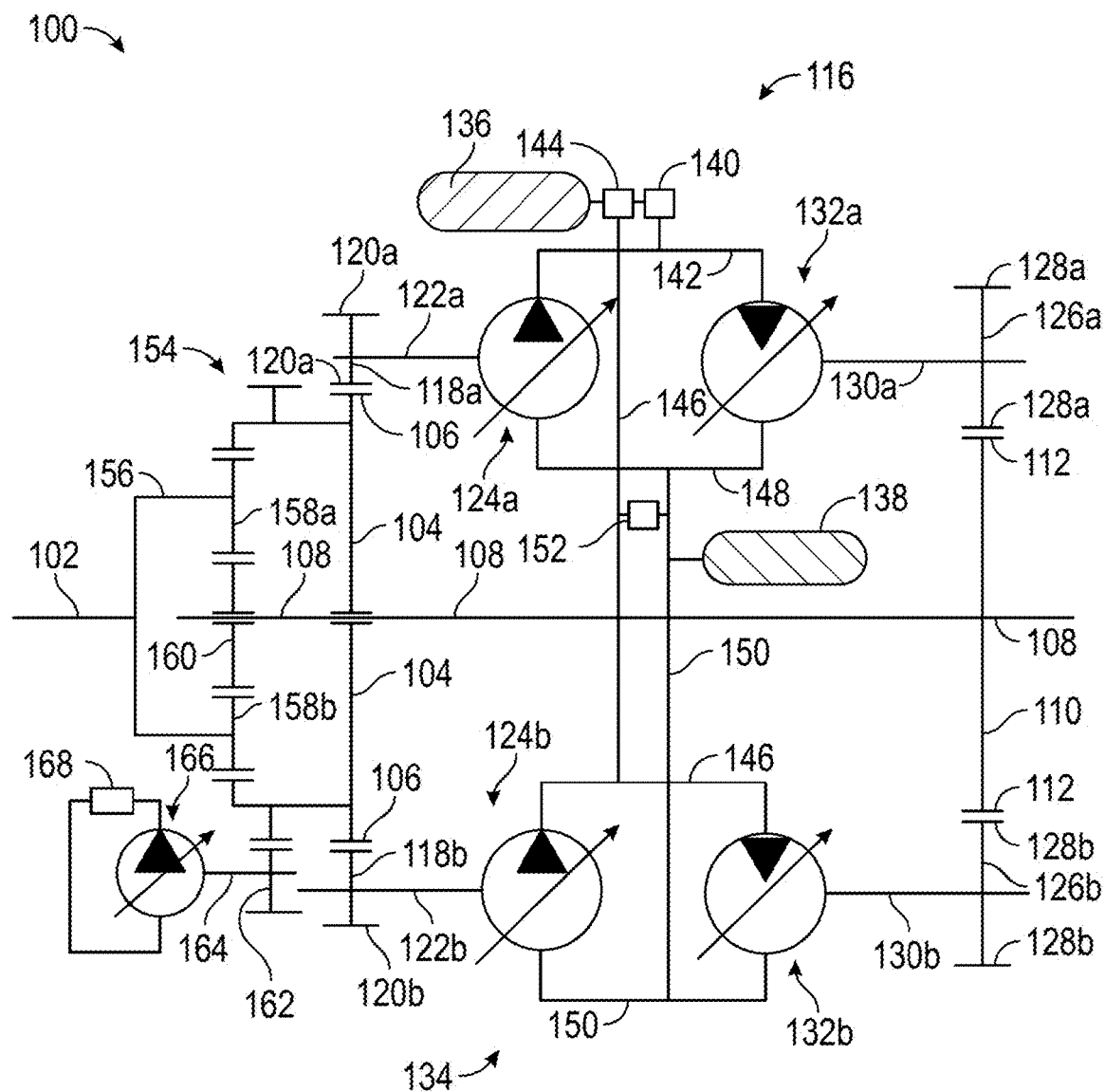
FIG. 2 illustrates a schematic diagram of an automotive transmission implemented with a planetary gear set including a brake energy recovery system, according to at least one illustrated embodiment.

FIG. 2 illustrates the automotive transmission 100, with some modifications to the implementation illustrated in FIG. 1. As illustrated in FIG. 2, the transmission 100 includes a planetary gear set 154, between the primary drive shaft 102 and the primary drive gear 104. The planetary gear set 154 includes first and second planetary gears 158*a* and 158*b* rotatably mounted on a planetary gear carrier 156 rigidly coupled to the primary drive shaft 102. The planetary gear set 154 also includes a sun gear 160 rigidly coupled to the primary driven shaft 108. The planetary gear set 154 also includes the primary drive gear 104, which functions as the planetary ring gear of the planetary gear set 154.

In some implementations, the planetary gear set performs the function of the clutch 114 illustrated in FIG. 1. For example, the primary drive gear 104 can be held stationary in a fixed position so that the primary drive shaft 102 drives the primary driven shaft 108 purely mechanically, without the action of any intermediate hydraulic components. The primary drive gear 104 can also be allowed to rotate about its own axis, so that the hydraulic pumps 124*a* and/or 124*b*, and/or the hydraulic motors 132*a* and/or 132*b*, operate as described above with respect to FIG. 1.

FIG. 2 also illustrates that the transmission 100 includes a tertiary drive gear 162 having teeth meshed with outer teeth of the primary drive gear 104. The tertiary drive gear 162 is rigidly coupled to a tertiary drive shaft 164 and thereby to a hydraulic pump 166. The hydraulic pump 166 is coupled to a hydraulic conduit, forming a closed loop with a flow control valve 168. In some implementations, the flow control valve 168 is closed to hold the primary drive gear 104 stationary in a fixed position, and opened to allow the primary drive gear 104 to rotate about its own axis. In some implementations, the hydraulic pump 166 and the flow control valve 168 are operated to dampen vibrations within the transmission 100.

Figure 3:
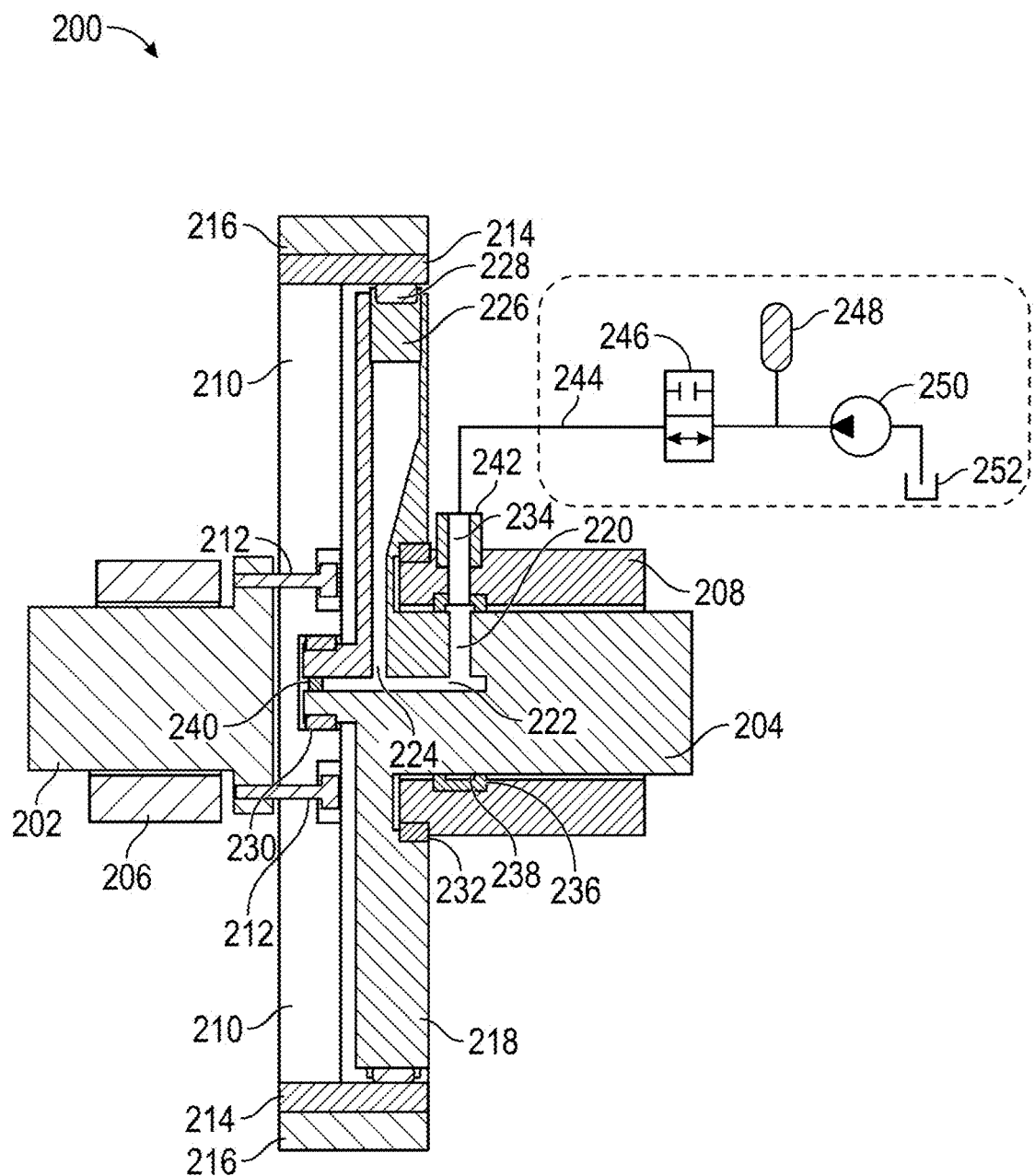
FIG. 3 illustrates a schematic diagram of a hydraulic system feeding an automotive hydraulic clutch, shown in cross-section, for use in an automotive gearbox, according to at least one illustrated embodiment.

FIG. 3 illustrates a hydraulically powered clutch 200 for transferring power or torque from an input shaft 202 to an output shaft 204 in an automotive gearbox. The clutch 200 includes a portion of the input shaft 202 mounted to rotate within, and supported by, a stationary bearing 206, and a portion of the output shaft 204 mounted to rotate within, and supported by, a stationary housing 208. The input shaft 202 is rigidly coupled to an input disc 210 by a plurality of bolts or other fastening members 212. The input disc 210 is rigidly coupled to an outer rim 214, such as by welding or by a suitable adhesive. The outer rim 214 is a gear having teeth 216 formed integrally in an outer surface thereof.

The output shaft 204 is integrally formed with an output disc 218 that extends radially outward from the end portion of the output shaft 204 and that is arranged parallel to the input disc 210. The input disc 210 includes a recess extending into its front surface along its central longitudinal axis, and the output disc 218 includes a protrusion extending outward from its front surface along its central longitudinal axis. The protrusion of the output disc 218 is seated within the recess of the input disc 210 with a bearing 230 positioned between an outer surface of the protrusion and an inner surface of the recess.

The output shaft 204 and the output disc 218 include a network of hydraulic conduits. These hydraulic conduits extend from an outer surface of the output shaft 204 radially inward to a centerline of the output shaft 204 at a radial hydraulic conduit 220, along the centerline of the output shaft 204 into the output disc 218 at a radial hydraulic conduit 222 (capped by a plug 240), and radially outward through the output disc 218 at a radial hydraulic conduit 224, to form a hydraulic cylinder housing a hydraulic piston 226. The hydraulic piston 226 is engaged at a first end thereof with the hydraulic fluid within the hydraulic conduits, and is coupled at a second end thereof opposite to the first end to an engagement element 228, which can be a wheel 228, in contact with an inner surface of the outer rim 214.

The output disc 218 includes a groove adjacent to, and extending circumferentially around, the output shaft 204, that extends into a rear surface of the output disc 218. The housing 208 extends into and is seated within the groove in the rear surface of the output disc 218 with a bearing 232 positioned between an outer surface of the housing 208 and an inner surface of the groove. A bearing 236 is rigidly coupled to an inner surface of the housing 208 and is engaged with an outer surface of the output shaft 204. The bearing 236 includes an annular groove 238 that extends around the output shaft 204 and that is in hydraulic communication with the radial hydraulic conduit 220 within the output shaft 204. The bearing 236 also includes a port that couples its annular groove 238 to a hydraulic conduit 234 extending radially outward through the housing 208.

The radial hydraulic conduit 234 of the housing 208 is hydraulically coupled, such as by a hydraulic connector 242, to a hydraulic conduit 244, a hydraulic flow control valve 246, an accumulator 248, which is used for storage of hydraulic energy and damping of hydraulic shocks, a hydraulic pump 250, and a hydraulic reservoir 252. In some implementations, the valve 246 is kept closed so that the hydraulic fluid within the hydraulic conduits within the output shaft 204 and the output disc 218 is not highly pressurized, and so that the engagement element 228 does not engage the inner surface of the outer rim 214. In such implementations, the input disc 210 rotates freely with respect to the output disc 218, and neither power nor torque is transferred from the input shaft 202 to the output shaft 204.

In other implementations, the valve 246 is opened and the hydraulic pump 250 is actuated to pump hydraulic fluid and generate a high-pressure hydraulic wave that travels through the valve 246 and the various hydraulic conduits into the hydraulic cylinder within the output disc 218. In other implementations, the valve 246 is opened and the high-pressure hydraulic fluid held within the hydraulic accumulator 248 is released to generate a high-pressure hydraulic wave that travels through the valve 246 and the various hydraulic conduits into the hydraulic cylinder within the output disc 218. In such implementations, when the high-pressure hydraulic wave reaches the hydraulic piston 226, it pushes the hydraulic piston 226 and the engagement element 228 radially outward so that the engagement element 228 engages the inner surface of the outer rim 214. In such implementations, the input disc 210 does not rotate freely with respect to the output disc 218, and is instead rotationally locked to the output disc 218, so that power or torque is transferred from the input shaft 202 to the output shaft 204.

Figures 4A, 4B, 4C:
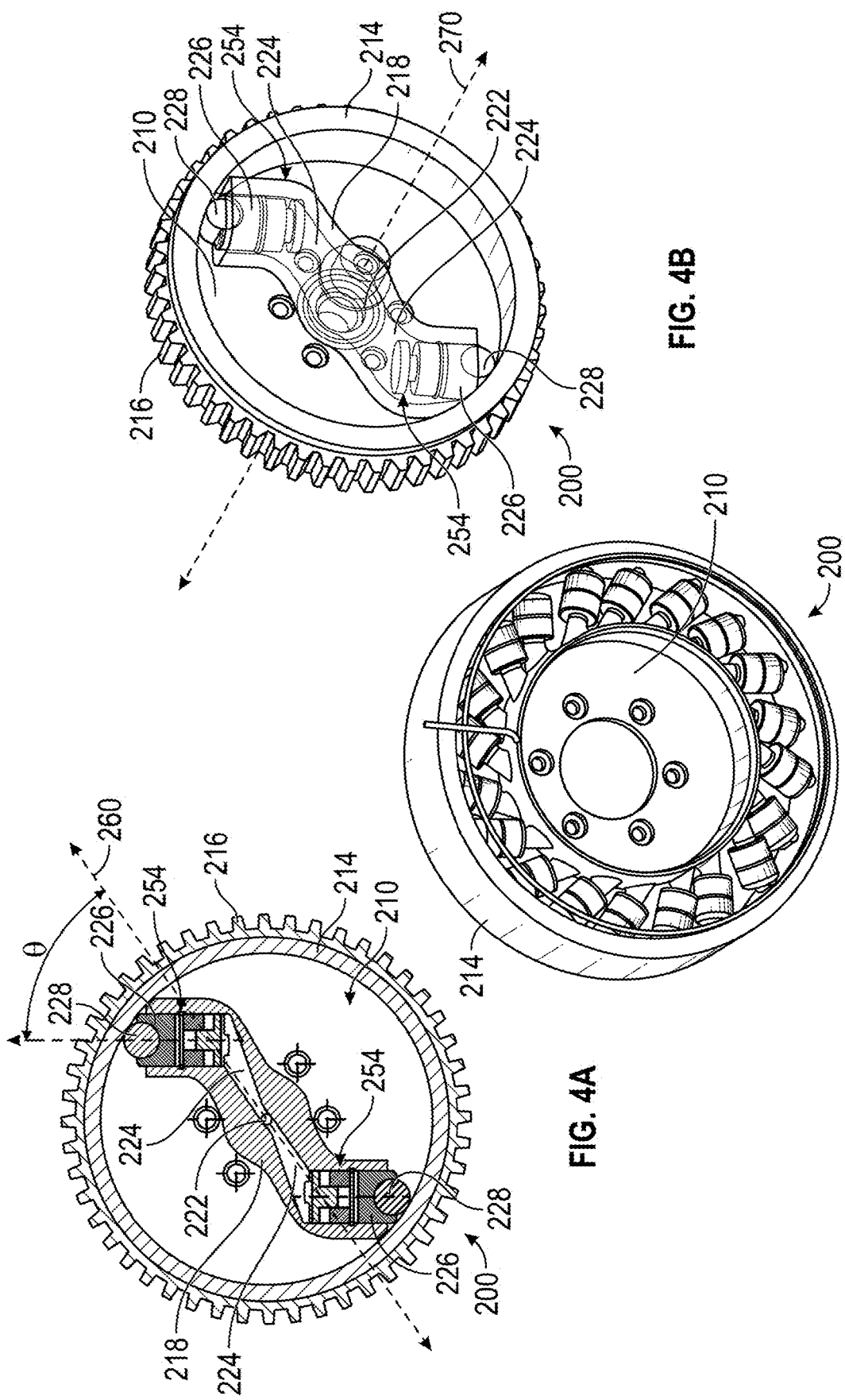
FIG. 4A illustrates a cross-sectional view of an automotive clutch for use in an automotive gearbox, according to at least one illustrated embodiment.
FIG. 4B illustrates a perspective view of an automotive clutch for use in an automotive gearbox, according to at least one illustrated embodiment.
FIG. 4C illustrates a perspective view of an automotive clutch for use in an automotive gearbox, according to at least one illustrated embodiment.

FIGS. 4A and 4B illustrate a schematic side view and a perspective view, respectively, of the hydraulically powered clutch 200, with some modifications to the implementation illustrated in FIG. 3. As illustrated in FIGS. 4A and 4B, the clutch 200 includes the radial hydraulic conduit 224 extending radially outward from the hydraulic conduit 222 to two hydraulic transformers 254. Each hydraulic transformer 254 is used to step hydraulic pressure up from a first hydraulic pressure within the radial hydraulic conduit 224 at a first side of the hydraulic transformer 254 to a second hydraulic pressure at a second side of the hydraulic transformer 254 opposite to its first side, which is in hydraulic communication with a respective hydraulic piston 226. In some implementations, the hydraulic transformers 254 are used to step hydraulic pressure up from about 18 bar to about 100 bar.

An implementation of the hydraulically powered clutch 200 illustrated in FIGS. 4A and 4B includes two hydraulic pistons 226 and two corresponding engagement elements 228. In various implementations, the engagement elements 228 may be cylinders, wheels, spherical elements, or the like. The pistons 226 and corresponding engagement elements 228 are oriented obliquely (e.g., at an oblique angle theta) to a radial axis 260, but are rotationally symmetric with respect to the central longitudinal axis 270 of the clutch 200, such that the engagement elements 228 and the forces they exert against the outer rim 214 are balanced.

FIG. 4C illustrates a schematic perspective view of the hydraulically powered clutch 200, with some modifications to the implementations illustrated in the preceding figures. As illustrated in FIG. 4C, the clutch 200 includes a plurality of hydraulic pistons 226 (twenty shown) and a corresponding plurality of engagement elements 228 (twenty shown). Again, since the twenty hydraulic pistons 226 and the twenty corresponding engagement elements 228 are oriented obliquely to radial axis 260 but radially symmetric with respect to the central longitudinal axis of the clutch 200, they and the forces they exert against the outer rim 214 are balanced. Increasing the number of hydraulic pistons 226 and the number of engagement elements 228 included within the clutch 200 increases the overall torque and power that the clutch 200 is capable of transferring without increasing its overall size or the complexity of its manufacture. Thus, the clutch design is scalable for use with heavy duty vehicles such as agricultural equipment, construction equipment, and the like.

Figure 5:
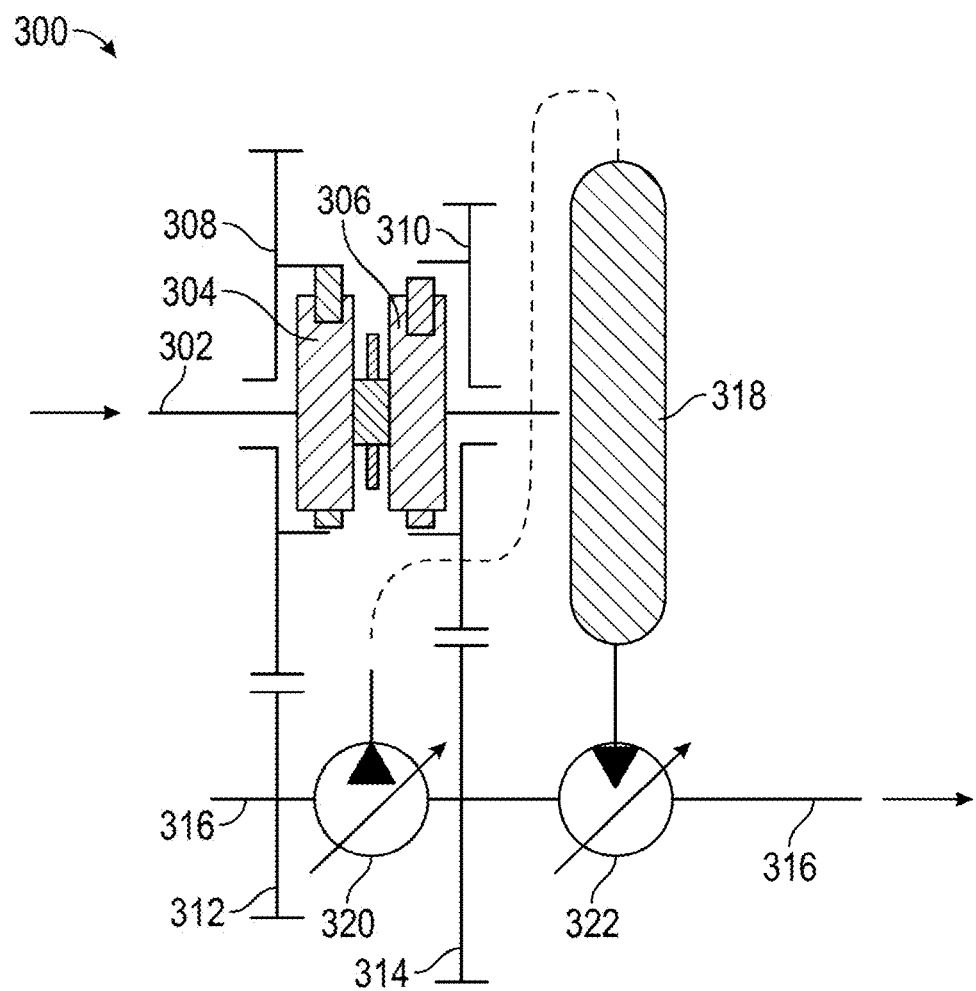
FIG. 5 illustrates a schematic diagram of an automotive gearbox, according to at least one illustrated embodiment.

FIG. 5 illustrates an automotive gearbox 300. The automotive gearbox 300 includes an input shaft 302 rigidly coupled to a first hydraulically powered clutch 304 and to a second hydraulically powered clutch 306. The first and second hydraulically powered clutches 304 and 306 have structures matching or similar to the clutch 200 described herein. The first clutch 304 includes a first drive gear 308 that can be locked to or released from the input shaft 302 by the first clutch 304, and the second clutch 306 includes a second drive gear 310 that can be locked to or released from the input shaft 302 by the second clutch 306.

The first drive gear 308 has teeth meshed with the teeth of a first driven gear 312 rigidly coupled to an output shaft 316, and the second drive gear 310 has teeth meshed with the teeth of a second driven gear 314 rigidly coupled to the output shaft 316. The first drive gear 308 has a larger radius than the second drive gear 310, and the first driven gear 312 has a smaller radius than the second driven gear 314, so that the gearbox 300 has a different gear ratio when the first clutch 304 is engaged than when the second clutch 306 is engaged. Either one, but only one, of the first and second clutches 304 and 306 is engaged at a given time, to prevent binding of, and damage to, the gearbox 300.

FIG. 5 also illustrates that the gearbox 300 includes a hydraulic accumulator 318 hydraulically coupled to a hydraulic pump 320, which is coupled to be driven by the driven shaft 316, and a hydraulic motor 322, which is coupled to drive the driven shaft 316, and which collectively operate in the same ways described herein for automotive transmission 100. The gearbox 300 has various technological improvements over traditional automotive gearboxes. As one example, the gearbox 300 is relatively short and compact. As another example, the gearbox 300 does not need a flywheel. As other examples, the gearbox 300 has relatively smooth engagement, actuation, and operation. As another example, the gearbox 300 is relatively low-cost. As another example, the gearbox 300 has large torque ranges. As another example, the gearbox 300 is easily integrated with a brake energy recovery system.

Figure 6:
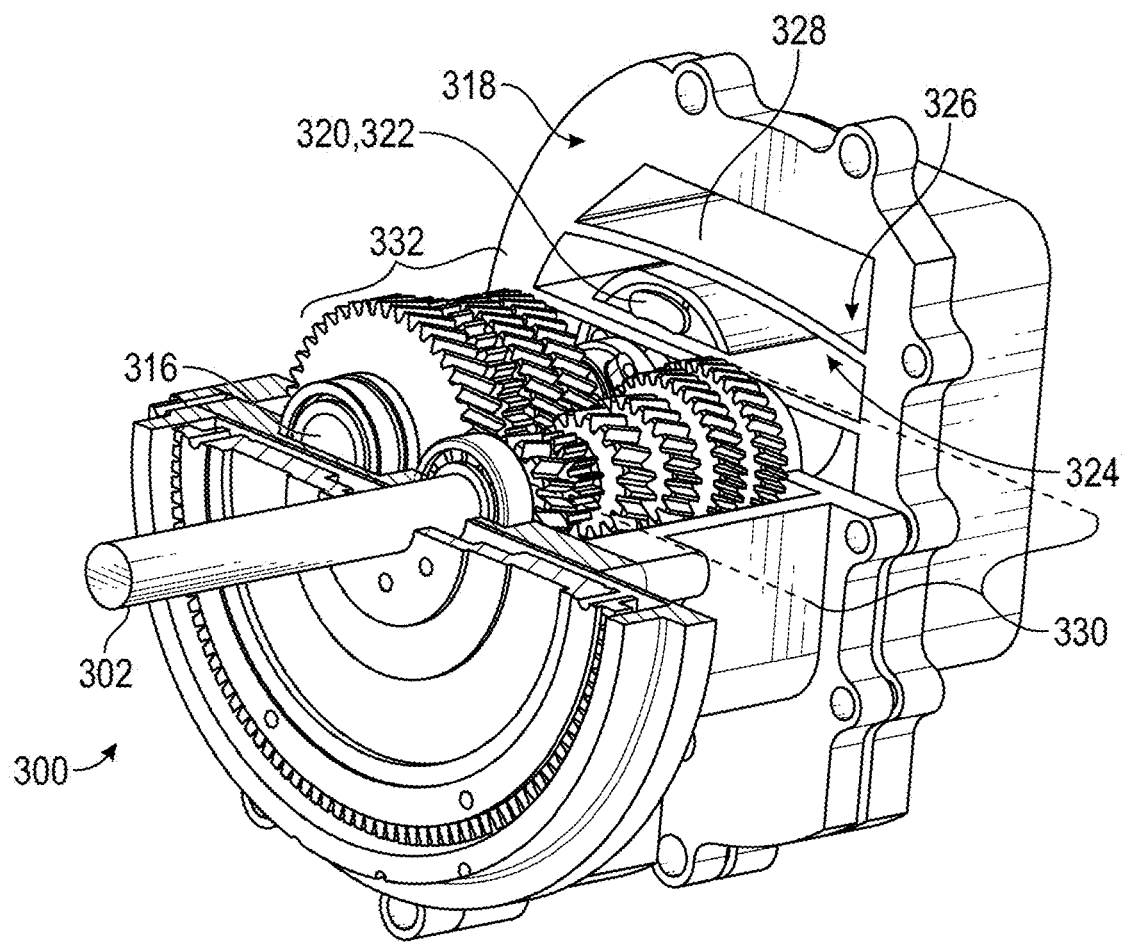
FIG. 6 illustrates a perspective view of a three-dimensional model of an automotive gearbox, according to at least one illustrated embodiment.

FIG. 6 illustrates a perspective view of a three-dimensional model of the gearbox 300, with some modifications to the implementations illustrated in FIG. 5. As illustrated in FIG. 6, the gearbox 300 includes the input shaft 302, the output shaft 316, a plurality of drive gears 330, a plurality of driven gears 332, the hydraulic pump 320, the hydraulic motor 322, and the hydraulic accumulator 318. Each of the drive gears 330 includes a clutch having a structure matching or similar to that described herein for clutch 200.

As also illustrated in FIG. 6, the hydraulic accumulator 318 of the gearbox 300 includes a high-pressure accumulator 324 and a low-pressure accumulator 326, with a flexible wall 328 separating the high-pressure accumulator 324 from the low-pressure accumulator 326. The flexible wall 328 deforms as the pressure of a hydraulic fluid within the high-pressure accumulator 324 increases and/or as the pressure of a hydraulic fluid within the low-pressure accumulator 326 decreases, to store energy for later use, as described herein. In addition to the flexible wall 328, in some implementations, the accumulator 318 includes a pressurized gas and/or a mechanical spring to store energy for later use. One or both of the accumulators 324, 326 included in the hydraulic accumulator 318 may be used to store energy recovered from a hydraulic braking system. The accumulator 318 thus increases energy efficiency of the torque transfer system compared with a conventional clutch system.

Figure 7A:
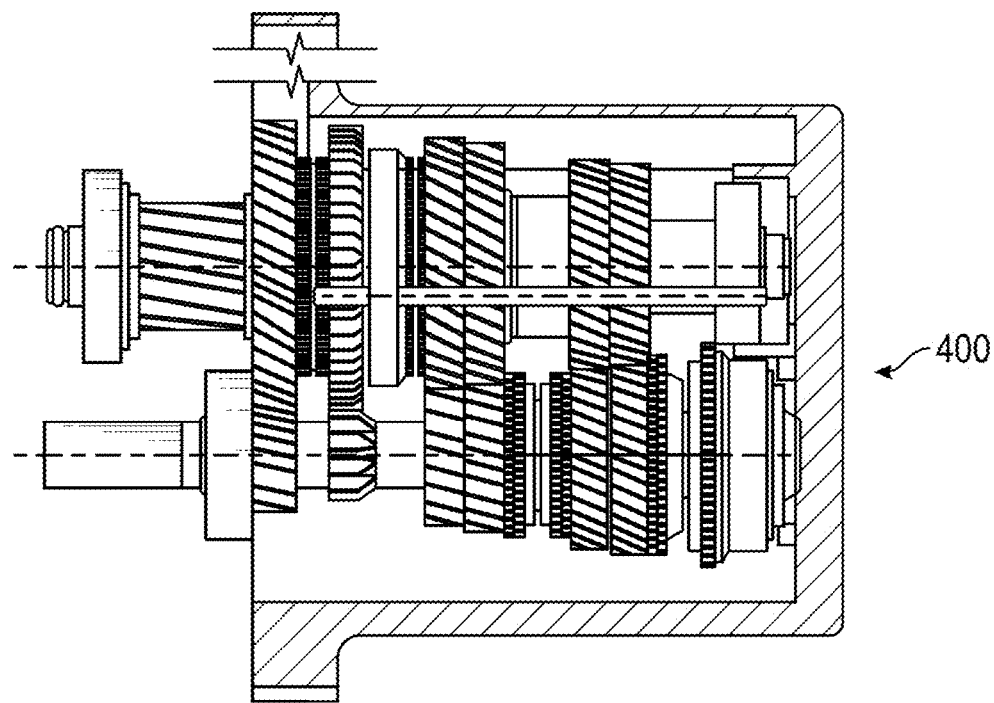
FIG. 7A illustrates the size of a standard automotive gearbox, to be compared with the size of an automotive gearbox as described herein and illustrated in FIG. 7B, according to at least one illustrated embodiment.
Figure 7B:
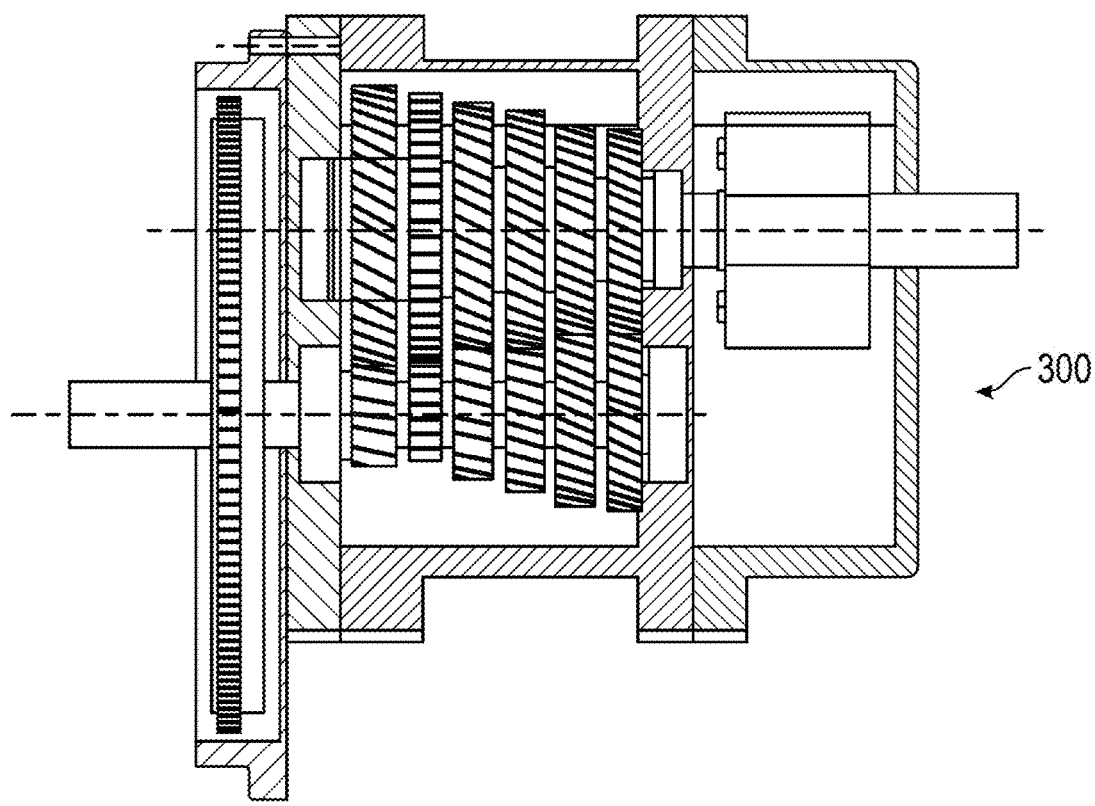
FIG. 7B illustrates the size of an automotive gearbox as described herein, to be compared with the size of the standard automotive gearbox illustrated in FIG. 7A, according to at least one illustrated embodiment.
Figure 8:
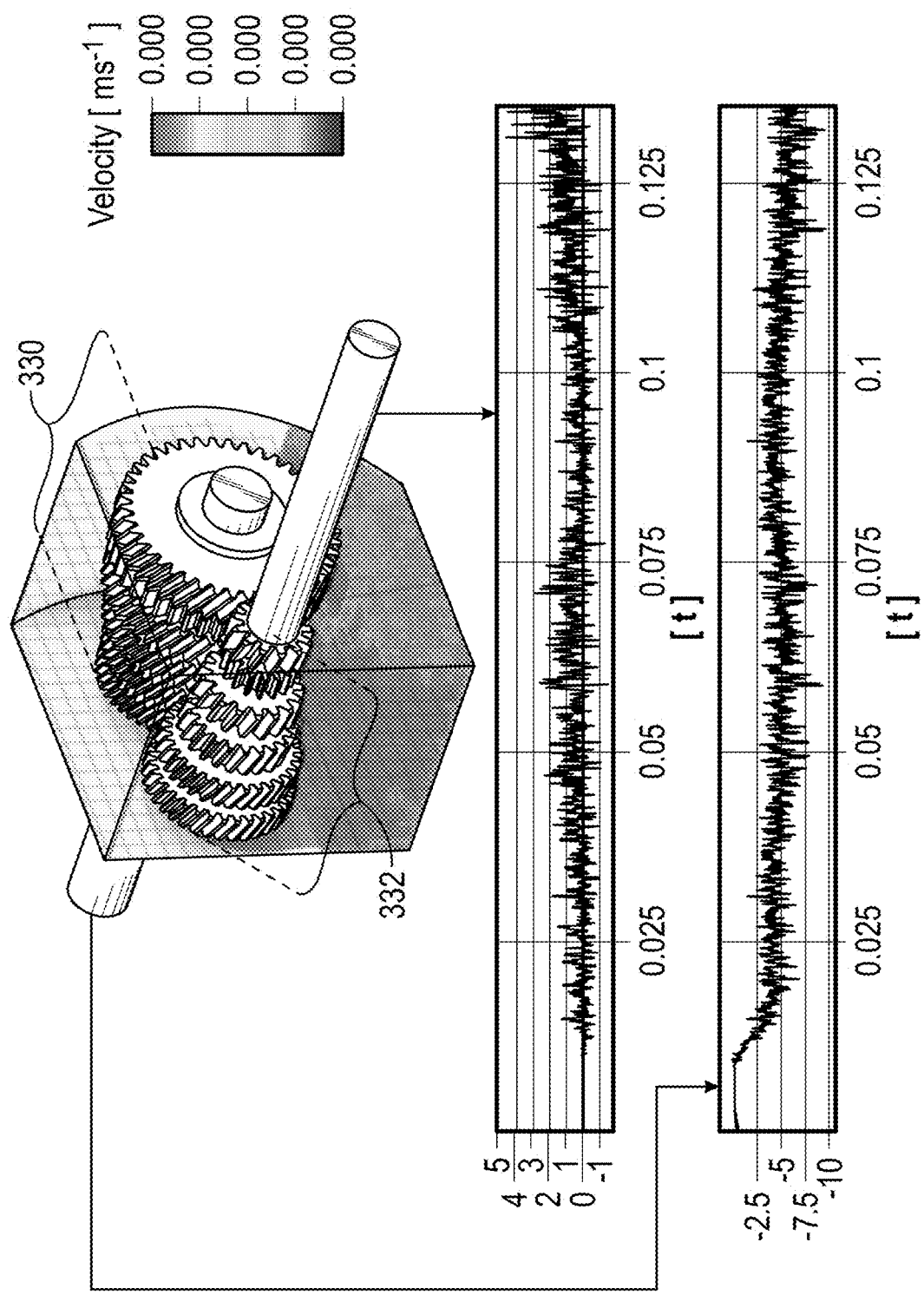
FIG. 8 illustrates the results of a computer analysis of drag torques resulting from gear rotation in an automotive gearbox as described herein, according to at least one illustrated embodiment.

FIG. 7A illustrates a traditional gearbox 400. FIG. 7B illustrates the gearbox 300, with some modifications to the implementations illustrated in the preceding figures. As illustrated in FIG. 7B, the space occupied by the gears of the gearbox 300 is significantly shorter and smaller than that for the traditional gearbox 400, leaving space in the gearbox 300 for the hydraulic pump 320, motor 322, and/or accumulator 318 without increasing the overall dimensions needed for the gearbox 300. FIG. 8 illustrates the results of computer analysis of drag torques resulting from gear rotation in the gearbox 300. In particular, FIG. 8 illustrates that the drag force decreases on the shaft carrying the drive gears 330, which are equipped with the clutches described herein, and that the drag force increases on the shaft carrying the driven gears 332, which are not equipped with the clutches described herein.

Referring now to FIG. 9A, a schematic view of the radial hydraulic piston-actuated torque transfer device 900 is shown that displays an input shaft 902, which is rigidly attached to a rotatable housing 904. The rotatable housing 904 contains an annular hydraulic feeding channel 906 that is connected to radial feeding channels 908 of hydraulic cylinders 910.

As shown in FIG. 9B, the hydraulic cylinders 910 are positioned at a constant offset angle relative to the radial axis. More specifically, the hydraulic cylinders 910 are canted or angularly offset relative to radial lines drawn from the coincident centers of the corresponding shafts. In some implementations, the offset angle is less than about thirty degrees. In more preferable implementations, the offset angle is from about five degrees to about twenty-five degrees.

Referring again to FIG. 9A, within each hydraulic cylinder 910 is a piston 912 gliding on a rolling engagement element 914. The rolling engagement element 914 is in contact with an output disc 916. The output disc 916 is rigidly fixed to an output shaft 918. The piston stroke of each piston 912 within each hydraulic cylinder 910 is relatively short. Notably, the rolling engagement element 914 reduces friction during the engagement process, before full coupling occurs. The force transmission from the piston 912 to an inner ring (i.e., the output disc 916) is accomplished using two contact surfaces; (1) the contact surface between the piston 912 and the rolling engagement element 914, and (2) the contact surface between the rolling engagement element 914 and the inner ring (i.e., the output disc 916). This component configuration produces a more efficient overall contact on these two microscale adaptable elements.

The radial hydraulic piston-actuated torque transfer device 900 further includes a fixed housing 920 that contains a hydraulic fluid coupling 922 to the annular hydraulic feeding channel 906. The hydraulic feeding coupling 922 is connected to a hydraulic circuit, which is further described with reference to FIG. 14. The rotatable housing 904 and the fixed housing 920 are sealed by seals 924 and 926. The radial hydraulic piston-actuated torque transfer device 900 also includes bearing 928 that is positioned between the input shaft 902 and the output disc 916, which is affixed to the output shaft 918. The bearing 928 enables the input shaft 902 and the output shaft 918 to run concentrically. Due to inertial forces, the pistons 912 are not initially in contact with the output disc 916. When actuated, hydraulic fluid enters the radial hydraulic piston-actuated torque transfer device 900 by way of the hydraulic fluid coupling 922. The hydraulic fluid enters the annular hydraulic feeding channel 906 that is connected to the radial feeding channels 908 and the hydraulic cylinders 910. The hydraulic fluid then pushes the pistons 912 and the attached rolling engagement elements 914 to engage with the output disc 916, thereby transferring the torque to the output shaft 918. Thus, mechanical torque is transferred from an input shaft 902 to an output shaft 918 based on the friction created by the pistons 912 that are actuated by pressurized hydraulic fluid.

Figure 10A:
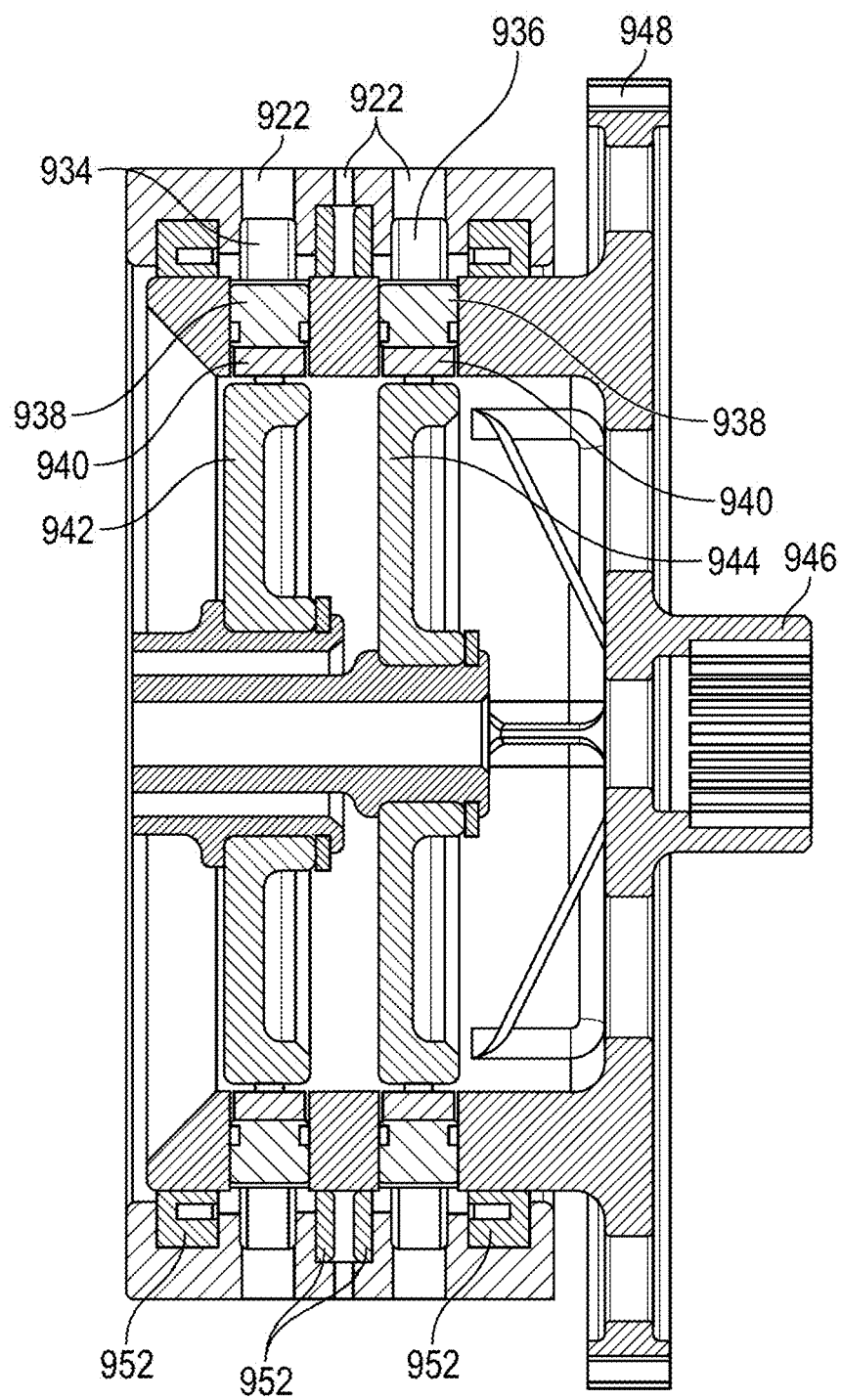
FIG. 10A illustrates a side sectional view of the dual hydraulic actuated piston clutch assembly with hydraulic seals, according to at least one illustrated embodiment.
Figure 10B:
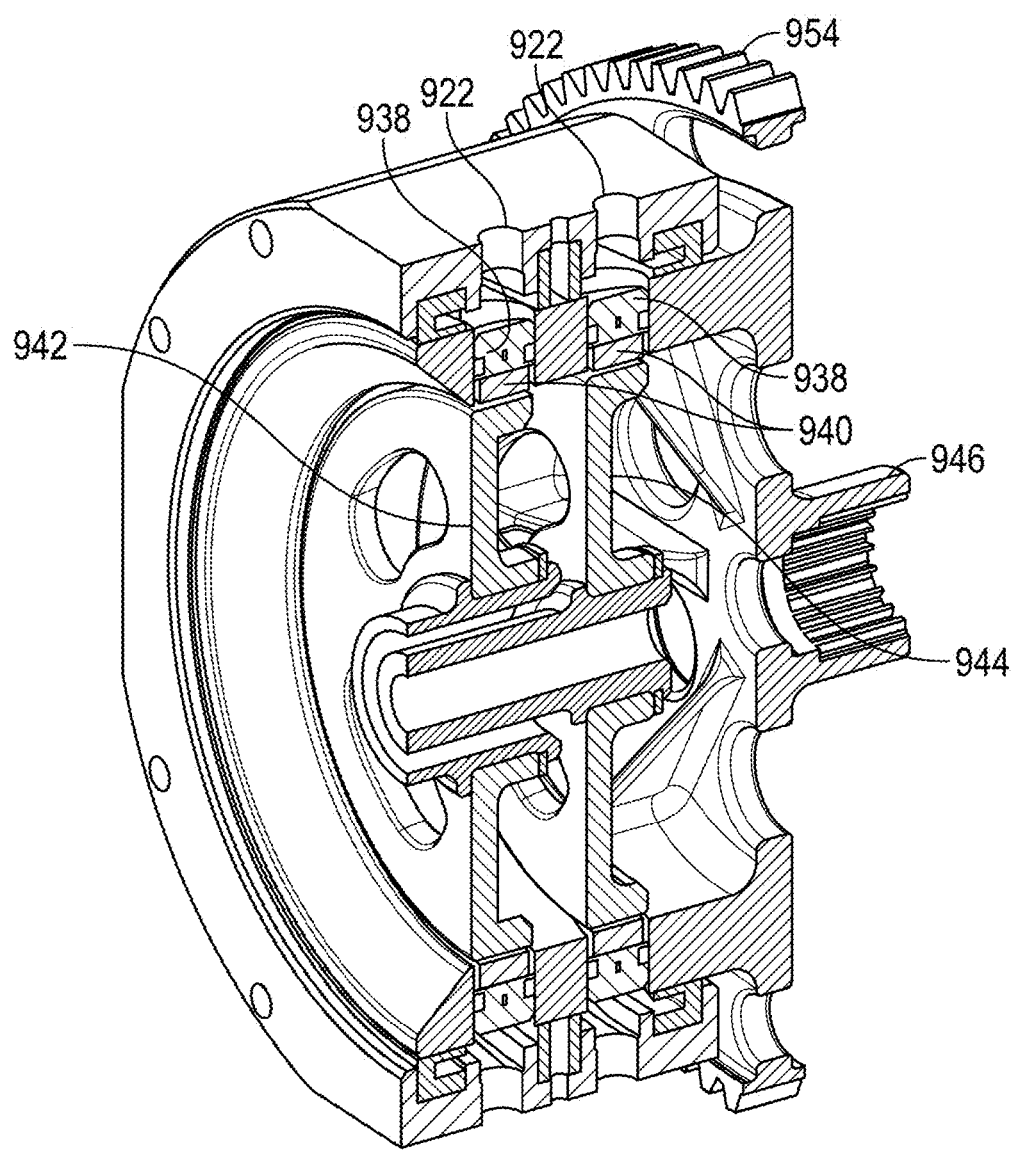
FIG. 10B illustrates a perspective sectional view of the dual hydraulic actuated piston clutch assembly with hydraulic seals, according to at least one illustrated embodiment.

Referring now to FIG. 10A, a cross-sectional view of a dual hydraulic actuated piston clutch transmission with hydraulic seals is shown. Correspondingly, FIG. 10B shows a perspective sectional view of a dual hydraulic actuated piston clutch transmission. The dual hydraulic actuated piston clutch transmission combines two of the above-described radial hydraulic piston-actuated torque transfer devices 900. The hydraulic fluid is controlled by the hydraulic circuit (as described with reference to FIG. 14). The hydraulic fluid enters the system through hydraulic fluid couplings 922, and passes into fluid chambers 934 and 936. The pressure generated by the hydraulic fluid within the fluid chambers 934 and 936 presses the pistons 938 and the rolling engagement elements 940 toward the output shaft assembly 942 or 944 until the rolling engagement elements 940 are in contact with the output shaft assembly 942 or 944. The contact pressure of the rolling engagement elements 940 against the output shaft assembly 942 or 944 is directly proportional to the pressure within the fluid chambers 934 and 936. If there is sufficient pressure flow in the system, the torque from input shaft assembly 942 or 944 is diverted to output shaft assembly 946. However, if there is insufficient pressure flow, the torque from input shaft assembly 942 or 944 acts as a free wheel. In some implementations, as shown in FIG. 10, the system may be sealed by gaskets 948. In another aspect of some implementations, one or more orifices 952 are included at the bottom of the system through which leaked fluid may drain.

Figure 11:
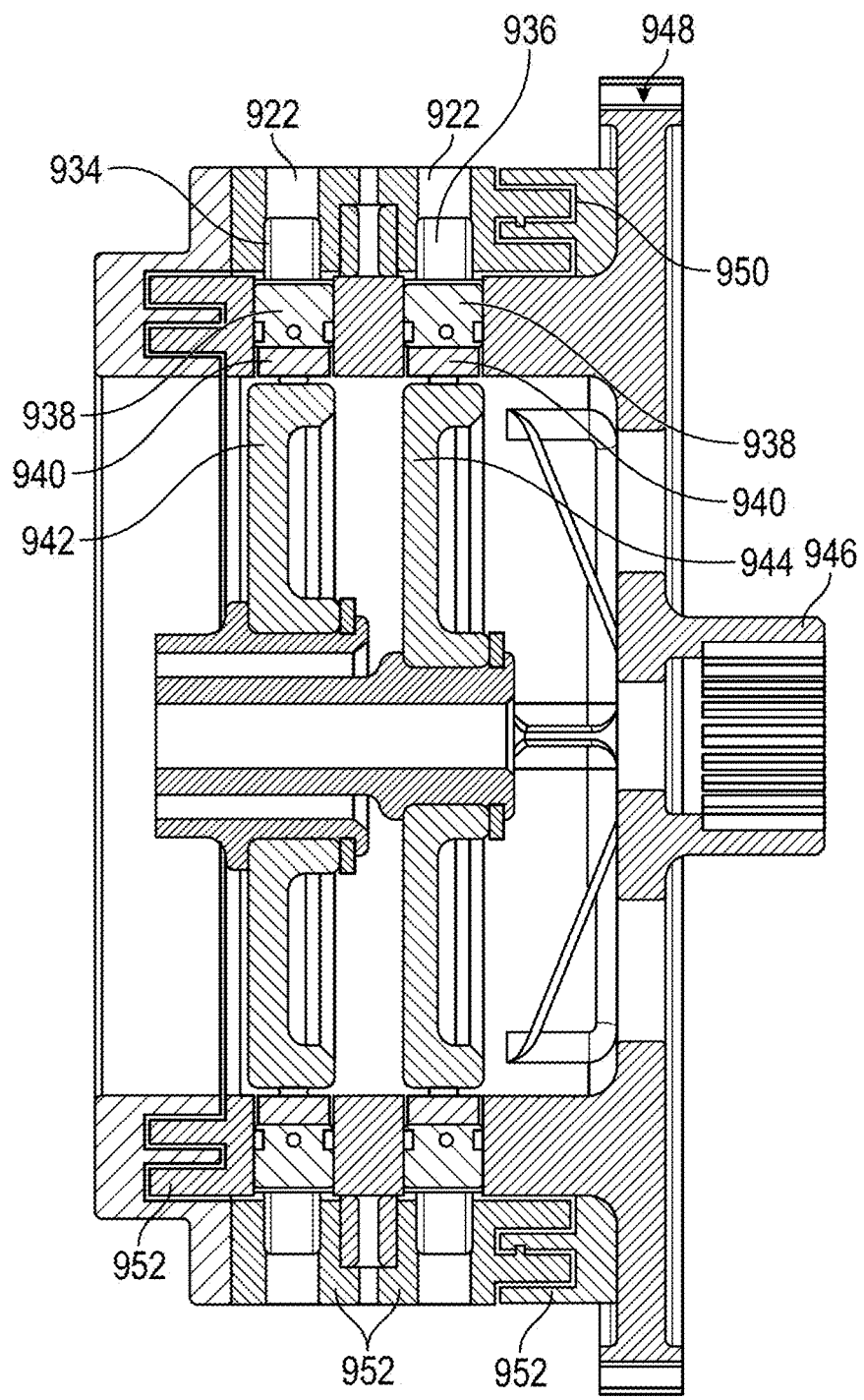
FIG. 11 illustrates a side sectional view of the dual hydraulic actuated piston clutch assembly with labyrinth seals, according to at least one illustrated embodiment.

Referring now to FIG. 11, a side sectional view of the dual hydraulic actuated piston clutch assembly is shown with labyrinth seals 950. In such an implementation, the system may be sealed by using a labyrinth sealing system of known design. To prevent parasite pressure flow, any oil leaked will drain through orifice 952. The connection to the starter motor is completed through gearing 954. This gearing 954 is shown in greater detail in FIG. 13. The remainder of the dual hydraulic actuated piston clutch assembly with labyrinth seals 950 is similar to the dual hydraulic actuated piston clutch transmission with hydraulic seals. As such, in the dual hydraulic actuated piston clutch assembly with labyrinth seals 950, the hydraulic fluid enters the system through hydraulic fluid couplings 922, and passes into fluid chambers 934 and 936, after which the pressure generated by the hydraulic fluid within the fluid chambers 934 and 936 presses the pistons 938 and the rolling engagement elements 940 towards the output shaft assembly 944 until the rolling engagement elements 940 are in contact with the output shaft assembly 942 or 944. Again, if there is sufficient pressure flow in the system, the torque from input shaft assembly 942 or 944 is diverted to output shaft assembly 946.

Figure 12:
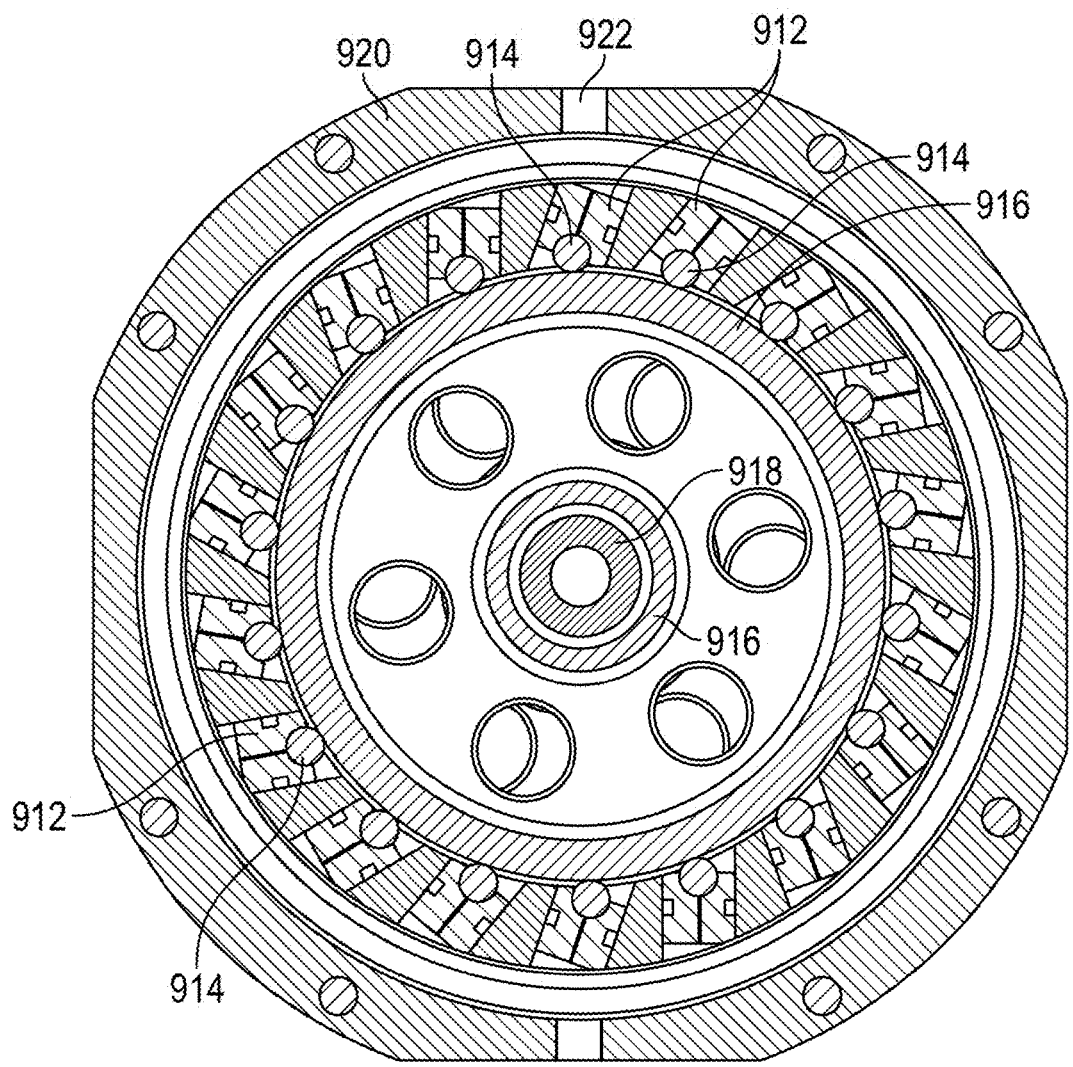
FIG. 12 illustrates a front sectional view of the dual hydraulic actuated piston clutch assembly with hydraulic seals, according to at least one illustrated embodiment.

FIG. 12 illustrates a front sectional view of the dual hydraulic actuated piston clutch assembly with hydraulic seals, according to at least one illustrated embodiment. As shown in FIG. 12, in some implementations, the offset angle is less than about thirty degrees. In more preferable implementations, the offset angle is from about five degrees to about twenty degrees. In the implementation shown in FIG. 12, the output disc 916 and the output shaft 918 are shown. Additionally, eighteen pistons 912 and eighteen associated rolling engagement elements 914 are shown that engage with the output disc 916 when actuated by pressurized hydraulic fluid. The fixed housing 920 of the radial hydraulic piston-actuated torque transfer device 900 is also shown. Additionally, the hydraulic fluid couplings 922 are shown in FIG. 12, through which the hydraulic fluid enters the system to actuate the pistons 912 and associated rolling engagement elements 914 against the output disc 916.

Figure 13A:
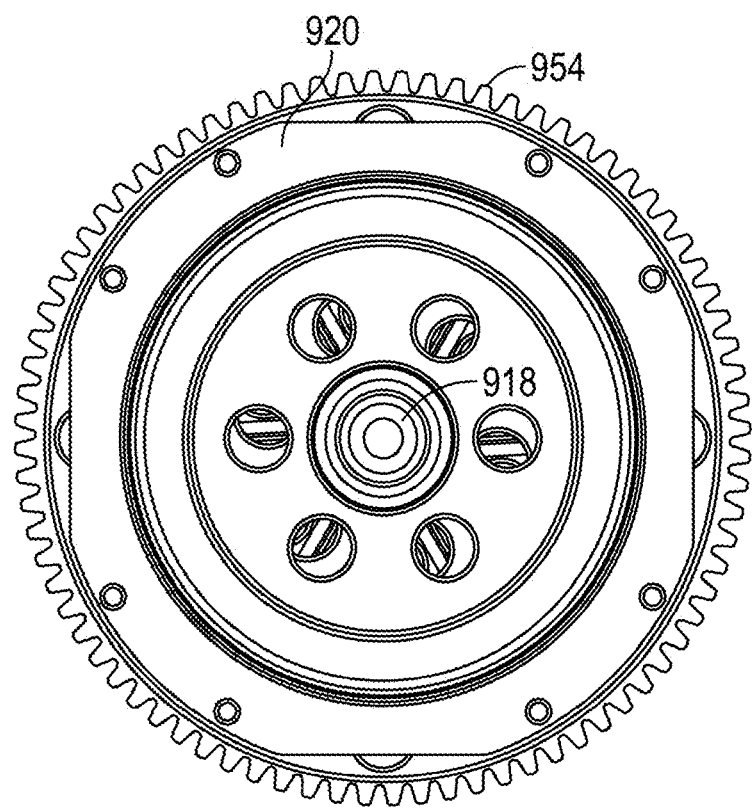
FIG. 13A illustrates a front elevational view of the dual hydraulic actuated piston clutch, according to at least one illustrated embodiment.
Figure 13B:
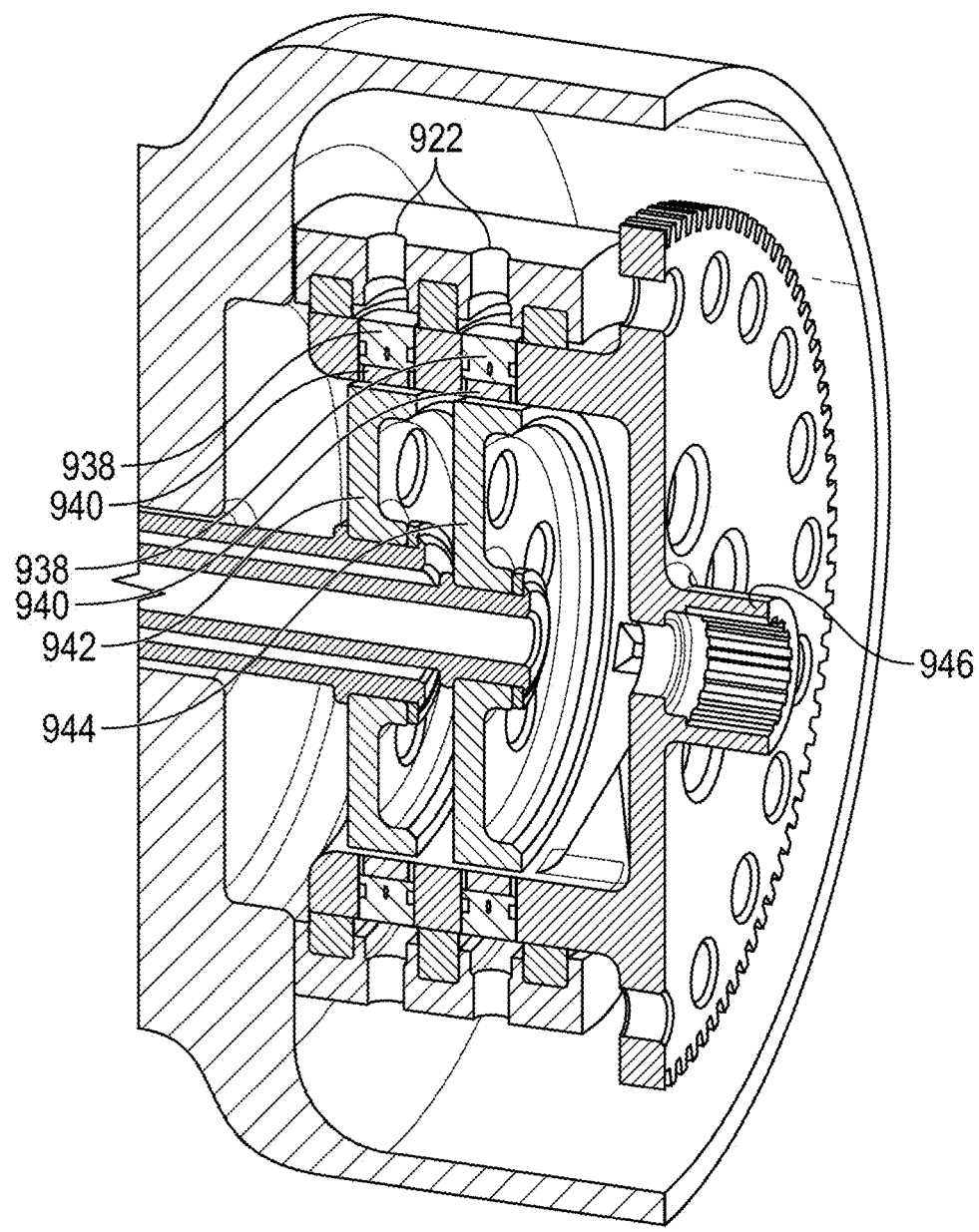
FIG. 13B illustrates a perspective sectional view of the dual hydraulic actuated piston clutch, according to at least one illustrated embodiment.

Referring now to FIG. 13A, a front elevational view of the dual hydraulic actuated piston clutch assembly is shown. FIG. 13B shows a sectional perspective view of the dual hydraulic actuated piston clutch assembly. In the implementation shown in FIGS. 13A and 13B, the output shaft 918 and the fixed housing 920 are shown. The gearing 954 is also shown around the perimeter of the fixed housing 920. In the sectional perspective view of FIG. 13B, both clutches of the dual clutch system are shown, as well as the pistons 912 and associated rolling engagement elements 914 that engage with the output disc 916 when actuated by pressurized hydraulic fluid. Additionally, the hydraulic fluid couplings 922 are shown through which the hydraulic fluid enters the system to actuate the pistons 912.

Figure 14:
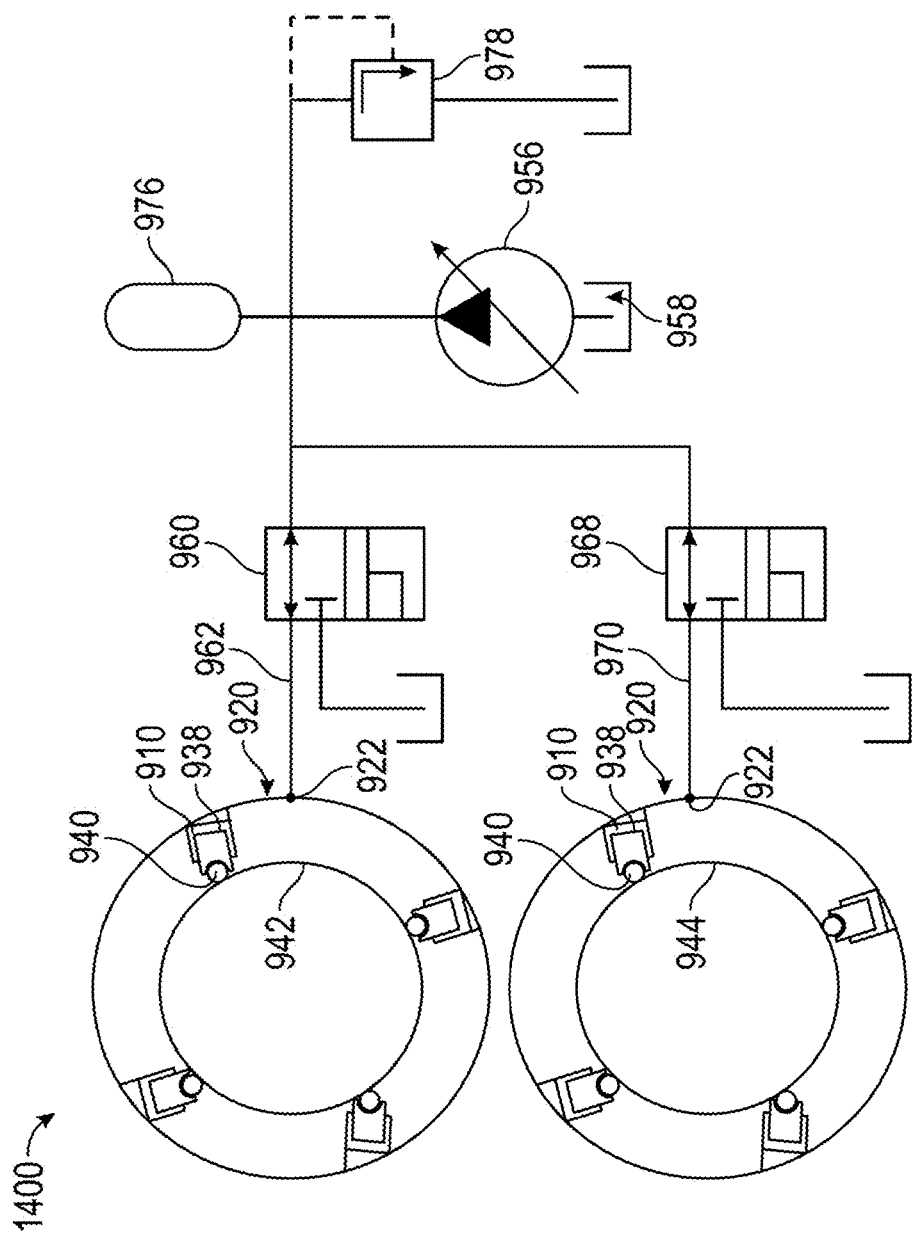
FIG. 14 illustrates a hydraulic actuation circuit of the two clutches, according to at least one illustrated embodiment.

Referring now to FIG. 14, a hydraulic circuit for the dual hydraulic actuated piston clutch assembly 1400 is shown. The hydraulic circuit includes a variable displacement pump 956 that directs hydraulic fluid from the tank 958 to a first directional control valve 960. The first directional control valve 960 controls the flow of the hydraulic fluid that arrives at the hydraulic fluid coupling 922 of the first radial hydraulic piston-actuated torque transfer device 900 using pipe 962. The hydraulic fluid passes through the hydraulic fluid coupling 922 and urges the piston 938 and rolling engagement elements 940 towards the output shaft assembly 942 until the rolling engagement elements 940 are in contact with and rotate the output shaft assembly 942. The fixed housing 920 of the radial hydraulic piston-actuated torque transfer device 900 is also shown. In the implementation shown in FIG. 14, the first radial hydraulic piston-actuated torque transfer device 900 is integrated into the dual hydraulic actuated piston clutch assembly 1400.

The variable displacement pump 956 of the hydraulic circuit also directs hydraulic fluid from the tank 958 to a second directional control valve 968. The second directional control valve 968 controls the flow of the hydraulic fluid through the pipe 970 that arrives at the hydraulic fluid coupling 922 of the second radial hydraulic piston-actuated torque transfer device 900. The hydraulic fluid passes through the hydraulic fluid coupling 922 and urges the piston 938 and rolling engagement elements 940 towards the output shaft assembly 944 until the rolling engagement elements 940 are in contact with and rotate the output shaft assembly 944. In the implementation shown in FIG. 14, the second radial hydraulic piston-actuated torque transfer device 900 is also integrated into a dual hydraulic actuated piston clutch assembly.

Referring still to FIG. 14, the hydraulic circuit further includes accumulator 976 that reduces oscillations during actuation of the pistons 912 and associated rolling engagement elements 914 using the hydraulic fluid. Additionally, the accumulator 976 provides a liquid volume that is disposed for fast response during actuation of the radial hydraulic piston-actuated torque transfer device 900. Further, the hydraulic circuit includes a pressure relief valve 978 that protects against pressure overloads in the system.

Figure 15:
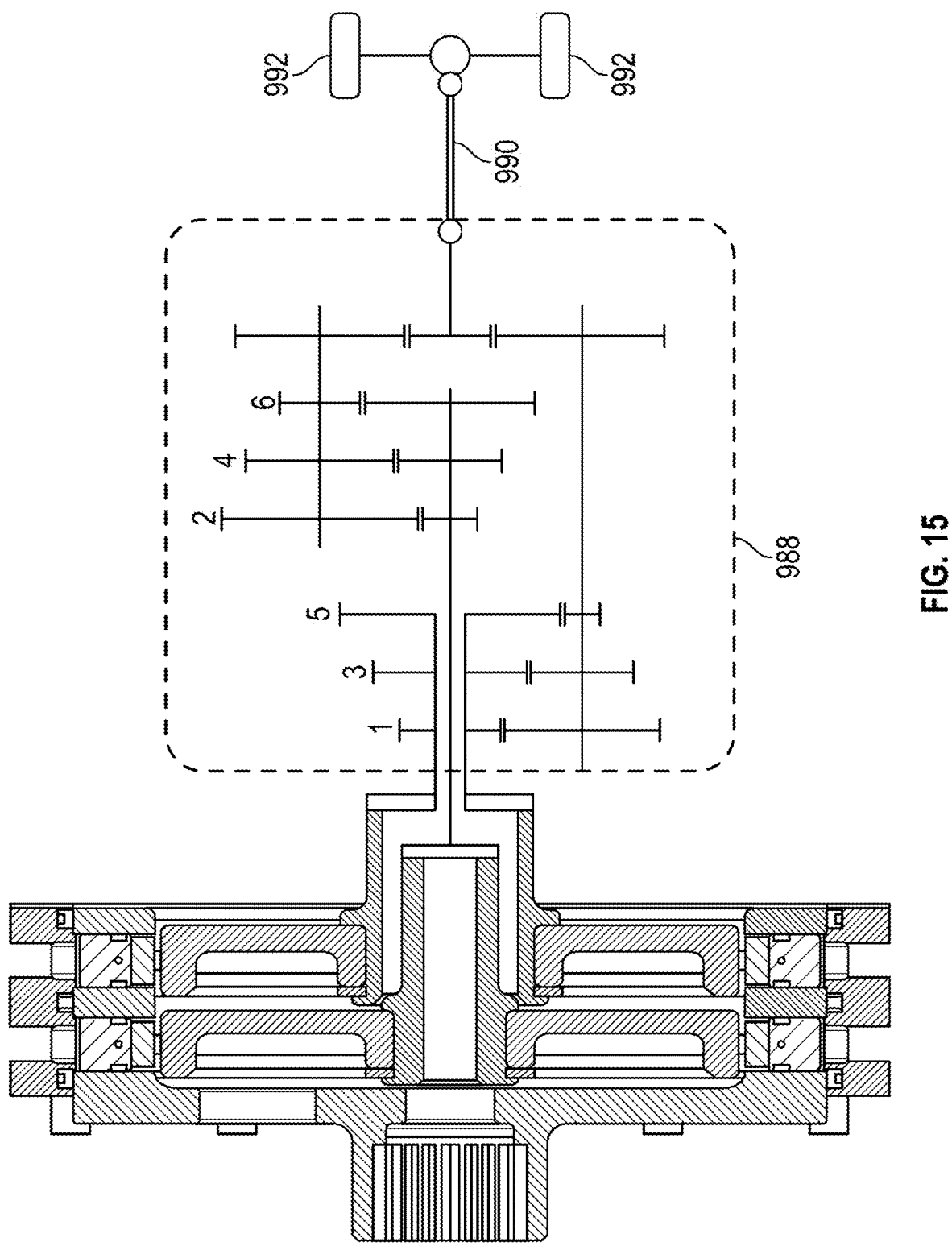
FIG. 15 illustrates a schematic view of the torque transfer device associated with a vehicle transmission implemented as a dual clutch transmission, according to at least one illustrated embodiment.

Referring now to FIG. 15, a schematic view of the radial hydraulic piston-actuated torque transfer device 900 is shown. In this implementation, the radial hydraulic piston-actuated torque transfer device 900 is associated with a dual hydraulic actuated piston clutch vehicle transmission. The dual hydraulic actuated piston clutch vehicle transmission includes a gearbox 988 and drive shaft 990. In this implementation, the gearbox 988 includes gears 1, 3, and 5 that are associated with a first clutch of the dual hydraulic actuated piston clutch vehicle transmission. The gearbox 988 also includes gears 2, 4, and 6 that are associated with a second clutch of the dual hydraulic actuated piston clutch vehicle transmission. The power generated by the engine flows through the transmission and the drive shaft 990 before reaching the drive wheels 992. The gearbox 988 controls the speed and torque from the engine that is available to the drive wheels 992.

Figure 16:
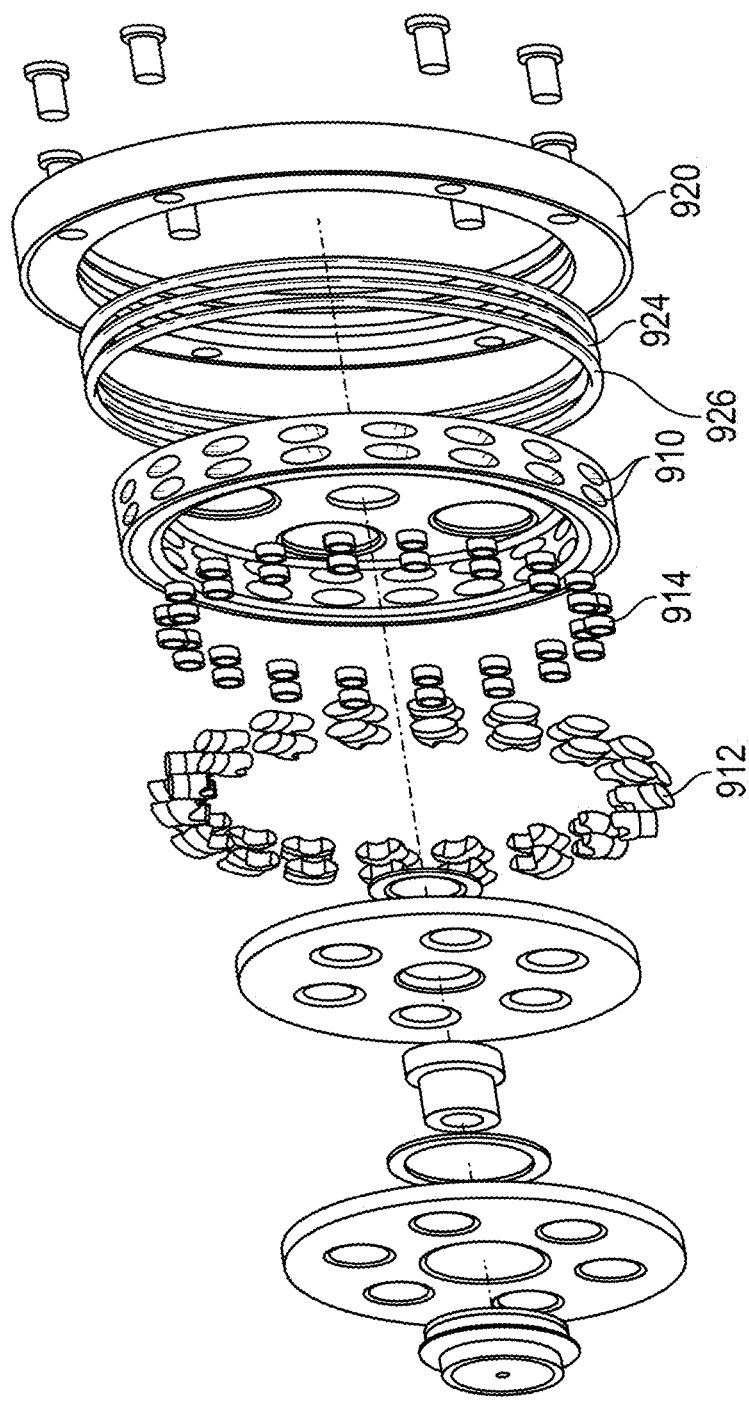
FIG. 16 illustrates an exploded view of the torque transfer device shown in FIG. 9A, according to at least one illustrated embodiment.

Referring now to FIG. 16, an exploded view of the radial hydraulic piston-actuated torque transfer device 900 is shown with various components that were previously discussed with reference to FIG. 9A. Specifically, FIG. 16 shows the construction/assembly of the pistons 912 and rolling engagement elements 914, as well as the hydraulic cylinders 910. Additionally, the fixed housing 920 and the seals 924 and 926 of the radial hydraulic piston-actuated torque transfer device 900 are shown in this exploded view.

In addition to automotive applications, the present torque transfer device can be used in various power shaft coupling applications involving under load actuation of working assemblies including, for example, construction devices, forestry and agricultural vehicles and devices, and stationary applications including drilling devices and winches.

Figure 17:
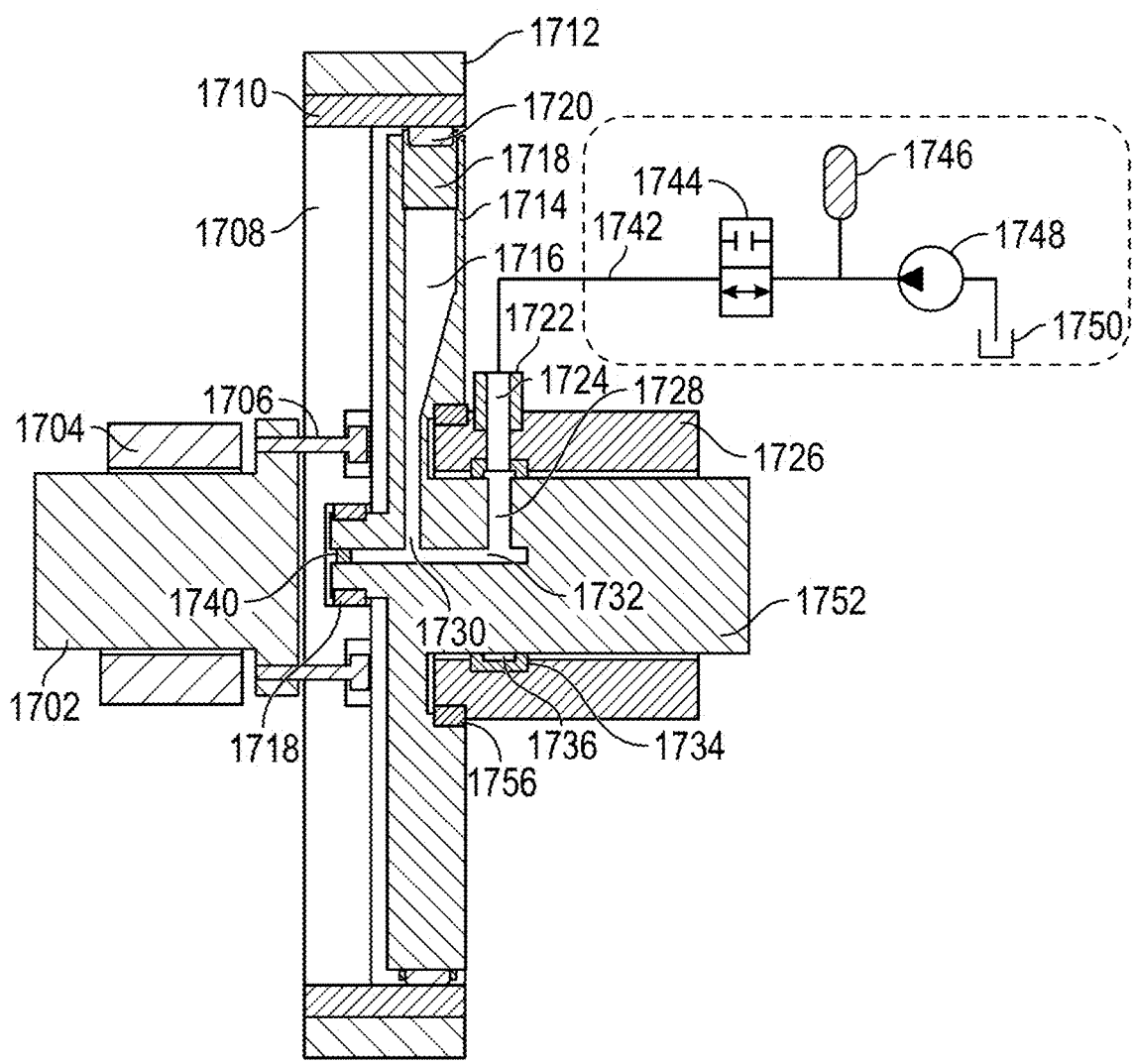
FIG. 17 is a sectional view of the torque transfer device, according to at least one illustrated embodiment.

Referring now to FIG. 17, a sectional view of the torque transfer device is shown. The torque transfer device with an intermediate control system is able to transfer torque between two rotating elements, as well as couple and decouple the rigid connection between them in a controlled manner. The torque transfer device is also able to dampen torsional oscillations and improve the smoothness of a coupling process. The system is able to transfer high torques with a short packaging and low mass, low complexity technical solutions compared to conventional solutions. Additionally, the system has reduced manufacturing cost due to less complexity, and is scalable for larger applications. The system also has multiple applications inside a gearbox to engage different gear sets.

As shown in FIG. 17, in order to transfer torque in a controlled manner from an input shaft 1702 to an output shaft 1752, the input shaft 1702 sustained by bearing 1704 is coupled by fastening members 1706 to an input disc 1708 that has attached, e.g., by welding, an input ring 1710. The assembly of the input disc 1708 and input ring 1710 functions as a flywheel and has attached a gear 1712 to drive or be driven, e.g., at start-up of an internal combustion engine.

An output disc/body 1714 of the torque transfer device includes a hydraulic cylinder 1716 and a slidably engaged hydraulic piston 1718 (offset radially) including a rolling engagement element 1720. The hydraulic cylinder 1716 is connected to a hydraulic circuit via a radial conduit 1730, axial conduit 1732 and radial conduit 1728 within the shaft. The housing conduit 1724 within housing 1726 that is associated with hydraulic connector 1722 assures a connection to the hydraulic circuit.

The torque transfer device with intermediate control system further includes a bearing 1734 having an annular channel 1736 to assure a continuous connection to radial conduit 1728. The axial conduit 1732 is locked by the cap 1740. The output disc 1714 is sustained within the input disc 1708 by gliding bearings. A separate bearing 1756 is positioned between the outer disc assembly 1714 and the housing 1726. The hydraulic circuit comprises hydraulic pipe 1742, control valve 1744, and hydraulic accumulator 1746 for intermediate energy storage and rapid system response, having the additional role of damping oscillations of the hydraulic fluid. The hydraulic fluid is pumped by hydraulic pump 1748 from tank 1750.

The accumulator performs the function of damping and reduction of wave amplitudes, by accumulating (i.e., removing) energy of a pressure peak (relative to a mean pressure level) and releasing the energy in a pressure low (relative to a mean pressure level). Waves are generated by system actuation. Constant flow is needed to provide accurate control. Control may be disrupted by reflecting and interfering waves. Accordingly, the positioning of an accumulator in the hydraulic control circuit enables the accumulator to eliminate perturbation effects in the main control system. Notably, in this implementation, the accumulator for the clutch has pressure damping function, not an energy storage function.

In this manner, the torque transfer device described herein increases efficiency as a result of the lower drag torque relative to a conventional system. Notably, the clutch of the system described herein provides the technological improvements of: very high power density, improved packaging, lower mass and complexity, and consequently lower cost.

Figure 18:
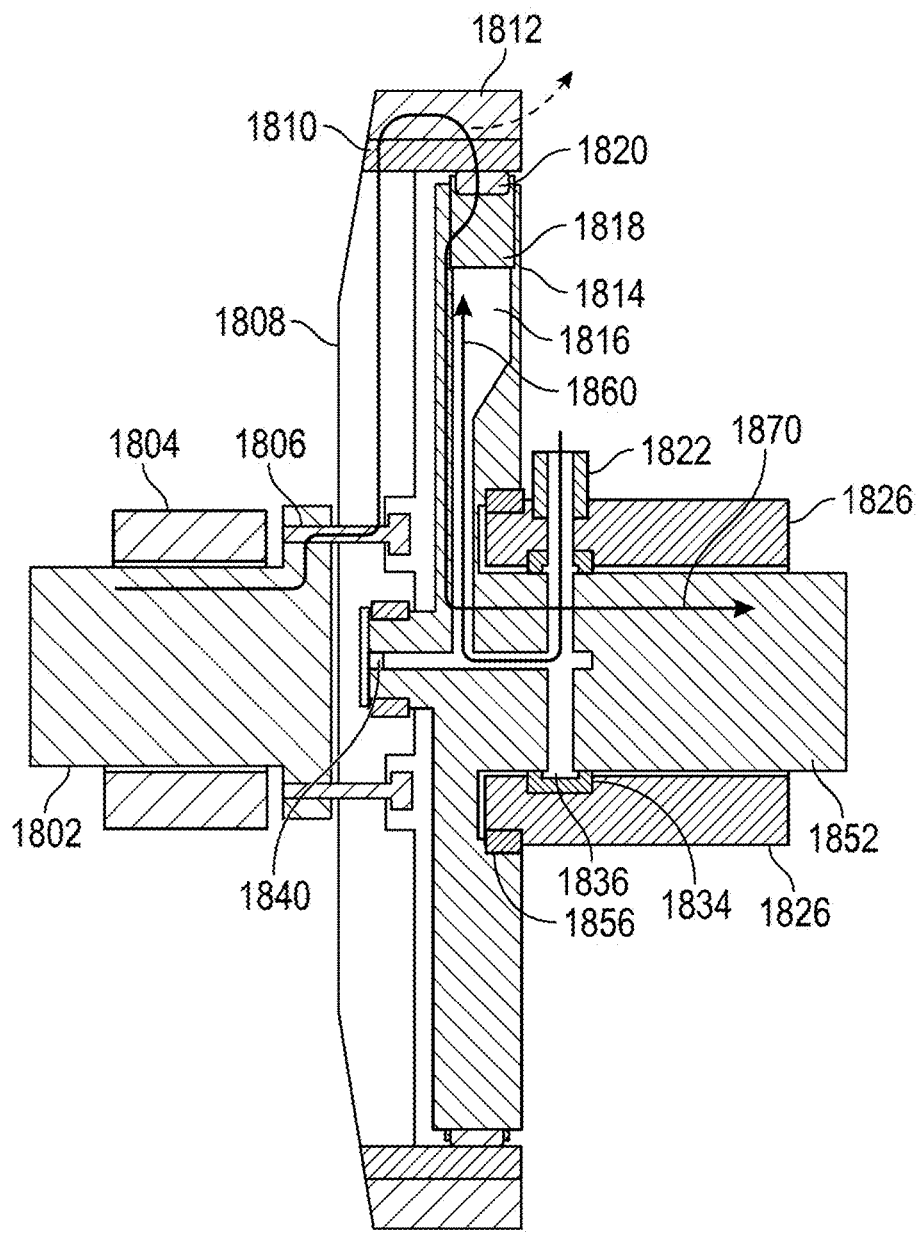
FIG. 18 is a sectional view showing the power/actuation hydraulic fluid path in the torque transfer device, according to at least one illustrated embodiment.

As shown in FIG. 18, the torque transfer device transfers torque in a controlled manner from an input shaft 1802 to an output shaft 1852. The input shaft 1802 is sustained by bearings 1804 and is coupled by fastening members 1806 to an input disc 1808 that is attached, for example, by welding, to an input ring 1810. The assembly of the input disc 1808 and input ring 1810 functions as a flywheel and has attached a gear 1812 to drive or be driven, for example, at the start-up of an internal combustion engine.

An output disc/body 1814 of the torque transfer device includes hydraulic cylinders 1816 and slidably engaged hydraulic pistons 1818, which are associated with rolling engagement element 1820. The hydraulic cylinders 1816 are connected to a hydraulic circuit via a radial conduit, axial conduit, and radial conduit within the shaft. A housing conduit within housing 1826 is associated with the hydraulic connector 1822, and assures a connection to the hydraulic circuit. The hydraulic fluid flows along the hydraulic fluid path 1860 from the housing conduit within the hydraulic connector 1822, through the dial conduit within the shaft, the axial conduit, the radial conduit, and into the hydraulic cylinders 1816 to actuate the hydraulic pistons 1818 and urge the associated rolling engagement elements 1820 against the input ring 1810.

The torque transfer device further includes a bearing 1834 having an annular channel 1836 to assure a continuous connection to the radial conduit. The axial conduit is locked by the cap 1840. The output disc 1814 is sustained within the input disc 1808 by gliding bearings. A separate bearing 1856 is positioned between the outer disc assembly 1814 and the housing 1826. When the rolling engagement elements 1820 have engaged the input ring 1810, the torque flows along the torque path 1870 from the input ring 1810, through the input disc 1808, input ring 1810, the rolling engagement elements 1820, the hydraulic pistons 1818, and into the output disc 1814 and the output shaft 1852.

Figure 19:
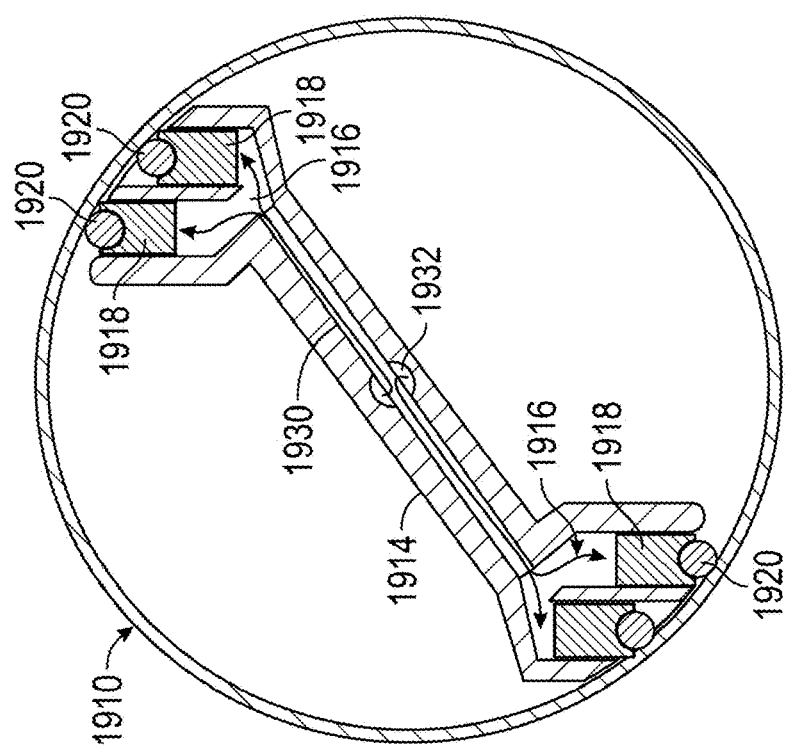
FIG. 19 is a cross-sectional view of the power/actuation hydraulic fluid path in the torque transfer device, according to at least one illustrated embodiment.

Referring now to FIG. 19, the torque transfer device transfers torque in a controlled manner from an input shaft to an output shaft. An output disc/body 1914 of the torque transfer device includes hydraulic cylinders and slidably engaged hydraulic pistons 1918 (offset radially), which are associated with rolling engagement elements 1920. The hydraulic cylinders are connected to a hydraulic circuit via a feeding channel 1916, radial conduit 1930, and axial conduit 1932. Due to the radial offset position of the hydraulic pistons 1918, the hydraulic pistons 1918 are locked, and transfer torque from the input disc 1910 to the output disc 1914 as long the hydraulic pistons 1918 are extended by hydraulic fluid pressure. In order to balance the torque transfer device, the hydraulic pistons 1918 are equally spaced in a symmetric manner about the inner periphery of the input ring 1910, as shown in FIG. 19. To create additional torque, additional pistons 1918 and roller engagement elements 1920 may be added around the inner periphery of the input ring 1910, and are actuated simultaneously, without increasing the overall width of the system. The supplementation of additional pistons 1918 and roller engagement elements 1920 also assures ease of manufacture scalability.

Figure 20:
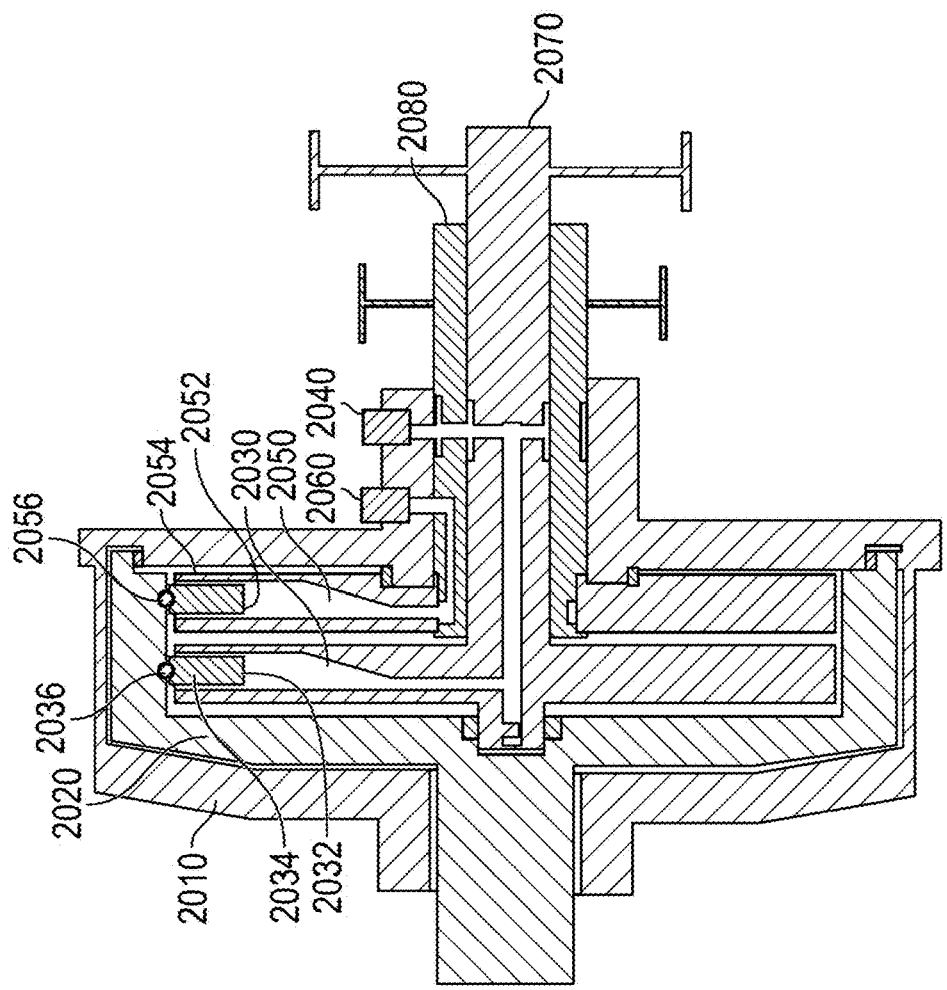
FIG. 20 is a sectional view of a dual clutch configuration of the torque transfer device, according to at least one illustrated embodiment.

FIG. 20 shows the application of the present torque transfer device in a dual clutch configuration using separate torque transfer devices/clutches for odd and even gear sets, to provide a fast-shifting, smooth operating transmission. This implementation of the torque transfer device includes a housing 2010, an input disc shaft and ring assembly 2020, a first radial piston torque transfer assembly 2030, a first hydraulic fluid conduit 2040, a second radial piston torque transfer assembly 2050, a second hydraulic fluid conduit 2060, a first output disc shaft and ring assembly 2070, and a second output disc shaft and ring assembly 2080. The first radial piston torque transfer assembly 2030 contains multiple hydraulic cylinders 2032 and pistons 2034 that are actuated by pressurized hydraulic fluid. The pistons 2034 each have mounted roller engagement elements 2036 that are urged into contact with the inner periphery of a ring portion of the input disc shaft and ring assembly 2020. When the roller engagement elements 2036 associated with the first radial piston torque transfer assembly 2030 are forced into pressurized contact with the input disc shaft and ring assembly 2020, then torque is transferred from the input disc shaft and ring assembly 2020 to the first output disc shaft and ring assembly 2070.

Correspondingly, the second radial piston torque transfer assembly 2050 contains multiple hydraulic cylinders 2052 and pistons 2054 that are actuated by pressurized hydraulic fluid. The pistons 2054 each have mounted roller engagement elements 2056 that are urged into contact with the inner periphery of a ring portion of the input disc shaft and ring assembly 2020. When the roller engagement elements 2056 associated with the second radial piston torque transfer assembly 2050 are forced into pressurized contact with the input disc shaft and ring assembly 2020, then torque is transferred from the input disc shaft and ring assembly 2020 to the second output disc shaft and ring assembly 2080.

Figure 21:
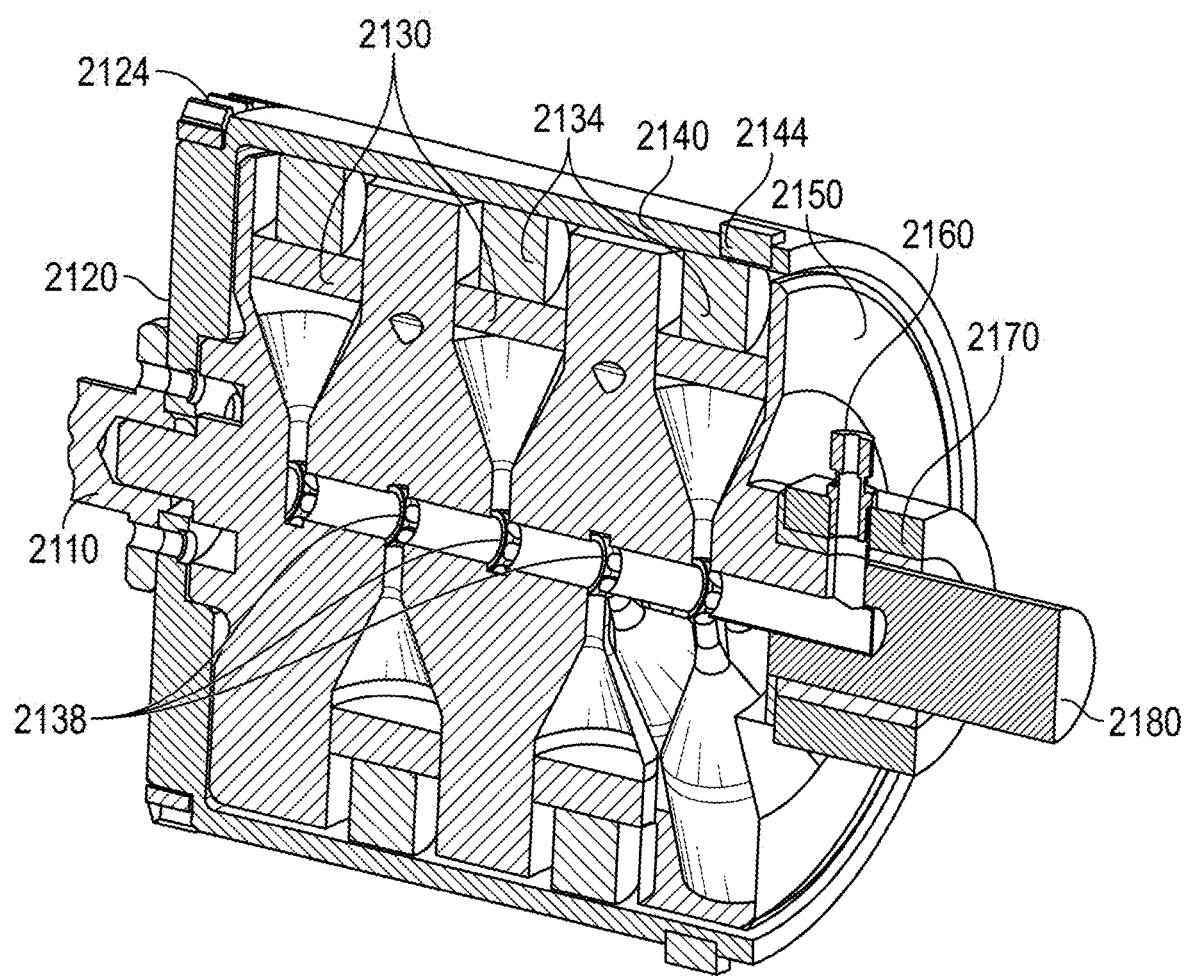
FIG. 21 is a perspective sectional view of a hydraulic piston torque transfer device for large torque applications with multiple layers of pistons, according to at least one illustrated embodiment.

FIG. 21 is a perspective sectional view of a hydraulic piston torque transfer device for large torque applications and lower pressure levels. For such high-torque/low-pressure implementations, a larger number of rows of pistons (e.g., five layers of pistons in FIG. 21) are employed to generate high transmission torque. This implementation of torque transfer device includes an input shaft 2110, an input disc 2120, actuation gears 2124, hydraulic pistons 2130, rolling engagement elements 2134, hydraulic fluid supply channels 2138, an input ring 2140, bearings 2144, an output cap 2150, a fixed hydraulic fluid supply connector 2160, a housing 2170, and an output shaft 2180. The actuation gears 2124 may attach to additional mechanical couplings, such as an engine starter. The torque transfer device contains multiple hydraulic pistons 2130 and rolling engagement elements 2134 that are actuated by pressurized hydraulic fluid that travels through the hydraulic fluid supply channels 2138 and the fixed hydraulic fluid supply connector 2160. The hydraulic pistons 2130 each have mounted roller engagement elements 2134 that are urged into contact with the inner periphery of the input ring 2140, which is connected to the input disc 2120 and the input shaft 2110. When the roller engagement elements 2134 are forced into pressurized contact with the input ring 2140, then torque is transferred from the input shaft 2110 to the output shaft 2180.

Figure 22:
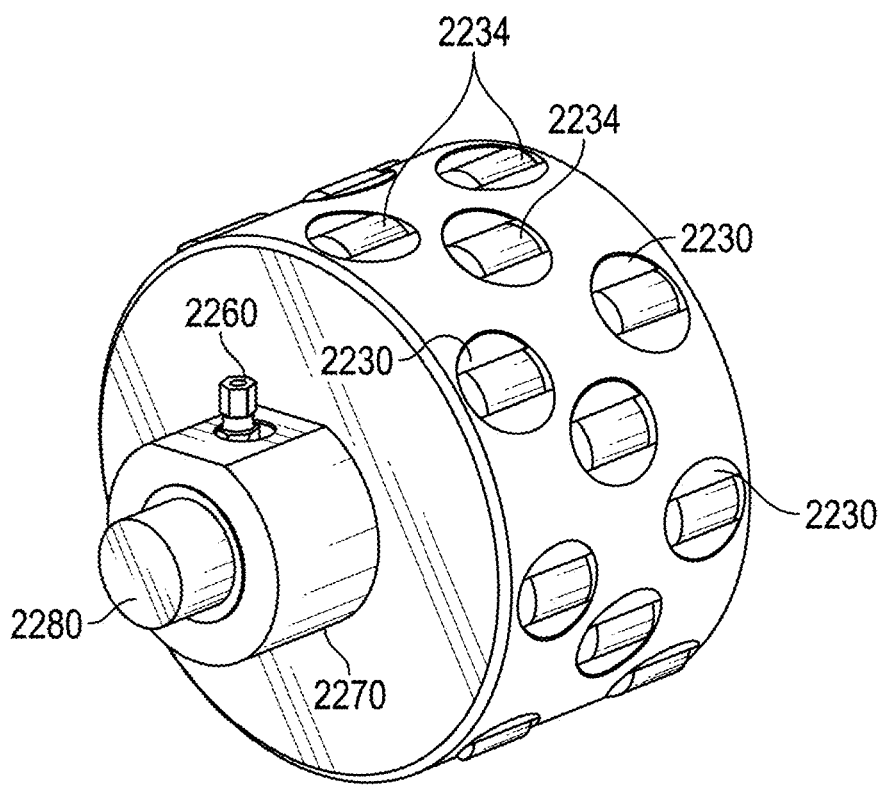
FIG. 22 is a perspective view of a hydraulic piston torque transfer device for large torque applications with multiple layers of pistons, according to at least one illustrated embodiment.

FIG. 22 is a perspective view of hydraulic piston torque transfer device for large torque applications and increased pressure levels. For high-torque/high-pressure implementations, a smaller number of rows of pistons are needed to generate the necessary transmission torque. For one such high-torque/high-pressure implementations shown in FIG. 22, three layers of pistons are employed that generate high transmission torque. Similarly to the implementation shown in FIG. 21, this implementation of the torque transfer device includes an input shaft (not shown), an input disc (not shown), hydraulic pistons 2230, rolling engagement elements 2234, hydraulic fluid supply channels (not shown), a ring (not shown), a fixed hydraulic fluid supply connector 2260, a housing 2270, and an output shaft 2280. The torque transfer device contains multiple hydraulic pistons 2230 and rolling engagement elements 2234 that are actuated by pressurized hydraulic fluid that travels through the hydraulic fluid supply channels and the fixed hydraulic fluid supply connector 2260. The hydraulic pistons 2230 each have mounted roller engagement elements 2234 that are urged into contact with the inner periphery of the supporting ring (not shown), which is connected to the input disc and the input shaft. When the roller engagement elements 2234 are forced into pressurized contact with the input ring (not shown), then torque is transferred from the input shaft to the output shaft 2280.

Figure 23:
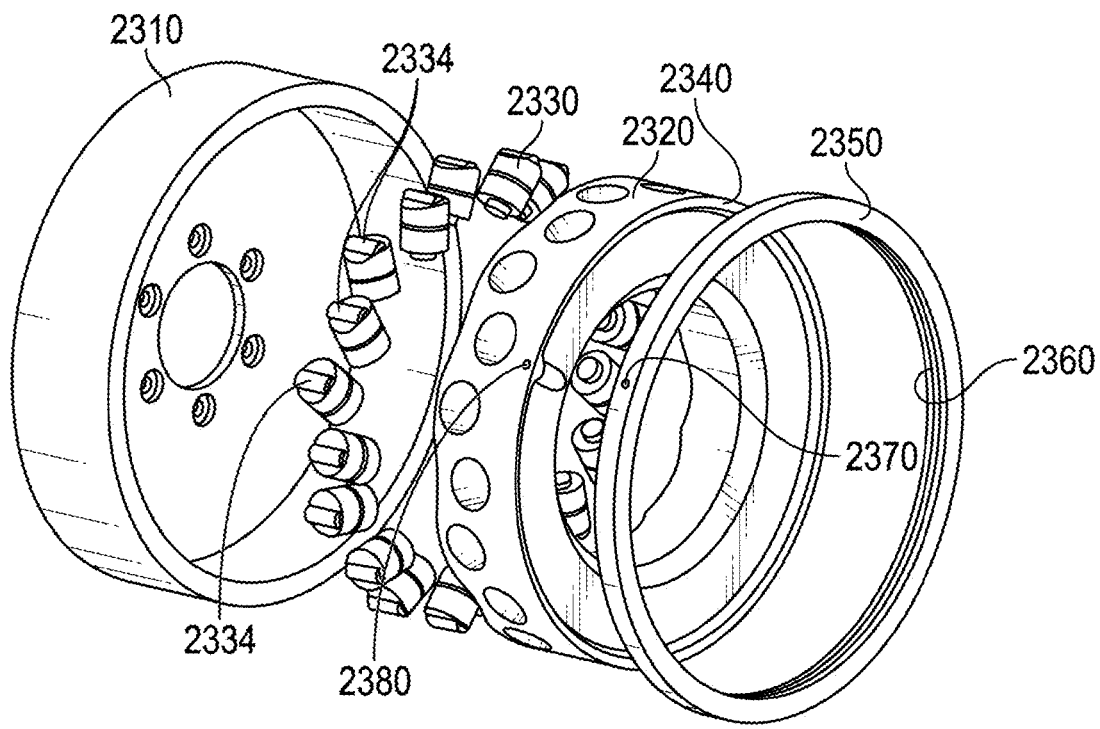
FIG. 23 illustrates an exploded perspective view of the multiple piston torque transfer device, according to at least one illustrated embodiment.

Referring now to FIG. 23, an exploded perspective view of the multiple piston torque transfer device is shown that relates to the implementation in FIG. 4C. For implementations in which a hollow space is needed inside the torque transfer system, the positioning of the pistons remains the same, while changes are made only to the actuation path of the hydraulic fluid, in order to be directed from the outside instead of the inside. This torque transfer device has a design structure dedicated to external feeding, as shown in FIG. 23. The torque transfer device includes an input hub 2310 and an output hub 2320 designed to carry the transformer piston assembly 2330. The transformer piston assembly 2330 includes rolling engagement elements 2334 that are actuated by pressurized hydraulic fluid into contact with the inner periphery of the input hub 2310. The output hub 2320 also includes an annular feeding channel 2340. The torque transfer device includes a fixed hydraulic liquid feeding ring 2350 that contains the annular feeding channel 2360 and an external feeding hydraulic connection 2370.

The output hub 2320 further includes an orifice 2380 that connects in rotating displacement the hydraulic channels 2340 and 2360. The orifice 2380 and the hydraulic channels 2340 and 2360 provide the pathway from the hydraulic fluid that is used to actuate the rolling engagement elements 2334 of the transformer piston assembly 2330. The output hub 2320 contains a feeding channel 2438 (shown in FIG. 24) that is aligned with the annular feeding channel 2360 of the fixed hydraulic liquid feeding ring 2350, so that there is a continuous, permanent flow path for the oil, from the annular feeding channel 2360 to the feeding channel 2438.

FIGS. 24A and 24B illustrate a front view of the multiple piston torque transfer device shown in FIG. 23, in which a hollow space is needed inside the torque transfer system. In FIG. 24A, the torque transfer device includes an input hub 2410 and an output hub 2416 that is configured to carry the hydraulic cylinders 2420 and the transformer pistons 2430. The transformer pistons 2430 include rolling engagement elements 2434 that are actuated by pressurized hydraulic fluid into contact with the inner periphery of the input hub 2410. The output hub 2416 also includes an annular feeding channel 2440. Referring now to FIG. 24B, the torque transfer device includes a fixed hydraulic liquid feeding ring 2450 that contains the annular feeding channel 2460 and an external feeding hydraulic connection 2470. As described above with respect to FIG. 23, the annular feeding channel 2440 is connected to the feeding space 2438 that assures the hydraulic path actuates the transformer pistons 2430 by flowing through annular feeding channel 2440.

In any of the clutches and torque transfer devices described herein, the torque transferred by the clutch or the torque transfer device is directly proportional to a pressure exerted against a piston or a plurality of pistons of the clutch or of the torque transfer device. Targets for many clutches and torque transfer devices include the capability to transfer up to 150 Nm of torque, to rotate at up to 5500 rpm, to operate at 300-600 psi, and to have a coupling time between 0.1 and 0.5 seconds. Prior clutches and torque transfer devices have been capable of transferring up to 160 Nm of torque, rotating at up to 6000 rpm, operating at up to 580 psi, and having a coupling time between 0.1 and 0.5 seconds. The clutches and torque transfer devices described herein are capable of transferring up to 1500 Nm of torque, rotating at up to 10000 rpm, operating at up to 2200 psi, and having a coupling time between 0.1 and 0.5 seconds. In particular, it has been calculated that, by appropriate selection of a volume of a working fluid, a configuration of a pipe orifice, and a valve actuation time, the clutches and torque transfer devices described herein are capable of coupling from 0% to 100% in 0.1 seconds, although this time can be increased as needed to accommodate drivability demands.

Figure 25:
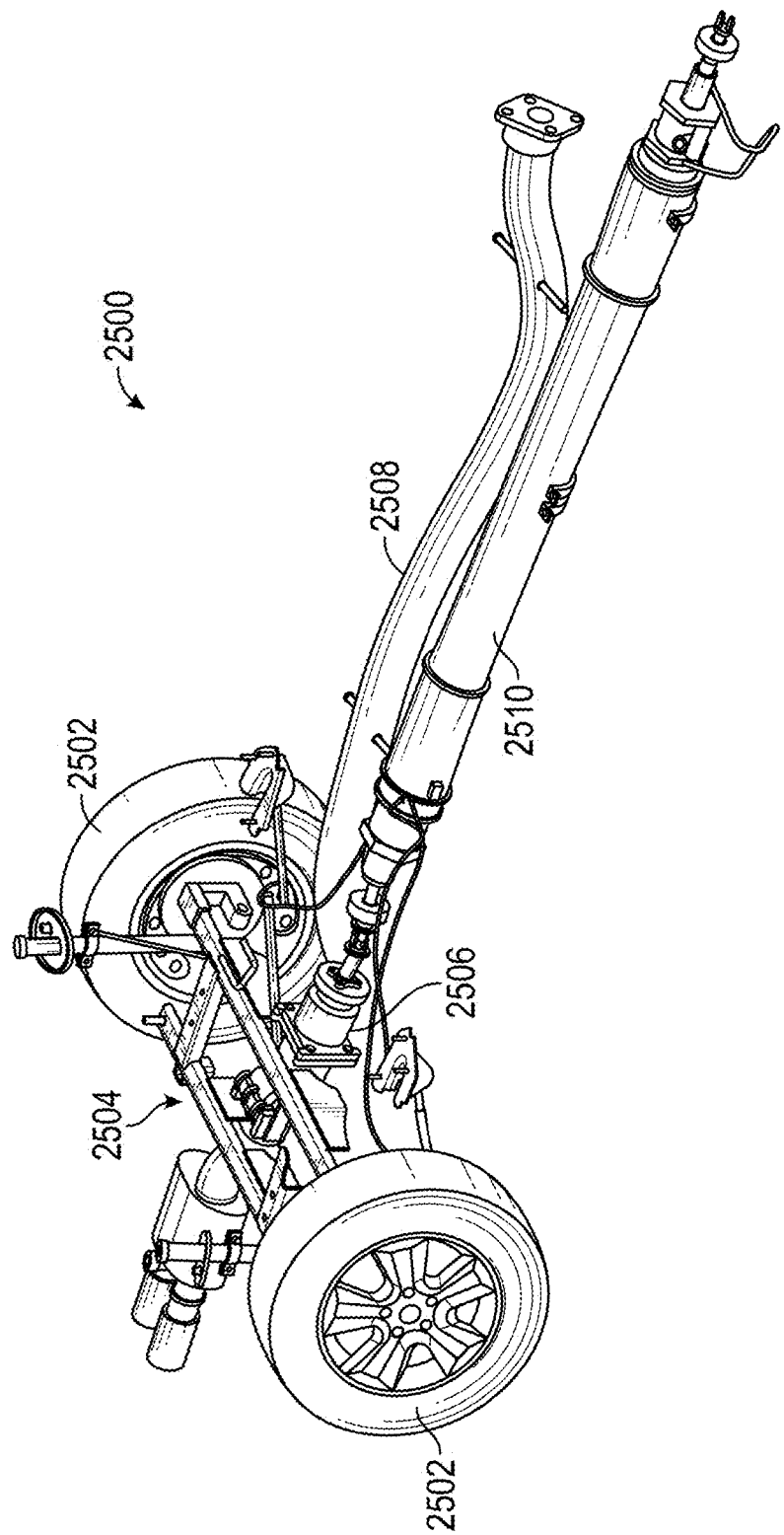
FIG. 25 illustrates a perspective view of various components of an automobile including a brake energy recovery system, according to at least one illustrated embodiment.
Figure 26:
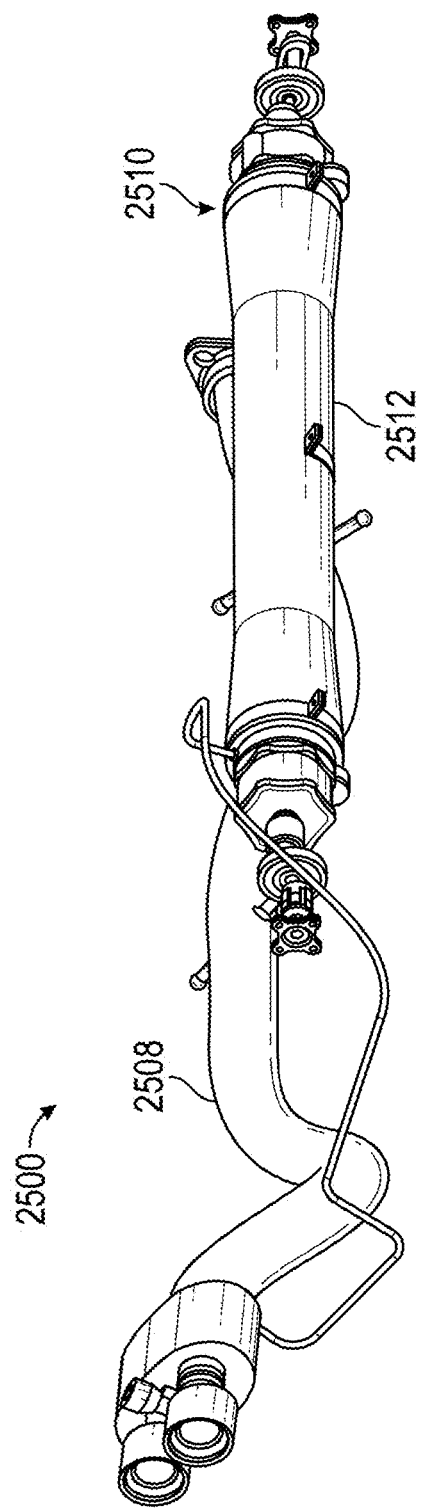
FIG. 26 illustrates a perspective view of some of the components illustrated in FIG. 25, according to at least one illustrated embodiment.

FIG. 25 illustrates various components of an automobile 2500. In particular, FIG. 25 illustrates a pair of wheels 2502 connected by a rear axle 2504, a rear differential 2506, an exhaust pipe 2508 including a waste heat recovery system, and a brake energy recovery system 2510. FIG. 26 illustrates some of the components of the automobile 2500 illustrated in FIG. 25, including the exhaust pipe 2508, which has a waste heat recovery system, and the brake energy recovery system 2510, which has a dual high-pressure and low-pressure accumulator 2512.

Figure 27:
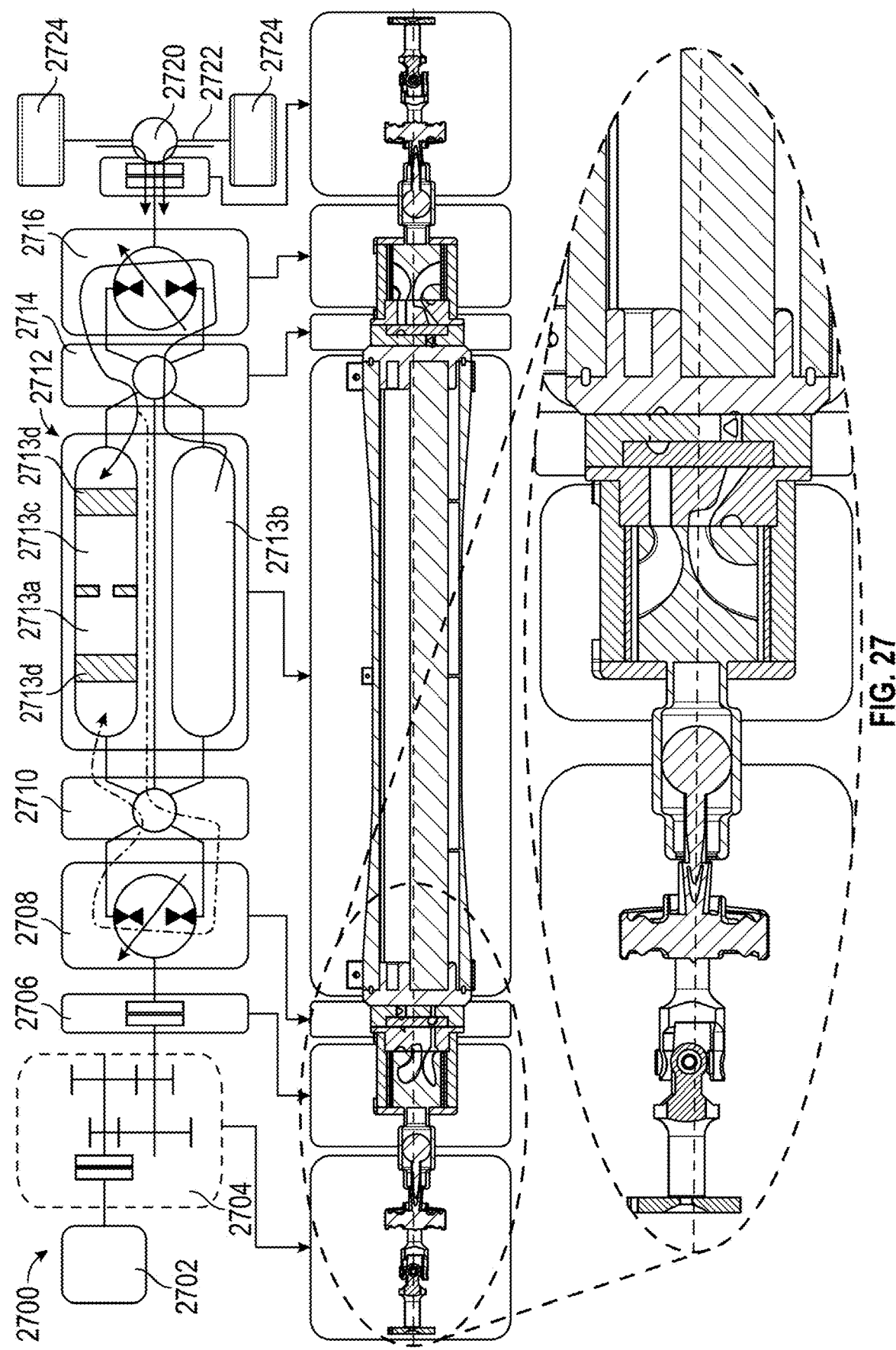
FIG. 27 illustrates schematic and cross-sectional views of components of a brake energy recovery system, according to at least one illustrated embodiment.

FIG. 27 illustrates a rear-wheel drive system 2700 of an automobile. The drive system 2700 includes an internal combustion engine 2702, a vehicle gearbox 2704 mechanically coupled to an output of the engine 2702, and a first clutch or torque transfer device 2706 mechanically coupled to an output of the gearbox 2704. The drive system 2700 also includes a first hydraulic pump 2708 (which can be inverted to operate as a hydraulic motor) mechanically coupled to an output of the clutch 2706, and a first flow control valve 2710 hydraulically coupled at first and second ports to an inlet and an outlet of the first hydraulic pump 2708.

The drive system 2700 also includes an accumulator 2712 hydraulically coupled to third and fourth ports of the first flow control valve 2710, a second flow control valve 2714 hydraulically coupled at first and second ports to the accumulator 2712, and a second hydraulic pump 2716 (which can be inverted to operate as a hydraulic motor) hydraulically coupled to third and fourth ports of the second flow control valve 2714. The drive system 2700 also includes a second clutch or torque transfer device 2718 mechanically coupled to the second hydraulic pump 2716, a differential 2720 mechanically coupled to the clutch 2718, an axle 2722 mechanically coupled to the differential 2720, and a pair of wheels 2724 mounted on the axle 2722.

The accumulator 2712 is a dual-sided accumulator coupled at its first side to the first flow control valve 2710 and at its second side to the second flow control valve 2714. The accumulator 2712 includes parallel and integrated high-pressure and low-pressure accumulators 2713a and 2713b, respectively. The high-pressure accumulator 2713a includes a compressible gas 2713c positioned and sealed between two movable pistons 2713d.

The first flow control valve 2710 is coupled at its first port to an output of the first hydraulic pump 2708, at its second port to an input of the first hydraulic pump 2708, at its third port to the high-pressure accumulator 2713a, and at its fourth port to the low-pressure accumulator 2713b. In a first position of the first flow control valve 2710, illustrated in FIG. 27, the first and third ports of the first flow control valve 2710 are coupled to one another to hydraulically couple the output of the hydraulic pump 2708 to the high-pressure accumulator 2713a. Further, in the first position, the second and fourth ports of the first flow control valve 2710 are coupled to one another to hydraulically couple the input of the hydraulic pump 2708 to the low-pressure accumulator 2713b. The first flow control valve 2710 can be switched from its first position to a second position, in which the first and fourth ports couple the output of the hydraulic pump 2708 to the low-pressure accumulator 2713b, and the second and third ports couple the input of the hydraulic pump 2708 to the high-pressure accumulator 2713b.

The second flow control valve 2714 is coupled at its first port to the high-pressure accumulator 2713a, at its second port to the low-pressure accumulator 2713b, at its third port to an output of the second hydraulic pump 2716, and at its fourth port to an input of the second hydraulic pump 2716. In a first position of the second flow control valve 2714, illustrated in FIG. 27, the first and third ports of the second flow control valve 2714 are coupled to one another to hydraulically couple the output of the hydraulic pump 2716 to the high-pressure accumulator 2713a. Further, in the first position, the second and fourth ports of the second flow control valve 2714 are coupled to one another to hydraulically couple the input of the hydraulic pump 2716 to the low-pressure accumulator 2713b. The second flow control valve 2714 can be switched from its first position to a second position, in which the first and fourth ports couple the input of the hydraulic pump 2716 to the high-pressure accumulator 2713a and the second and third ports couple the output of the hydraulic pump 2716 to the low-pressure accumulator 2713b.

The first and second hydraulic pumps 2708 and 2716 have any suitable configuration known in the field of hydraulic pumps that allows them to be reversed or inverted to act as hydraulic motors, with vane-type hydraulic pumps being one example. The first and second clutches 2706 and 2718 have configurations matching any of the clutches or torque transfer devices described herein. The gearbox 2704 has a configuration matching any of the gearboxes described herein. The engine 2702, the differential 2720, axle 2722, and wheels 2724 have well-known and conventional configurations.

The drive system 2700 replaces a traditional drive shaft coupling a gearbox to a differential. Thus, during operation of the drive system 2700, power generated by the engine 2702 can be transferred through the gearbox 2704, the first clutch 2706, the first hydraulic pump 2708, the first flow control valve 2710, the accumulator 2712, the second flow control valve 2714, the second hydraulic pump 2716, the second clutch 2718, the differential 2720, the axle 2722, and to the wheels 2724. The engine 2702 can be run continuously at its most efficient operating parameters. When power demanded at the wheels 2724 is greater than power supplied by the engine 2702, the drive system 2700 releases some of the energy stored in the accumulator 2712. When power demanded at the wheels 2724 is less than power supplied by the engine 2702, the drive system 2700 stores some of the energy provided by the engine 2702 in the accumulator 2712. The drive system 2700 provides a continuously variable transmission capable of providing any required power to the wheels 2724 independent of the power supplied by the engine 2702.

During deceleration, the valves 2710 and 2714 are turned to their respective first positions and the wheels 2724 are used as a source of mechanical power that drives operation of the first and second hydraulic pumps 2708 and 2716 to pump fluid from the low-pressure accumulator 2713b to the high-pressure accumulator 2713a, to recover and store energy for later. The drive system 2700 thus recovers energy from the wheels 2724 and stores it in the accumulator 2712. During acceleration, the valves 2710 and 2714 are turned to their respective second positions and the pumps 2708 and 2716 are inverted to operate as hydraulic motors. Thus, high-pressure fluid held within the high-pressure accumulator 2713a is released to flow through the motors to the low-pressure accumulator 2713b to drive operation of the hydraulic motors to increase the rotational speed of the wheels 2724. The drive system 2700 thus discharges energy from the accumulator 2712 to drive the wheels 2724. In such an implementation, the accumulator 2712 recovers energy from, or provides energy to, the wheels 2724 depending on the circumstances, improving overall efficiency.

Figure 28:
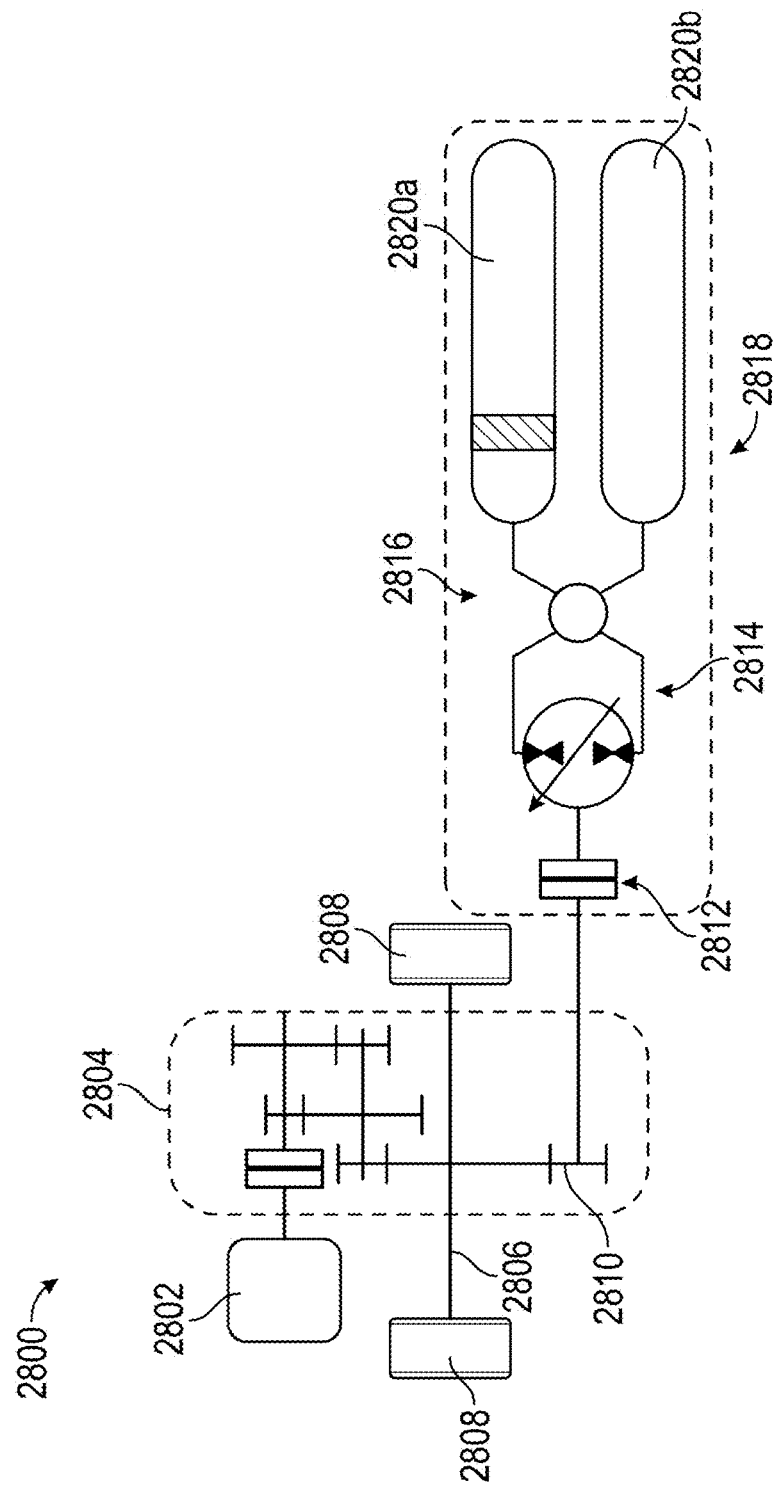
FIG. 28 illustrates a brake energy recovery system integrated with other components of a front-wheel drive system of an automobile via a set of gears, according to at least one illustrated embodiment.

FIG. 28 illustrates a front-wheel drive system 2800 of an automobile. The drive system 2800 includes an internal combustion engine 2802, a vehicle gearbox 2804 mechanically coupled to an output of the engine 2802, a front axle 2806 mechanically coupled to an output of the gearbox 2804, and a pair of wheels 2808 mounted on the axle 2806. The drive system 2800 also includes an additional drive gear 2810 mechanically coupled to the front axle 2806, a clutch or torque transfer device 2812 mechanically coupled to the additional drive gear 2810, a hydraulic pump 2814, which can be inverted to operate as a hydraulic motor, mechanically coupled to an output of the clutch 2812, and a flow control valve 2816 hydraulically coupled at first and second ports to an inlet and an outlet of the hydraulic pump 2814.

The drive system 2800 also includes an accumulator 2818 hydraulically coupled to third and fourth ports of the first flow control valve 2816. The accumulator 2818 is a single-sided accumulator coupled at its single side to the flow control valve 2816. The accumulator 2818 includes parallel and integrated high-pressure and low-pressure accumulators 2820a and 2820b, respectively. The drive system 2800 functions in the same manner as the drive system 2700 except that it is a front-wheel drive system, it includes a single-sided accumulator 2818 coupled to the front axle 2806 by the additional drive gear 2810, and it does not replace any mechanical connections between any of the other components of the automobile (e.g., it does not replace a traditional drive shaft).

Figure 29:
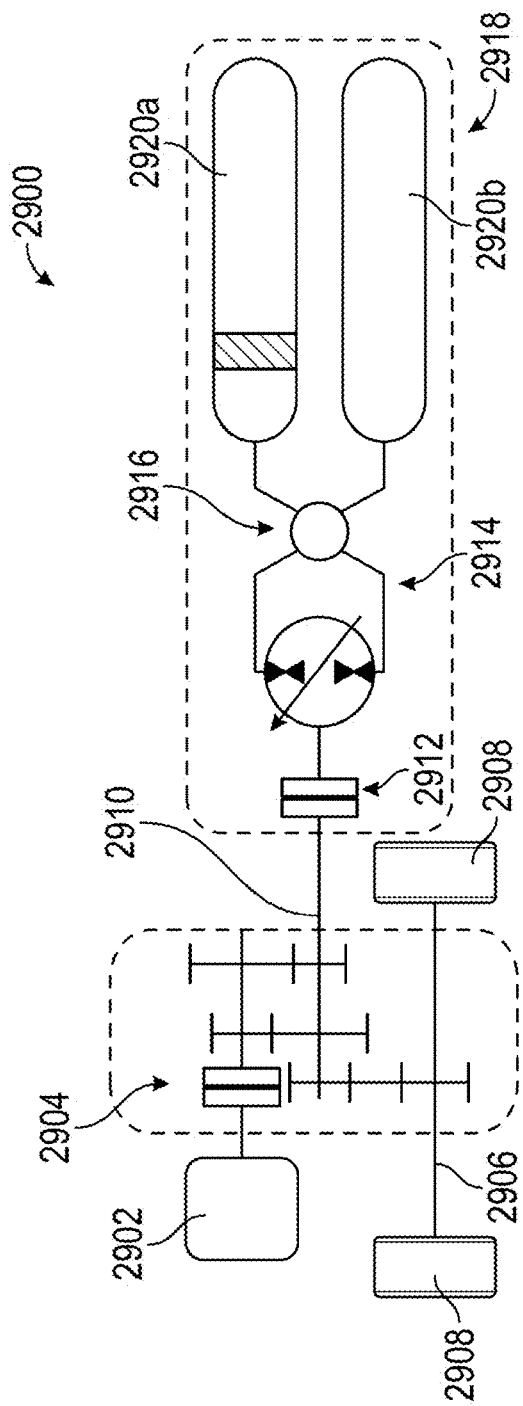
FIG. 29 illustrates a brake energy recovery system integrated with other components of a front-wheel drive system of an automobile via a shaft, according to at least one illustrated embodiment.

FIG. 29 illustrates a front-wheel drive system 2900 of an automobile. The drive system 2900 includes an internal combustion engine 2902, a vehicle gearbox 2904 mechanically coupled to an output of the engine 2902, a front axle 2906 mechanically coupled to an output of the gearbox 2904, and a pair of wheels 2908 mounted on the axle 2906. The drive system 2900 also includes an extension 2910 of a shaft of the gearbox 2904, a clutch or torque transfer device 2912 mechanically coupled to the extension 2910 of the shaft of the gearbox 2904, a hydraulic pump 2914, which can be inverted to operate as a hydraulic motor, mechanically coupled to an output of the clutch 2912, and a flow control valve 2916 hydraulically coupled at first and second ports to an inlet and an outlet of the hydraulic pump 2914.

The drive system 2900 also includes an accumulator 2918 hydraulically coupled to third and fourth ports of the first flow control valve 2916. The accumulator 2918 is a single-sided accumulator coupled at its single side to the flow control valve 2916. The accumulator 2918 includes parallel and integrated high-pressure and low-pressure accumulators 2920a and 2920b, respectively. The drive system 2900 functions in the same manner as the drive system 2700 except that it is a front-wheel drive system, it includes a single-sided accumulator 2918 coupled to the gearbox 2904 by the extension 2910 of the shaft of the gearbox 2904, and it does not replace any mechanical connections between any of the other components of the automobile (e.g., it does not replace a traditional drive shaft).

Figure 30:
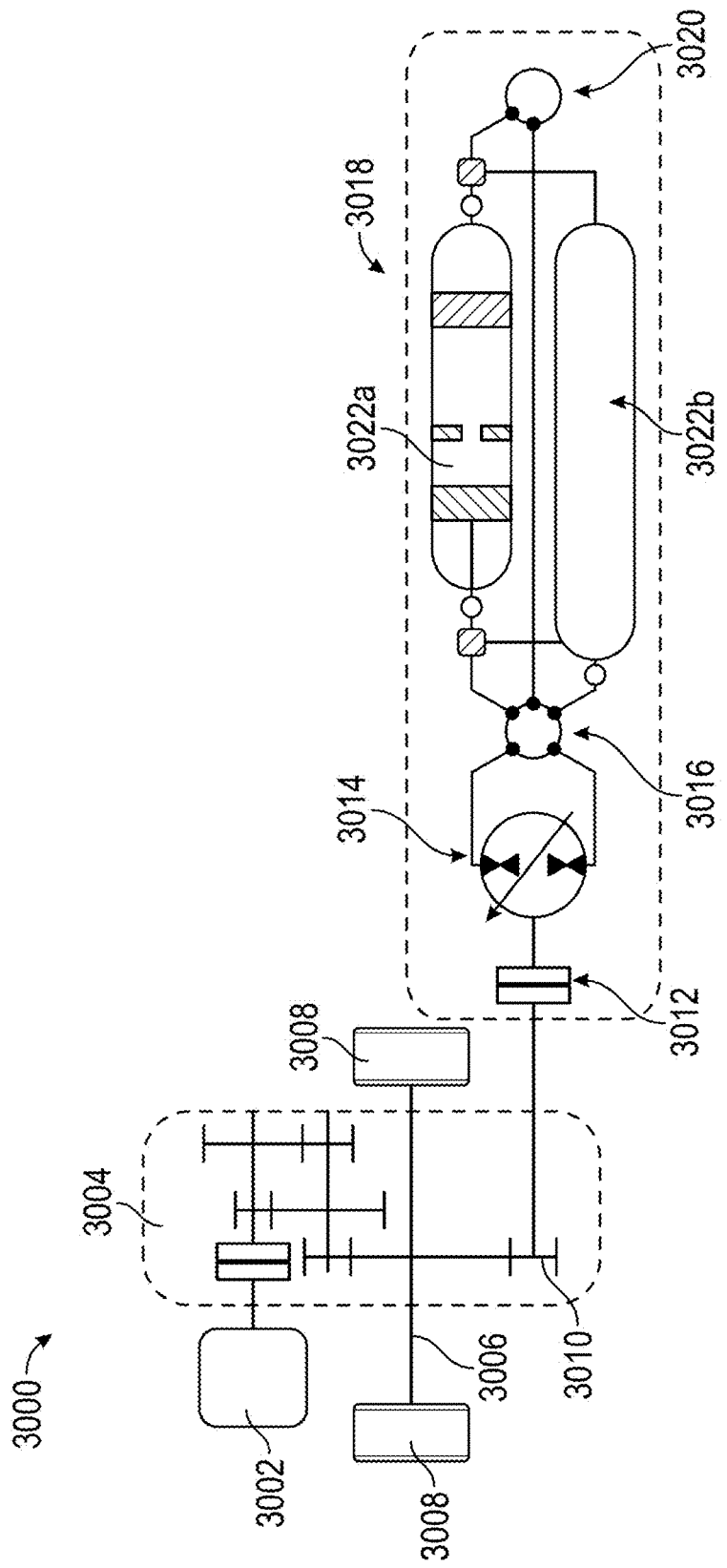
FIG. 30 illustrates a dual-sided brake energy recovery system integrated with other components of a front-wheel drive system of an automobile, according to at least one illustrated embodiment.

FIG. 30 illustrates a front-wheel drive system 3000 of an automobile. The drive system 3000 includes an internal combustion engine 3002, a vehicle gearbox 3004 mechanically coupled to an output of the engine 3002, a front axle 3006 mechanically coupled to an output of the gearbox 3004, and a pair of wheels 3008 mounted on the axle 3006. The drive system 3000 also includes an additional drive gear 3010 mechanically coupled to the front axle 3006, a clutch or torque transfer device 3012 mechanically coupled to the additional drive gear 3010, a hydraulic pump 3014, which can be inverted to operate as a hydraulic motor, mechanically coupled to an output of the clutch 3012, and a flow control valve 3016 hydraulically coupled at first and second ports to an inlet and an outlet of the hydraulic pump 3014.

The drive system 3000 also includes an accumulator 3018 hydraulically coupled to third and fourth ports of the first flow control valve 3016. The accumulator 3018 is a dual-sided accumulator coupled at its first side directly to the flow control valve 3016 and at its second side to the flow control valve 3016 via a second flow control valve 3020. The accumulator 3018 includes parallel and integrated high-pressure and low-pressure accumulators 3022a and 3022b, respectively. The drive system 3000 functions in the same manner as the drive system 2800 except that it includes a dual-sided accumulator 3018 and a second flow control valve 3020 rather than a single-sided flow control valve.

The drive system 3000 includes the additional drive gear 3010 and the clutch 3012 coupled to the additional drive gear 3010, in a manner similar to that described above for drive system 2800. In an alternative implementation, the drive system 3000 includes an extension of a shaft of the gearbox 3004, and the clutch 3012 is mechanically coupled to the extension, in a manner similar to that described above for drive system 2900.

Figure 31A:
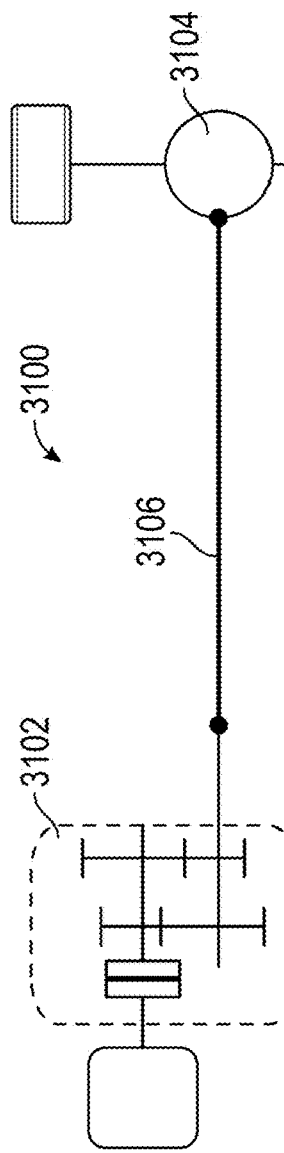
FIG. 31A illustrates a rear-wheel drive system of an automobile, according to at least one illustrated embodiment.
Figure 31B:
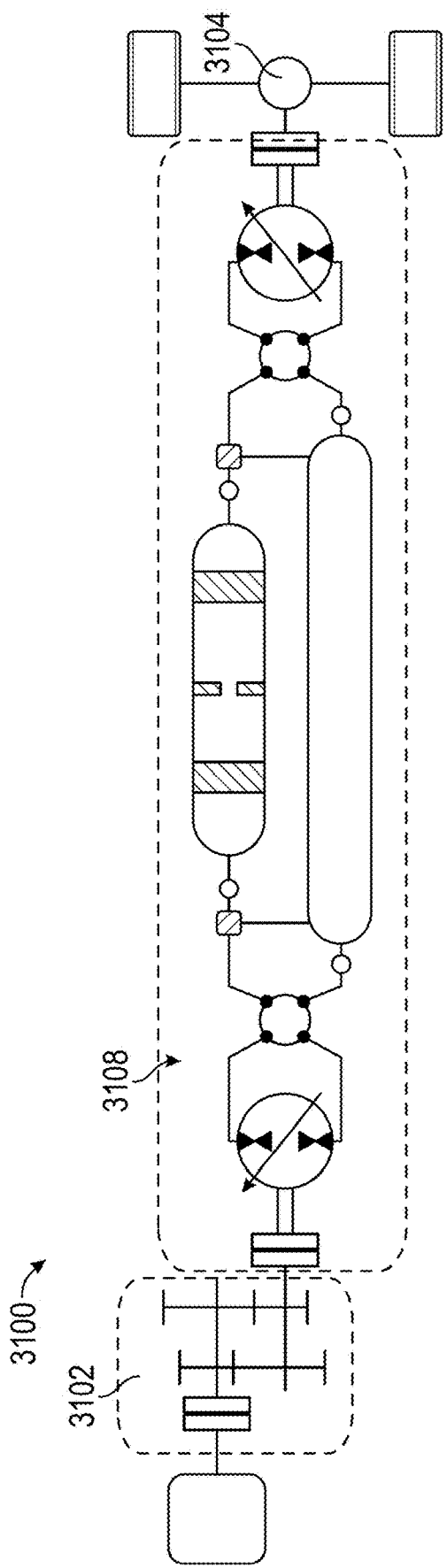
FIG. 31B illustrates a brake energy recovery system in place of a drive shaft of the rear-wheel drive system illustrated in FIG. 31A, according to at least one illustrated embodiment.

FIG. 31A illustrates a conventional (e.g., prior art) rear-wheel drive system 3100 of an automobile. The drive system 3100 includes a gearbox 3102, a rear differential 3104, and a drive shaft 3106 mechanically coupling the gearbox 3102 to the rear differential 3104. FIG. 31B illustrates the rear-wheel drive system 3100 of FIG. 31A with a brake energy recovery system 3108 in place of the drive shaft 3106. The brake energy recovery system 3108 has features matching those of the drive system 2700 described above with respect to FIG. 27.

Figure 32A:
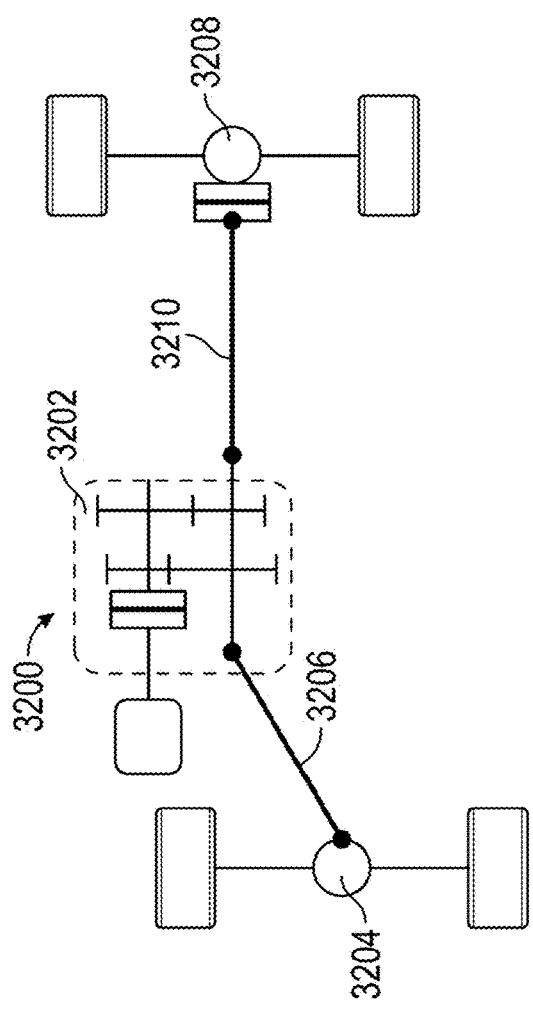
FIG. 32A illustrates an all-wheel drive system of an automobile, according to at least one illustrated embodiment.
Figure 32B:
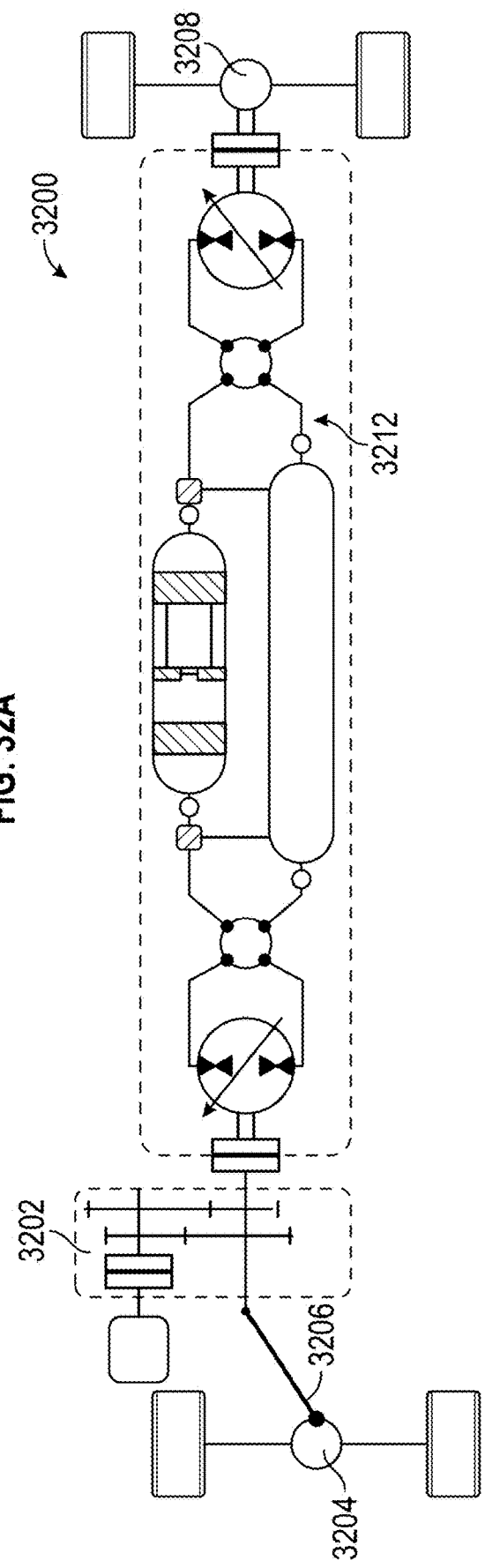
FIG. 32B illustrates a brake energy recovery system in place of a drive shaft of the all-wheel drive system illustrated in FIG. 32A, according to at least one illustrated embodiment.

FIG. 32A illustrates a conventional (e.g., prior art) all-wheel drive system 3200 of an automobile. The drive system 3200 includes a gearbox 3202, a front differential 3204, a front drive shaft 3206 mechanically coupling the gearbox 3202 to the front differential 3204, a rear differential 3208, and a rear drive shaft 3210 mechanically coupling the gearbox 3202 to the rear differential 3208. FIG. 32B illustrates the rear-wheel drive system 3200 of FIG. 32A with a brake energy recovery system 3212 in place of the drive shaft 3210. The brake energy recovery system 3212 has features matching those of the drive system 2700 described above with respect to FIG. 27.

Figure 32C:
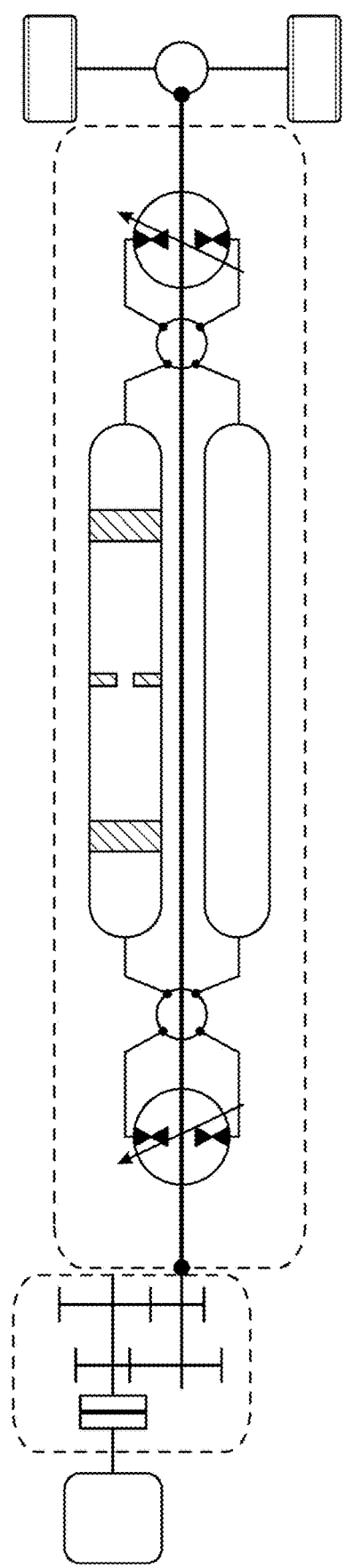
FIG. 32C illustrates a Rear Wheel Drive system coupled Double Acting Brake Energy Recovery System—Structure with integrated direct mechanical transmission.
Figure 32D:
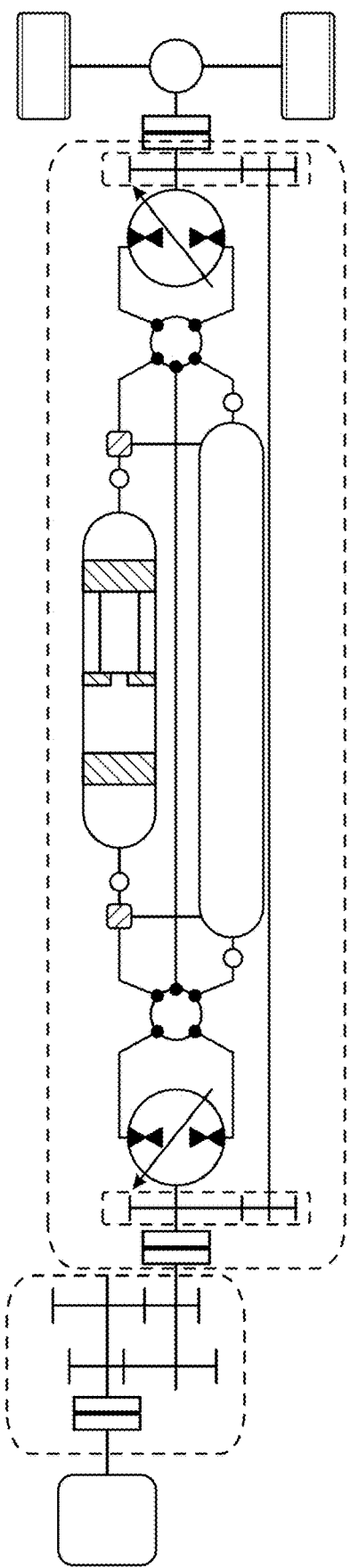
FIG. 32D illustrates a Rear Wheel Drive system coupled Double Acting Brake Energy Recovery System—Structure with integrated power split transmission.
Figure 32E:
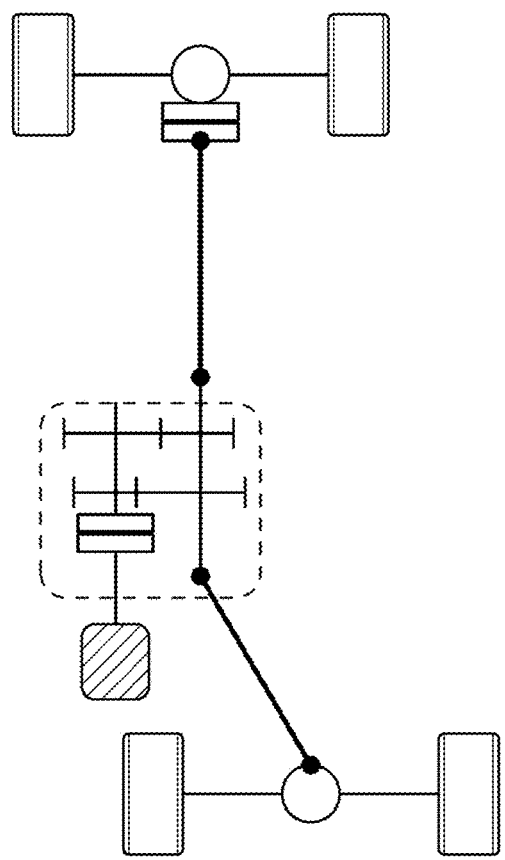
FIG. 32E illustrates an All Wheel Drive system coupled Double Acting Brake Energy Recovery System with a basic structure.

FIG. 32C illustrates a rear wheel drive system coupled to a Double Acting Brake Energy Recovery System with a structure having an integrated direct mechanical transmission. In FIG. 32D, for a Double Acting Brake Energy Recovery System, the structure includes an integrated direct mechanical transmission for vehicles that operate at high speeds (velocity) and for vehicles in which efficiency reduction induced by hydraulic losses must be avoided (e.g., school buses, parcel service vehicles, delivery vans and pick-ups, taxis, and the like). The hydrostatic run mode enables low load/low speed operating conditions to be achieved at optimum engine map points (curves) by continuously storing and releasing energy.

Referring now to FIG. 32D, a rear wheel drive system coupled with a Double Acting Brake Energy Recovery System is illustrated with a structure having an integrated power split transmission. In FIG. 32D, for a Double Acting Brake Energy Recovery System, the structure includes an integrated power split transmission for vehicles that require larger ranges of mechanical gear ratios coupled with continuous transmission ratios control, which allows for optimum engine map run (e.g., heavy duty vehicles, construction, forestry vehicles, and the like). The structure in FIG. 32D relies on conventional gear sets.

Figure 32F:
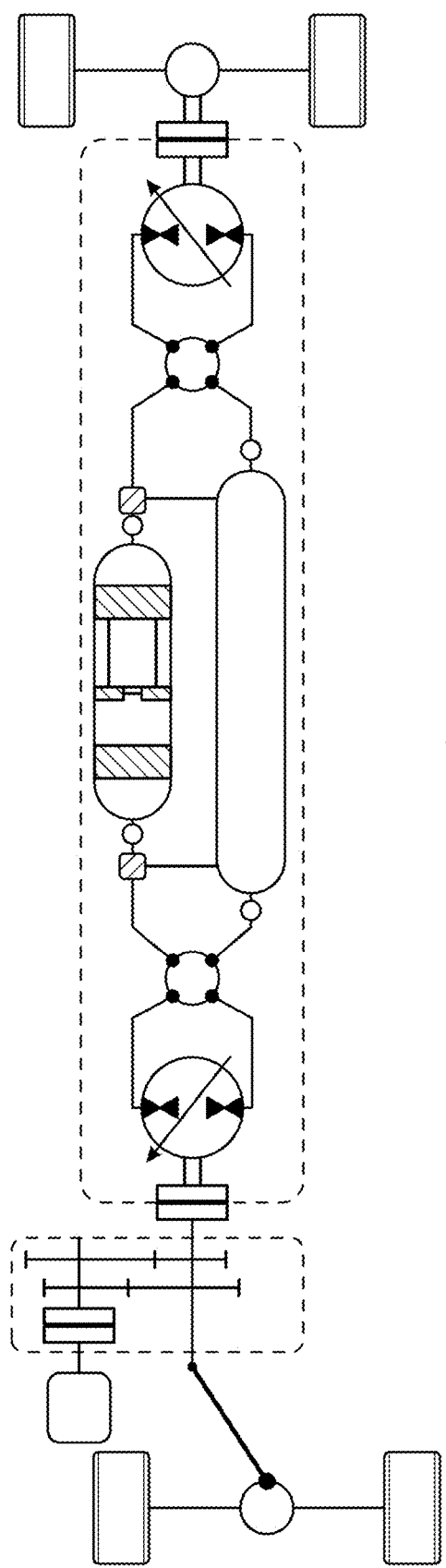
FIG. 32F illustrates an All Wheel Drive system coupled Double Acting Brake Energy Recovery System.
Figure 32G:
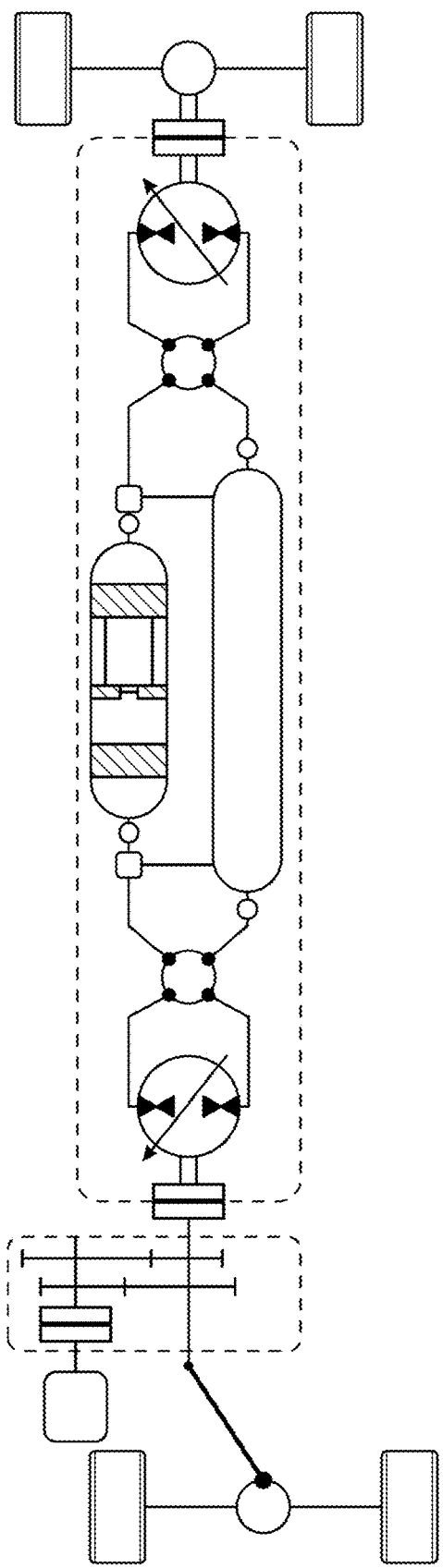
FIG. 32G illustrates an All Wheel Drive system coupled Double Acting Brake Energy Recovery System with a structure having an integrated hydrostatic transmission.
Figure 32H:
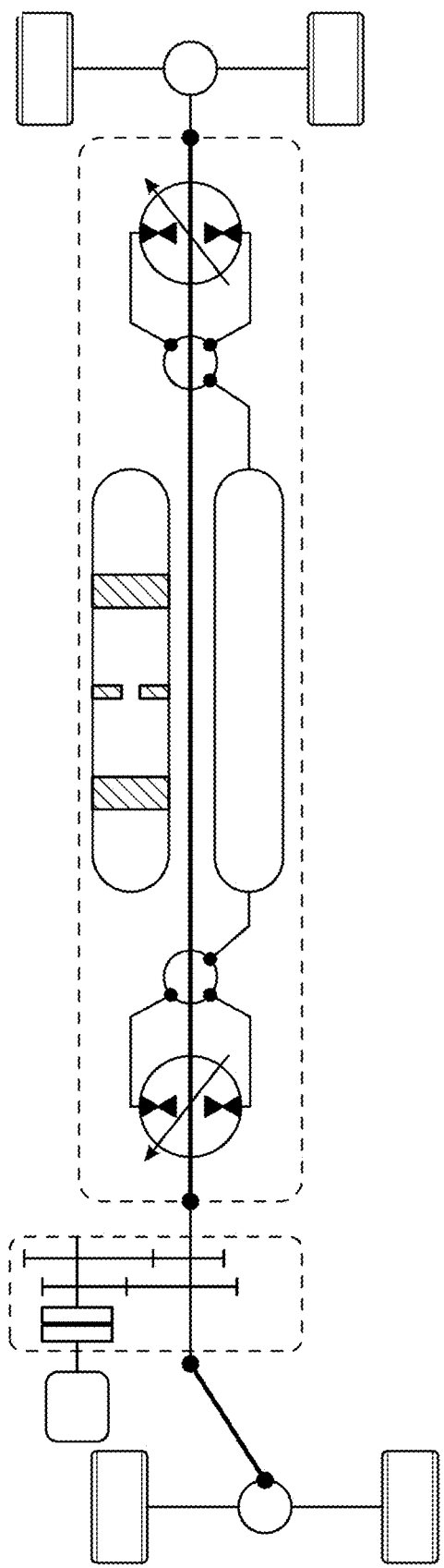
FIG. 32H illustrates an All Wheel Drive system coupled Double Acting Brake Energy Recovery System with a structure having an integrated direct mechanical transmission.
Figure 32I:
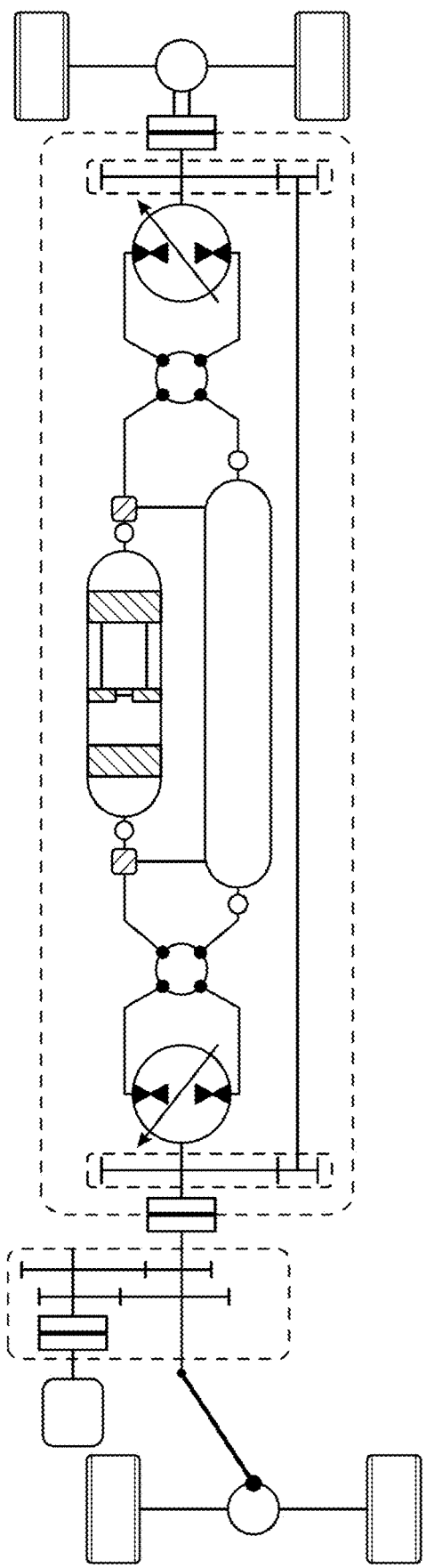
FIG. 32I illustrates an All Wheel Drive system coupled Double Acting Brake Energy Recovery System with a structure having an integrated power split transmission and conventional gear sets.
Figure 32J:
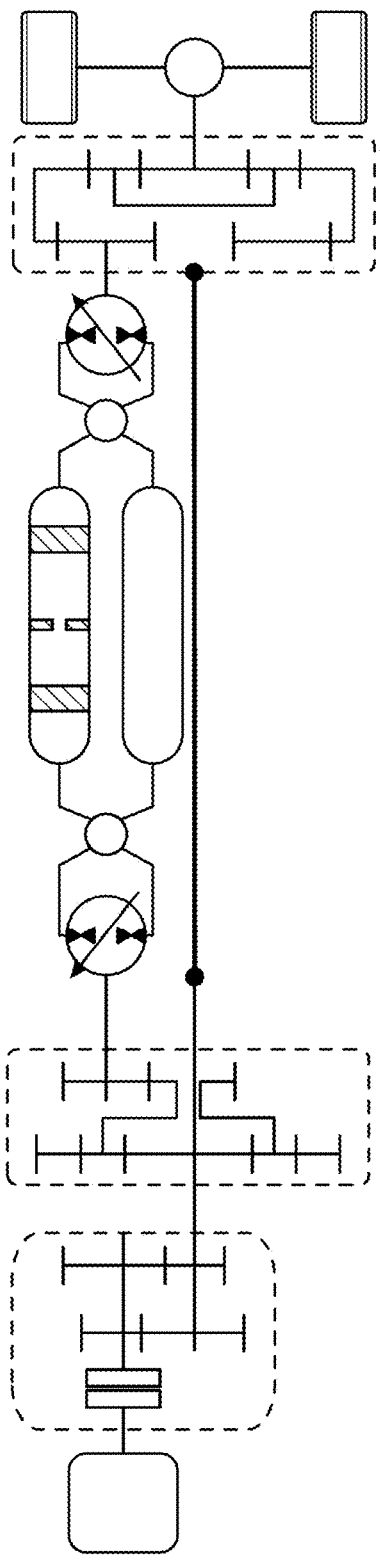
FIG. 32J illustrates an All Wheel Drive system coupled to Double Acting Brake Energy Recovery System with a structure having an integrated power split transmission and planetary gear sets

For all wheel drive applications, the integration of Brake Energy Recovery System relies on replacing the propulsion shaft of the all-wheel drive vehicle propulsion systems that drive the rear axle, with a double acting brake energy recovery system in the following different structural versions. FIG. 32F illustrates an all-wheel drive system coupled Double Acting Brake Energy Recovery System. FIG. 32G illustrates an all-wheel drive system coupled Double Acting Brake Energy Recovery System with a structure having an integrated hydrostatic transmission. FIG. 32H illustrates an all-wheel drive system coupled Double Acting Brake Energy Recovery System with a structure having an integrated direct mechanical transmission. FIG. 32I illustrates an all-wheel drive Drive system coupled Double Acting Brake Energy Recovery System with a structure having an integrated power split transmission and conventional gear sets. FIG. 32J illustrates an all-wheel drive Drive system coupled to Double Acting Brake Energy Recovery System with a structure having an integrated power split transmission and planetary gear sets.

Figure 33:
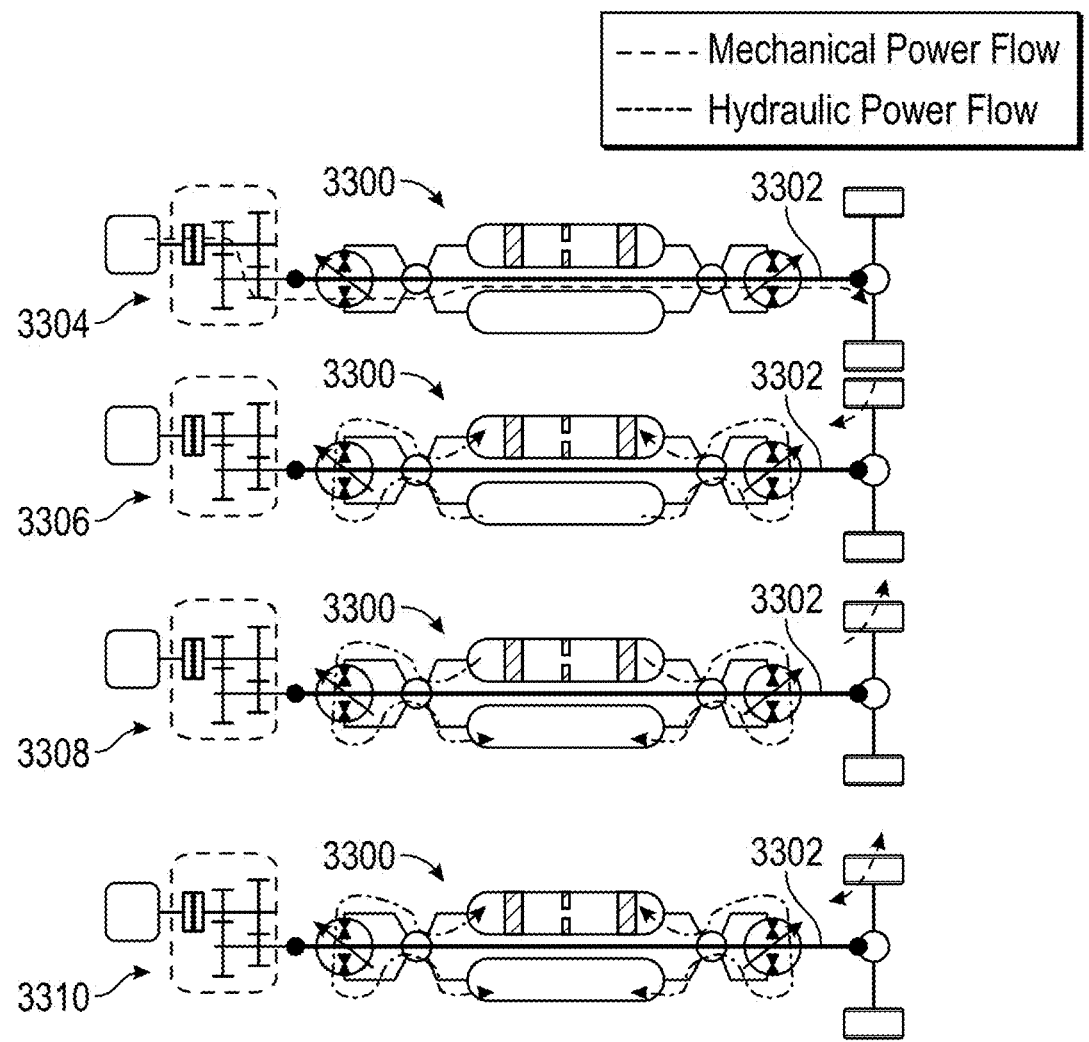
FIG. 33 illustrates a variety of operating conditions for a brake energy recovery system coupled to a drive shaft of a drive system of an automobile, according to at least one illustrated embodiment.

FIG. 33 illustrates a variety of operating conditions for a brake energy recovery system 3300 coupled to a drive shaft 3302 of a drive system of an automobile. In particular, FIG. 33 illustrates that as the automobile is driving at a constant speed, such as while cruising on a freeway, power generated by an internal combustion engine is transmitted mechanically by the drive shaft 3302 to wheels of the vehicle, as shown at 3304 at the top of FIG. 33. As the automobile brakes, the drive shaft 3302 is decoupled, such as at a clutch, and the wheels of the vehicle are used to power operation of hydraulic pumps of the brake energy recovery system 3300 to store energy in an accumulator of the brake energy storage system 3300, such as in the manner described above with respect to FIG. 27, as shown at 3306.

As the automobile accelerates, the drive shaft 3302 is decoupled, such as at a clutch, and the energy stored in the accumulator of the brake energy storage system 3300 is released to power hydraulic motors of the brake energy storage system 3300 to power the wheels of the vehicle, such as in the manner described above with respect to FIG. 27, as shown at 3308. It has been found that such storage and reuse of stored energy is about 81% efficient. As the automobile is driving in stop-and-go conditions, such as while driving through a city, an internal combustion engine is operated under its most efficient operating parameters to generate a constant amount of power, while the drive shaft 3302 is decoupled, such as at a clutch, and the brake energy recovery system 3300 is used as needed to store excess produced energy or to release energy to meet excess power demand, as shown at 3310 at the bottom of FIG. 33. It has been found that such applications improve overall system efficiency by 5-10 percent depending on the running conditions.

Figure 34A:
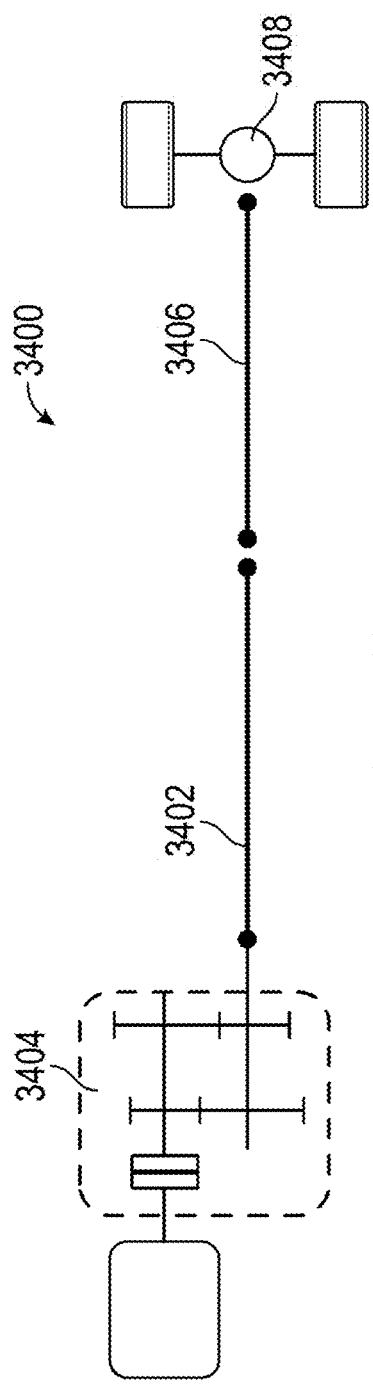
FIG. 34A illustrates a drive system of an automobile, according to at least one illustrated embodiment.

FIG. 34A illustrates a rear-wheel drive system 3400 of a heavy-duty automobile or vehicle, such as a military vehicle, police vehicle, fire vehicle such as a fire truck or fire engine, construction vehicle, forestry vehicle, agricultural vehicle such as an agricultural tractor, semi-truck, delivery van, parcel service vehicle, off-road vehicle, school bus, forklift, pickup truck, taxi, and the like. The drive system 3400 includes a first drive shaft 3402 mechanically coupled at a first end thereof to an output of a gearbox 3404 and a second drive shaft 3406 mechanically coupled at a first end thereof to a second end of the first drive shaft 3402 and at a second end thereof to a differential 3408. Thus, the first and second drive shafts 3402 and 3406 are mechanically coupled to one another in series, and together couple the gearbox 3404 to the differential 3408, but can be decoupled as needed, such as described above with respect to FIG. 33.

Figure 34B:
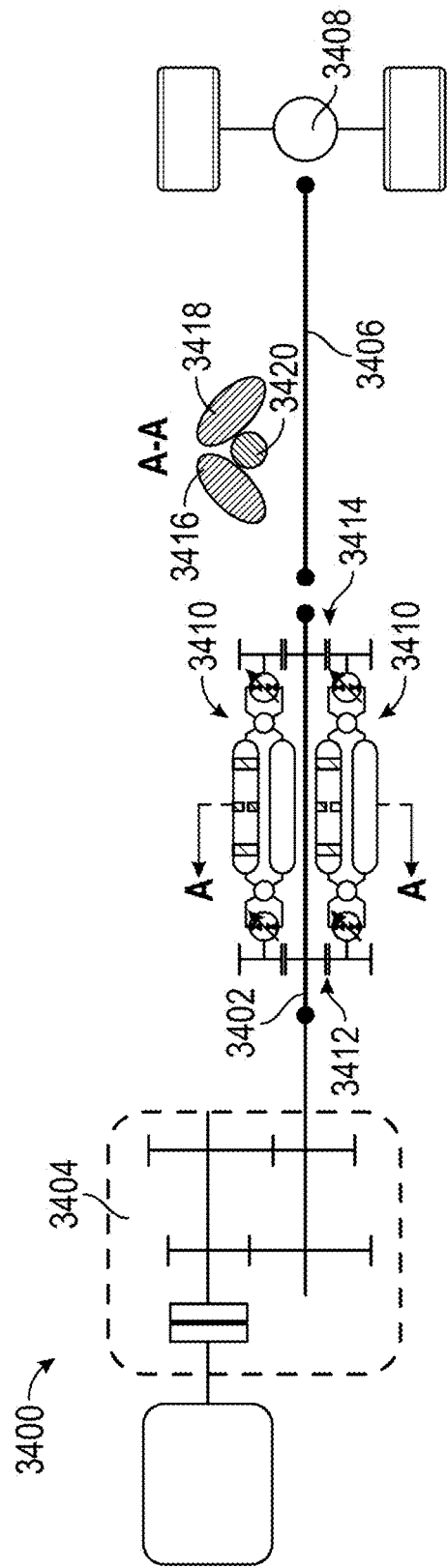
FIG. 34B illustrates two brake energy recovery systems coupled to a drive shaft of the drive system illustrated in FIG. 34A, according to at least one illustrated embodiment.

FIG. 34B illustrates two brake energy recovery systems 3410 coupled to the first drive shaft 3402 of the drive system 3400. The brake energy recovery systems 3410 have the same features, and operate in the same manner, as the brake energy recovery system 2700 and/or the brake energy recovery system 3300 described above. Respective first ends of the brake energy recovery systems 3410 are coupled to the first drive shaft 3402 by a first set of drive gears 3412, and respective second ends of the brake energy recovery systems 3410 are coupled to the first drive shaft 3402 by a second set of drive gears 3414. As also illustrated in FIG. 34B, the drive system 3400 has a cross-sectional shape including a first elliptical housing 3416 for a first one of the brake energy recovery systems 3410, a second elliptical housing 3418 for a second one of the brake energy recovery systems 3410, and a circular housing 3420 for the first drive shaft 3402. Providing the drive system 3400 with the brake energy recovery systems 3410 improves its effectiveness for use in heavy-duty vehicles.

Figure 34C:
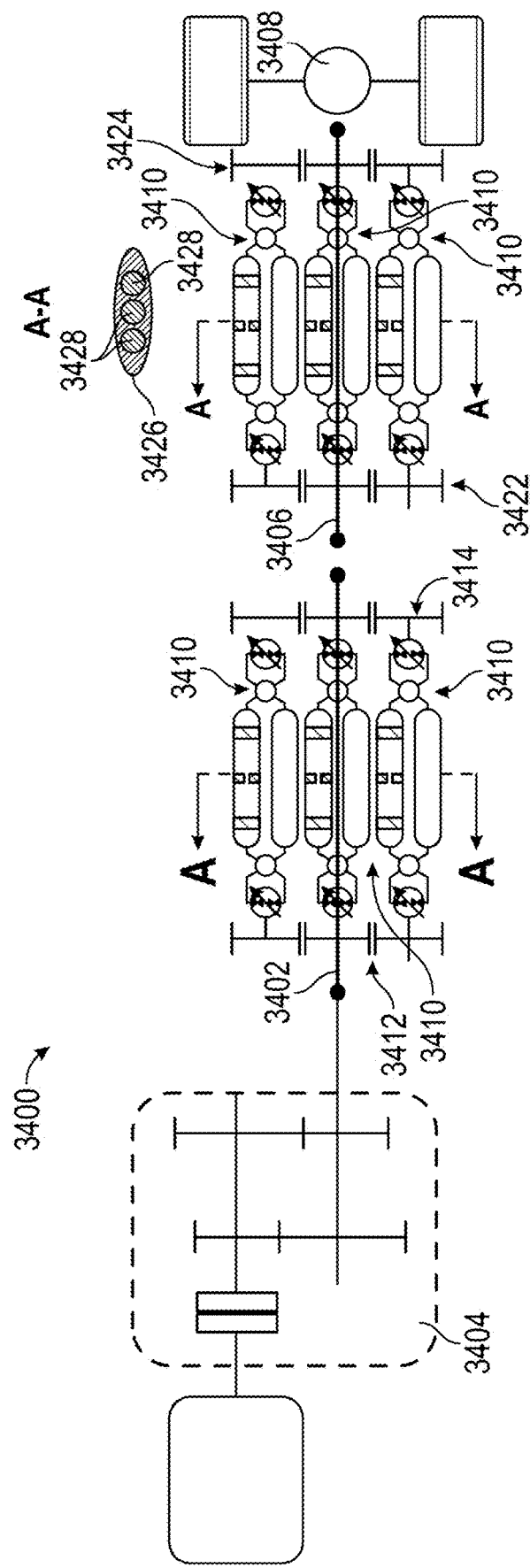
FIG. 34C illustrates six brake energy recovery systems coupled to a drive shaft of the drive system illustrated in FIG. 34A, according to at least one illustrated embodiment.

FIG. 34C illustrates three brake energy recovery systems 3410 coupled to the first drive shaft 3402 and three brake energy recovery systems 3410 coupled to the second drive shaft 3406 of the drive system 3400. The brake energy recovery systems 3410 have the same features, and operate in the same manner, as the brake energy recovery system 2700 and/or the brake energy recovery system 3300 described above. Respective first ends of the three brake energy recovery systems 3410 coupled to the first drive shaft 3402 are coupled to the first drive shaft 3402 by a first set of drive gears 3412, and respective second ends of the brake energy recovery systems 3410 coupled to the first drive shaft 3402 are coupled to the first drive shaft 3402 by a second set of drive gears 3414. Respective first ends of the three brake energy recovery systems 3410 coupled to the second drive shaft 3406 are coupled to the second drive shaft 3406 by a third set of drive gears 3422, and respective second ends of the brake energy recovery systems 3410 coupled to the second drive shaft 3406 are coupled to the second drive shaft 3406 by a fourth set of drive gears 3424.

As illustrated in FIG. 34C, the drive system 3400 has two cross-sectional shapes including an elliptical housing 3426 that houses first, second, and third circular housings for respective first, second, and third brake energy recovery systems 3410. Providing the drive system 3400 with the brake energy recovery systems 3410 improves its effectiveness for use in heavy-duty vehicles.

FIG. 35A illustrates a conventional (e.g., prior art) all-wheel drive system 3500 of a heavy-duty automobile or vehicle, such as any of the heavy-duty vehicles described above with respect to rear-wheel drive system 3400. The drive system 3500 includes a gearbox 3502, a front drive shaft 3504 mechanically coupled at a first end thereof to an output of the gearbox 3502, a front differential 3506 mechanically coupled to a second end of the front drive shaft 3504, and a front axle 3508 mechanically coupled to the front differential 3506. The drive system 3500 also includes a rear drive shaft 3510 mechanically coupled at a first end thereof to an output of the gearbox 3502, a rear differential 3512 mechanically coupled to a second end of the rear drive shaft 3510, and a rear axle 3514 mechanically coupled to the rear differential 3512.

FIG. 35B illustrates a front brake energy recovery system 3516 coupled to the front axle 3508 and a rear brake energy recovery system 3518 coupled to the rear axle 3514. The front and rear brake energy recovery systems 3516 and 3518 have the same features, and operate in the same manner, as the brake energy recovery system 2700, drive system 2800, drive system 2900, and/or drive system 3000 described above. First and second ends of the front brake energy recovery system 3516 are coupled to the front axle 3508 by front gear sets 3520 and first and second ends of the rear brake energy recovery system 3518 are coupled to the rear axle 3514 by rear gear sets 3522. The all-wheel drive system 3500 is similar in many respects to the all-wheel drive system 3200, but provides two brake energy recovery systems each coupled to a respective axle, rather than one brake energy recovery system in place of a drive shaft.

Figure 36:
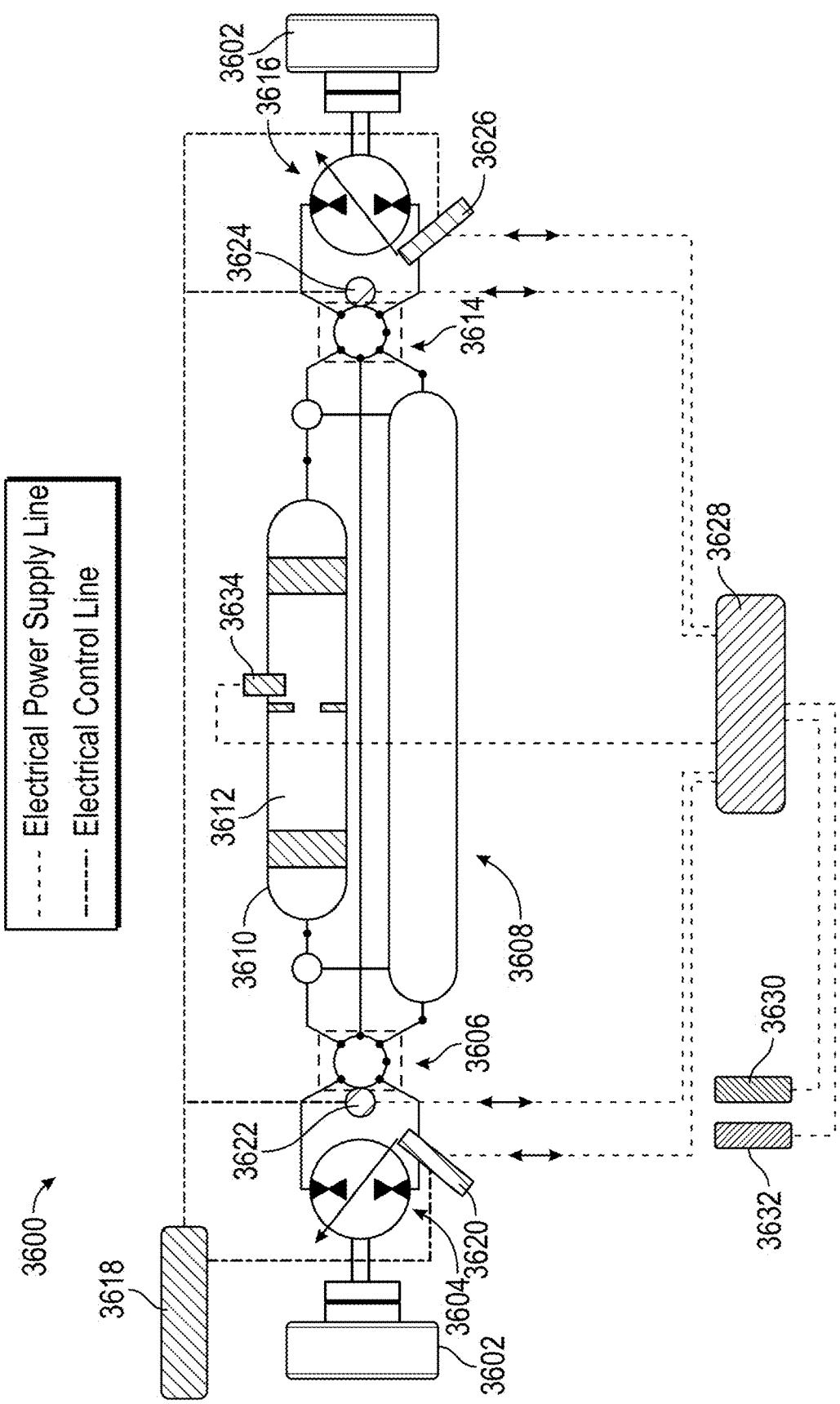
FIG. 36 illustrates electrical connections of a brake energy recovery system, according to at least one illustrated embodiment.

FIG. 36 illustrates electrical connections of a brake energy recovery system 3600 in place of an axle between two wheels 3602 of an automobile. The brake energy recovery system 3600 has the same features, and operate in the same manner, as the brake energy recovery system 2700 described above, except that it is coupled directly to wheels of the automobile, rather than between a gearbox and a differential thereof. Brake energy recovery system 3600 includes a first hydraulic pump 3604, a first flow control valve 3606, an accumulator 3608 including a high-pressure accumulator 3610 having a pressurized gas 3612, a second flow control valve 3614, and a second hydraulic pump 3616. The brake energy recovery system 3600 also includes a battery 3618 that supplies electrical power to a first actuator 3620 for the first hydraulic pump 3604, a second actuator 3622 for the first flow control valve 3606, a third actuator 3624 for the second flow control valve 3614, and a fourth actuator 3626 for the second hydraulic pump 3616.

The brake energy recovery system 3600 also includes a control unit 3628 that is electrically and communicatively coupled to receive input from an accelerator or gas pedal 3630 of the automobile, a brake pedal 3632 of the automobile, and a pressure transducer 3634 measuring a pressure of the pressurized gas 3612. The control unit 3628 is also electrically and communicatively coupled to provide commands to the first, second, third, and fourth actuators 3620, 3622, 3624, and 3626.

FIG. 37A illustrates a brake energy recovery system 3700 in place of an axle between two wheels 3702 of an automobile. The brake energy recovery system 3700 has the same features, and operate in the same manner, as the brake energy recovery system 3600 described above. The brake energy recovery system 3700 includes a thermal energy recovery subsystem 3704 that includes an annular fluid jacket 3706 that extends around an exhaust pipe 3708 of the vehicle. The thermal energy recovery subsystem 3704 also includes a heat exchanger and is capable of extracting and recovering heat energy from the exhaust carried through the exhaust pipe 3708, to power and/or control operation of the brake energy recovery system 3700. FIG. 37B illustrates the brake energy recovery system 3700 incorporated into an all-wheel drive system. FIG. 37C illustrates the brake energy recovery system 3700 incorporated into a rear-wheel drive system.

Figure 38:
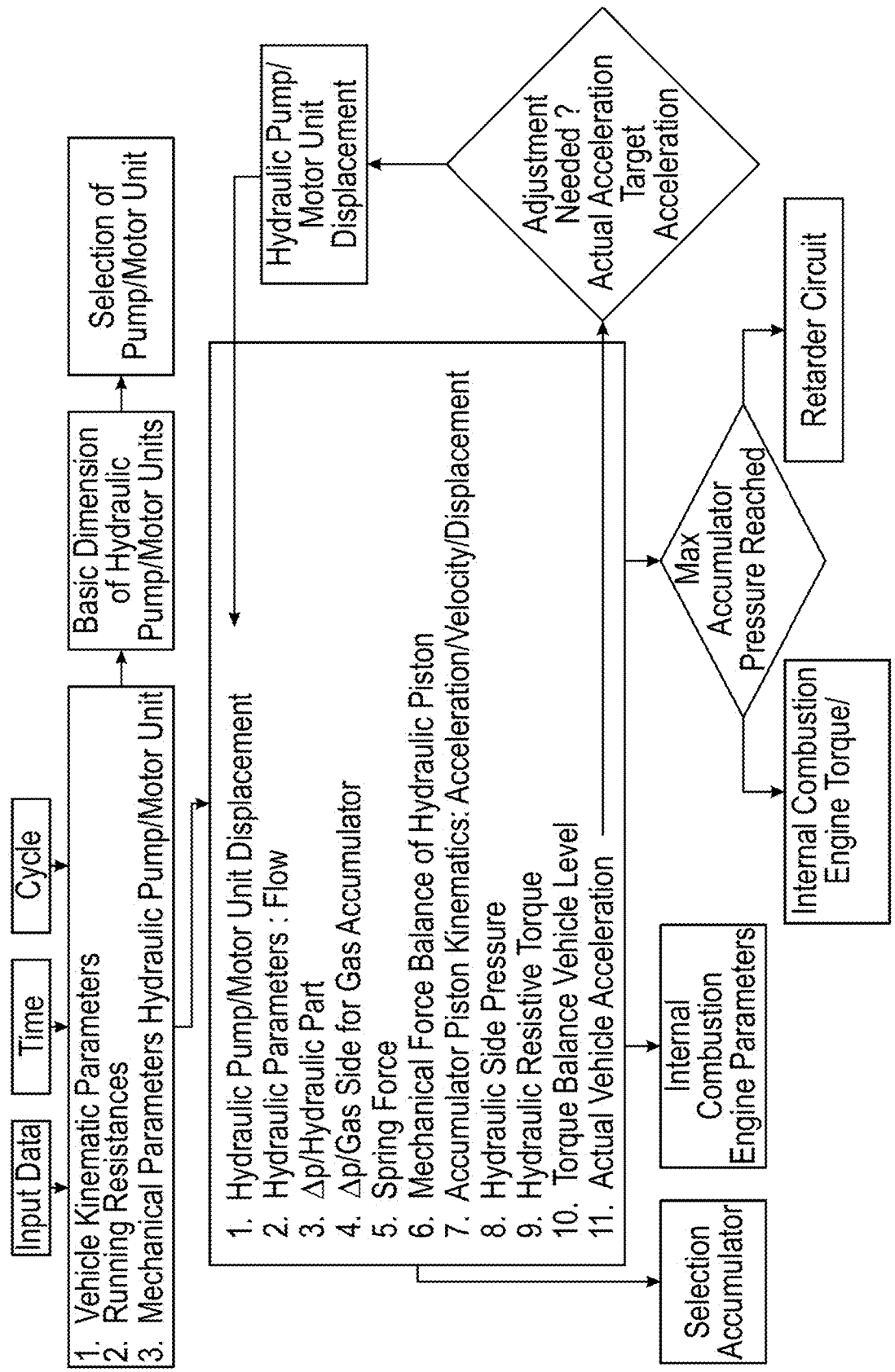
FIG. 38 illustrates a logic flow diagram for operation of a brake energy recovery system, according to at least one illustrated embodiment.
Figure 39:
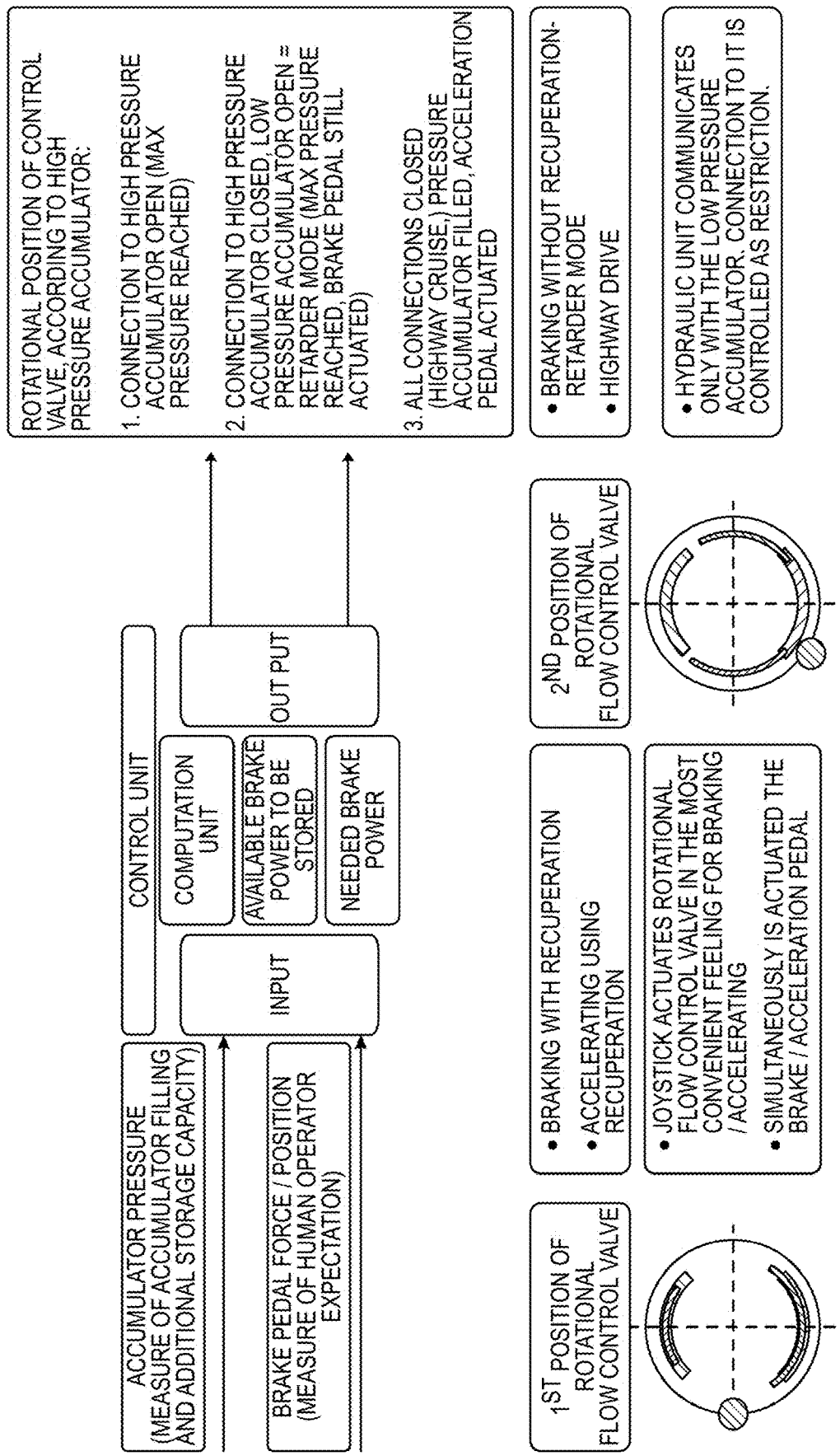
FIG. 39 illustrates a block diagram of operation of a brake energy recovery system, according to at least one illustrated embodiment.

FIG. 38 illustrates a flow diagram of operation of any one of the brake energy recovery systems described herein. FIG. 39 illustrates a block diagram of operation of a brake energy recovery system, during acceleration, braking, or constant-speed cruising of a vehicle. In particular, after receiving a set of inputs and determining an appropriate course of action, a control unit transmits commands or instructions to flow control valves of one or more brake energy recovery systems to turn the valves to positions that allow accumulator(s) to power acceleration of the vehicle, the wheels to power storage of energy in accumulator(s), or neither. Thus, the control unit controls one or more brake energy recovery systems to operate in the manner described above for any of the brake energy recovery systems described herein.

Figure 40:
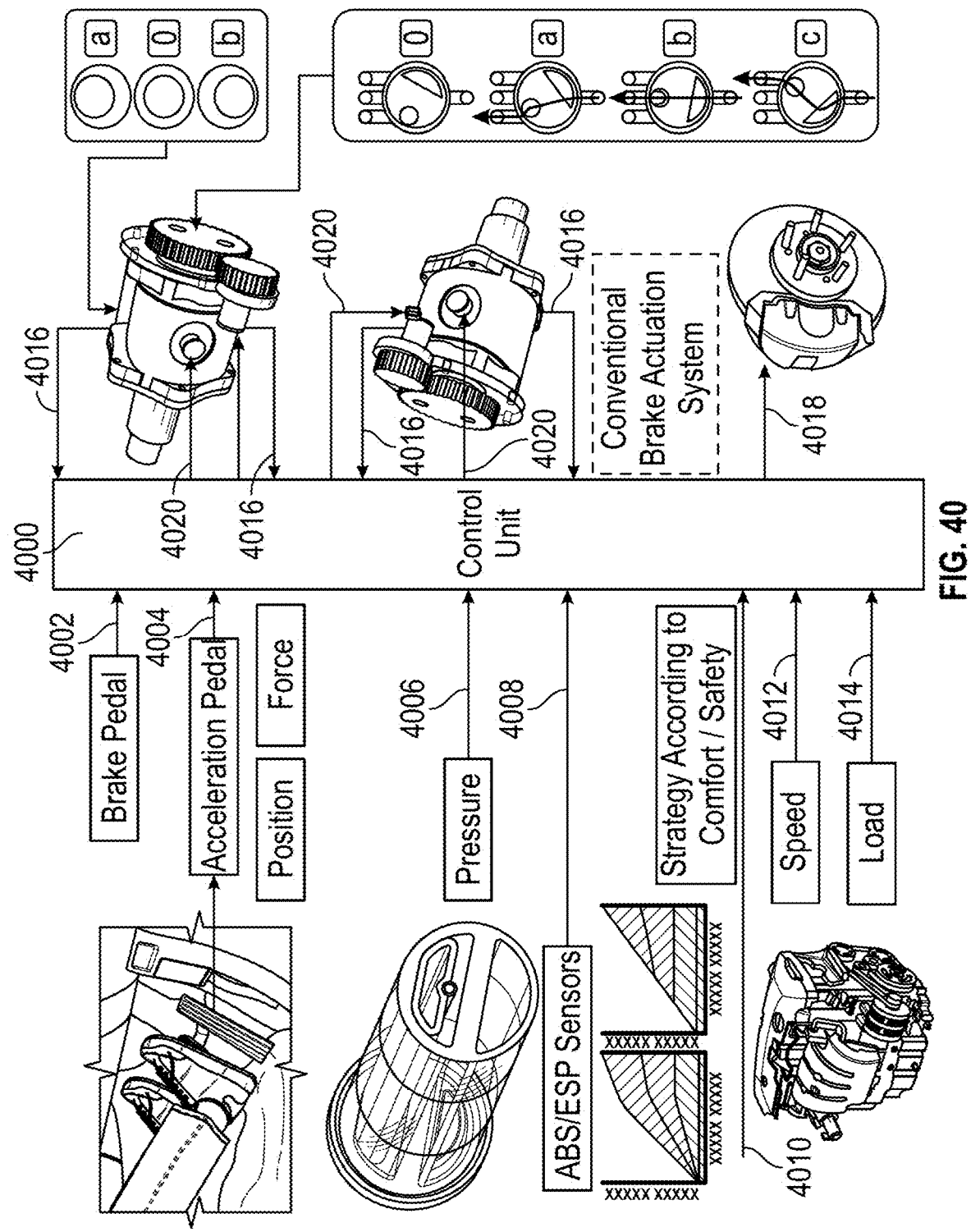
FIG. 40 illustrates a block diagram of a control unit for a brake energy recovery system, according to at least one illustrated embodiment.

FIG. 40 illustrates a block diagram of a control unit 4000 for a brake energy recovery system. In particular, the control unit 4000 is configured to accept inputs from a brake pedal at 4002, an accelerator or gas pedal at 4004, a pressure transducer measuring a pressure within a hydraulic accumulator at 4006, an anti-lock braking system and/or an electronic stability control system at 4008, data regarding comfortable and safe driving conditions and parameters at 4010, a travelling speed of the vehicle at 4012, a power demanded at 4014, and information from first and second brake energy recovery systems at 4016. The control unit 4000 is also configured to transmit commands to a conventional braking system at 4018 and to first and second brake energy recovery systems at 4020.

Figure 41:
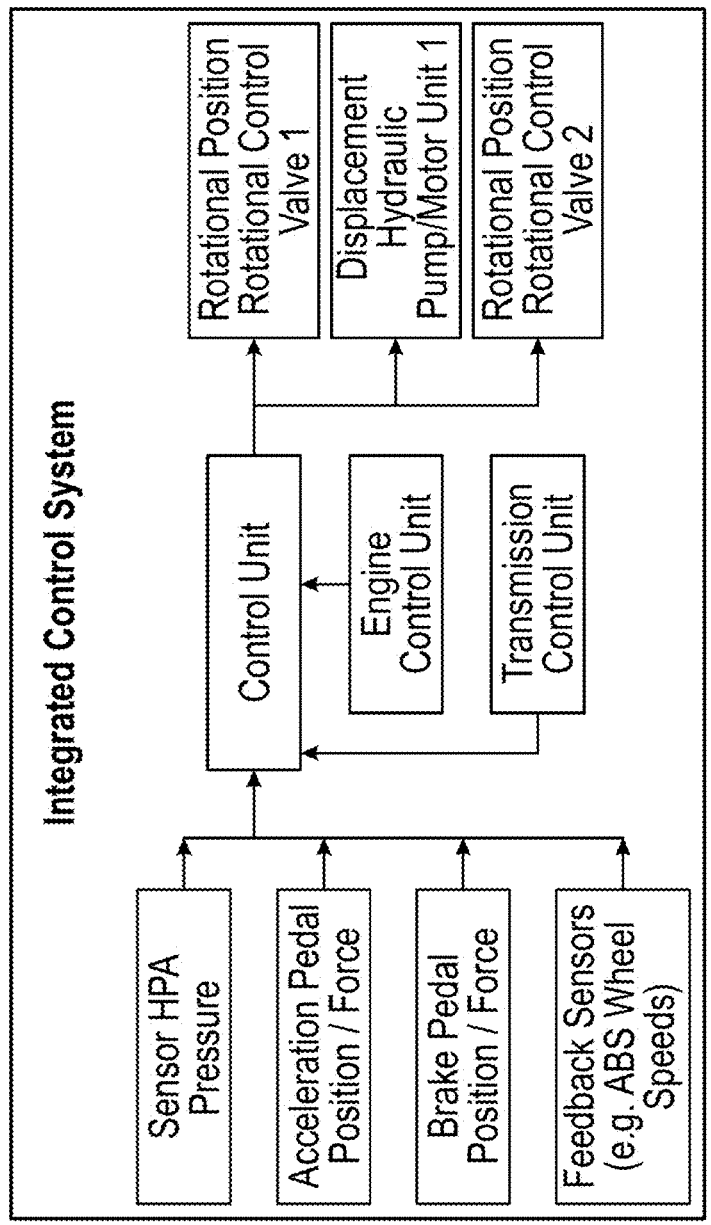
FIG. 41 illustrates a block diagram of operation of a brake energy recovery system, according to at least one illustrated embodiment.

FIG. 41 illustrates another block diagram of operation of a brake energy recovery system, during acceleration, braking, or constant-speed cruising of a vehicle. In particular, after receiving a set of inputs including a pressure of a high-pressure accumulator, the position of gas and/or brake pedals of the vehicle, and information from anti-lock brake or other systems of the automobile, a control unit determines an appropriate course of action and then transmits commands or instructions to flow control valves and/or hydraulic pumps/motors of one or more brake energy recovery systems so that accumulator(s) power acceleration of the vehicle, wheels of the vehicle power storage of energy in accumulator(s), or neither. Thus, the control unit controls one or more brake energy recovery systems to operate in the manner described above for any of the brake energy recovery systems described herein.

Figure 42:
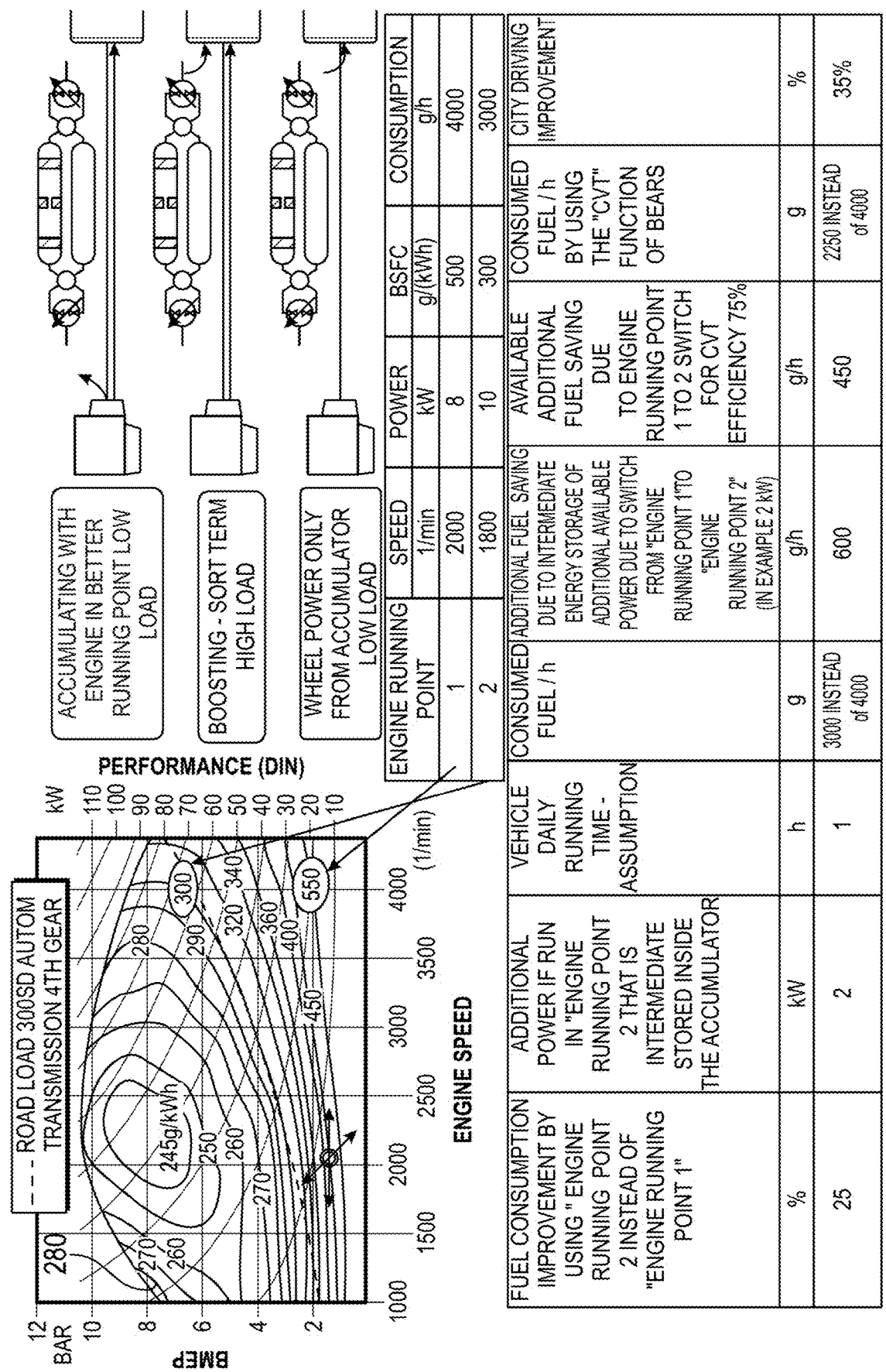
FIG. 42 illustrates analysis of efficiency improvements provided by a brake energy recovery system, according to at least one illustrated embodiment.

FIG. 42 illustrates the results of an analysis of efficiency improvements provided by a brake energy recovery system such as the brake energy recovery system 2700 described above. In particular, the analysis shows that the brake energy recovery systems described herein improve efficiency of a vehicle in city driving conditions by about 35%.

The following related applications are hereby incorporated herein by reference in their entireties: (1) Hydraulic Actuated Piston Clutch, U.S. Ser. No. 62/498,349, filed Dec. 21, 2016; (2) Radial Offset Hydraulic Piston Torque Transfer System, U.S. Ser. No. 62/605,291, filed Aug. 7, 2017; (3) Hybrid Kinematic Hydraulic Transmission for Use with an Integrated Brake Energy Recovery System, U.S. Ser. No. 62/605,283, filed Aug. 7, 2017; (4) Brake Energy Active Recovery System for Vehicles, U.S. Ser. No. 62/606,522, filed Sep. 26, 2017; (5) Gear Box with Integrated Brake Energy Recovery System, U.S. Ser. No. 62/584,650, filed Nov. 10, 2017; (6) U.S. Ser. No. 62/598,364, filed Dec. 13, 2017; (7) Offset Radial Piston Torque Transfer Device, U.S. Ser. No. 62/598,366, filed Dec. 13, 2017; (8) Integrated Brake and Thermal Energy Recovery System, U.S. Ser. No. 15/731,267, filed May 15, 2017; (9) Radial Hydraulic Piston Actuated Torque Transfer Device, U.S. Ser. No. 15/731,271, filed May 15, 2017; and (10) Axial Piston Variable Displacement Hydraulic Rotational Unit with Integrated Propulsion Shaft, U.S. Ser. No. 15/731,383, filed Jun. 5, 2017.

Additionally, U.S. provisional patent application Nos. 62/496,784, filed Oct. 28, 2016; 62/498,348, filed Dec. 21, 2016; 62/498,347, filed Dec. 21, 2016; 62/498,338, filed Dec. 21, 2016; 62/498,337, filed Dec. 21, 2016; 62/498,336, filed Dec. 21, 2016; 62/606,521, filed Sep. 26, 2017; 62/606,511, filed Sep. 26, 2017; 62/577,630, filed Oct. 26, 2017; and 62/580,360, filed Nov. 1, 2017; as well as U.S. non-provisional patent application Ser. No. 15/731,360, filed Jun. 1, 2017; and PCT application no. PCT/US17/58883, filed Oct. 27, 2017, are hereby incorporated herein by reference in their entireties.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hydraulic transformer clutch employing hydraulic piston assemblies with integrated electrohydraulic actuation, the hydraulic transformer clutch comprising:
　an output shaft;
　an output disc affixed to the output shaft for rotation therewith;
　an input shaft;
　a rotatable housing affixed to one of the input shaft or the output shaft for rotation therewith;
　a plurality of hydraulic cylinders operatively connected to the rotatable housing, the hydraulic cylinders spaced about the rotatable housing, wherein each hydraulic cylinder of the plurality of hydraulic cylinders is positioned at a substantially constant offset angle relative to radial directions of the input shaft and the output shaft; and
　a plurality of working pistons, each piston of the plurality of working pistons being slidably mounted within a corresponding hydraulic cylinder of the plurality of hydraulic cylinders, each piston of the plurality of working pistons positioned to be selectively pushed, when actuated, to create a rigid connection between the input shaft and the output shaft;
　　wherein one or more actuator pistons are pushed by an electromagnet and create pressure that is distributed on working piston surfaces and generates active torque.

2. The hydraulic transformer clutch of claim 1, further comprising a plurality of rotating engagement elements, each rotating engagement element of the plurality of rotating engagement elements associated with a piston of the plurality of working pistons, wherein the plurality of rotating engagement elements engage the output disc when actuated.

3. The hydraulic transformer clutch of claim 1, further comprising a hydraulic system operatively associated with the hydraulic cylinders and working pistons, wherein the hydraulic system enables actuation and de-actuation of the working pistons in the hydraulic cylinders, wherein actuation of the working pistons in the hydraulic cylinders couples the input shaft to the output shaft and de-actuation of the working pistons in the hydraulic cylinders decouples the input shaft from the output shaft.

4. The hydraulic transformer clutch of claim 1, further comprising a hydraulic variable displacement pump that is operatively associated with each hydraulic cylinder and piston.

5. The hydraulic transformer clutch of claim 4, further comprising directional control valves that use hydraulic fluid to selectively urge each piston to be pushed towards the output disc when actuated.

6. The hydraulic transformer clutch of claim 5, further comprising a hydraulic accumulator that is operatively associated with the hydraulic variable displacement pump and the directional control valves, wherein the hydraulic accumulator reduces oscillations in the hydraulic transformer clutch during actuation.

7. The hydraulic transformer clutch of claim 1, further comprising a pressure relief valve that protects against pressure overloads.

8. The hydraulic transformer clutch of claim 1, wherein the hydraulic transformer clutch is incorporated into an automotive transmission.

* * * * *